US007289245B2

United States Patent
Kagawa

(10) Patent No.: US 7,289,245 B2
(45) Date of Patent: Oct. 30, 2007

(54) COLOR FACSIMILE DEVICE CAPABLE OF TRANSMITTING COLOR IMAGE INFORMATION REPRESENTED IN APPROPRIATE COLOR SPACE THROUGH MULTIPLE COMMUNICATION CHANNELS

(75) Inventor: Tetsuya Kagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 994 days.

(21) Appl. No.: 10/013,232

(22) Filed: Dec. 10, 2001

(65) Prior Publication Data

US 2002/0093698 A1    Jul. 18, 2002

(30) Foreign Application Priority Data

Dec. 15, 2000    (JP)    ............... 2000-381495

(51) Int. Cl.
  H04N 1/60    (2006.01)
  H04N 1/00    (2006.01)
  H04N 1/46    (2006.01)
  H04N 1/21    (2006.01)
  H04N 1/64    (2006.01)

(52) U.S. Cl. ............... 358/1.9; 358/1.15; 358/404; 358/523; 358/1.16; 358/402; 358/1.13; 358/500; 358/426.02; 358/539; 345/604; 345/603; 379/100.08; 379/93.09

(58) Field of Classification Search ............... 358/1.9, 358/404, 500, 402, 1.13, 403, 527, 518, 505, 358/539; 379/93.07, 93.09, 93.11, 93.15, 379/100.13, 93.16, 100.08; 345/604; 709/203
See application file for complete search history.

(56) References Cited

U.S. PATENT DOCUMENTS

| 5,392,133 A | * | 2/1995 | Nakajima | ............ 358/407 |
|---|---|---|---|---|
| 5,434,684 A | * | 7/1995 | Sugiyama | ............ 358/527 |
| 5,522,041 A | * | 5/1996 | Murakami et al. | ............ 709/203 |
| 5,581,374 A | * | 12/1996 | Shoji | ............ 358/500 |
| 5,774,654 A | * | 6/1998 | Maki | ............ 709/200 |
| 5,896,207 A | * | 4/1999 | Tomida | ............ 358/537 |
| 5,923,824 A | * | 7/1999 | Yokomizo | ............ 358/1.9 |
| 5,933,247 A | * | 8/1999 | Shibata | ............ 358/404 |
| 5,956,162 A | * | 9/1999 | Nobuta | ............ 358/500 |
| 6,278,529 B1 | * | 8/2001 | Akimoto | ............ 358/1.9 |
| 6,426,809 B1 | * | 7/2002 | Hayashi et al. | ............ 358/529 |
| 6,611,355 B1 | * | 8/2003 | Kizawa | ............ 358/1.9 |
| 6,801,340 B1 | * | 10/2004 | Endo | ............ 358/403 |
| 6,882,446 B1 | * | 4/2005 | Tohyama et al. | ............ 358/1.9 |
| 2002/0051148 A1 | * | 5/2002 | Izumi | ............ 358/1.9 |
| 2002/0080380 A1 | * | 6/2002 | Sugiura et al. | ............ 358/1.13 |
| 2002/0167690 A1 | * | 11/2002 | Fuji et al. | ............ 358/539 |

FOREIGN PATENT DOCUMENTS

| JP | 5-219332 | 8/1993 |
|---|---|---|
| JP | 10-304207 | 11/1998 |
| JP | 2000-194621 | 7/2000 |

* cited by examiner

Primary Examiner—Twyler Lamb
Assistant Examiner—Beniyam Menberu
(74) Attorney, Agent, or Firm—Cooper & Dunham, LLP

(57) ABSTRACT

A color facsimile device capable of transmitting color image information through multiple communication methods, such as G3, G4, T.37, and T.38, which can convert color image information into that represented in appropriate color space for each communication methods.

10 Claims, 42 Drawing Sheets

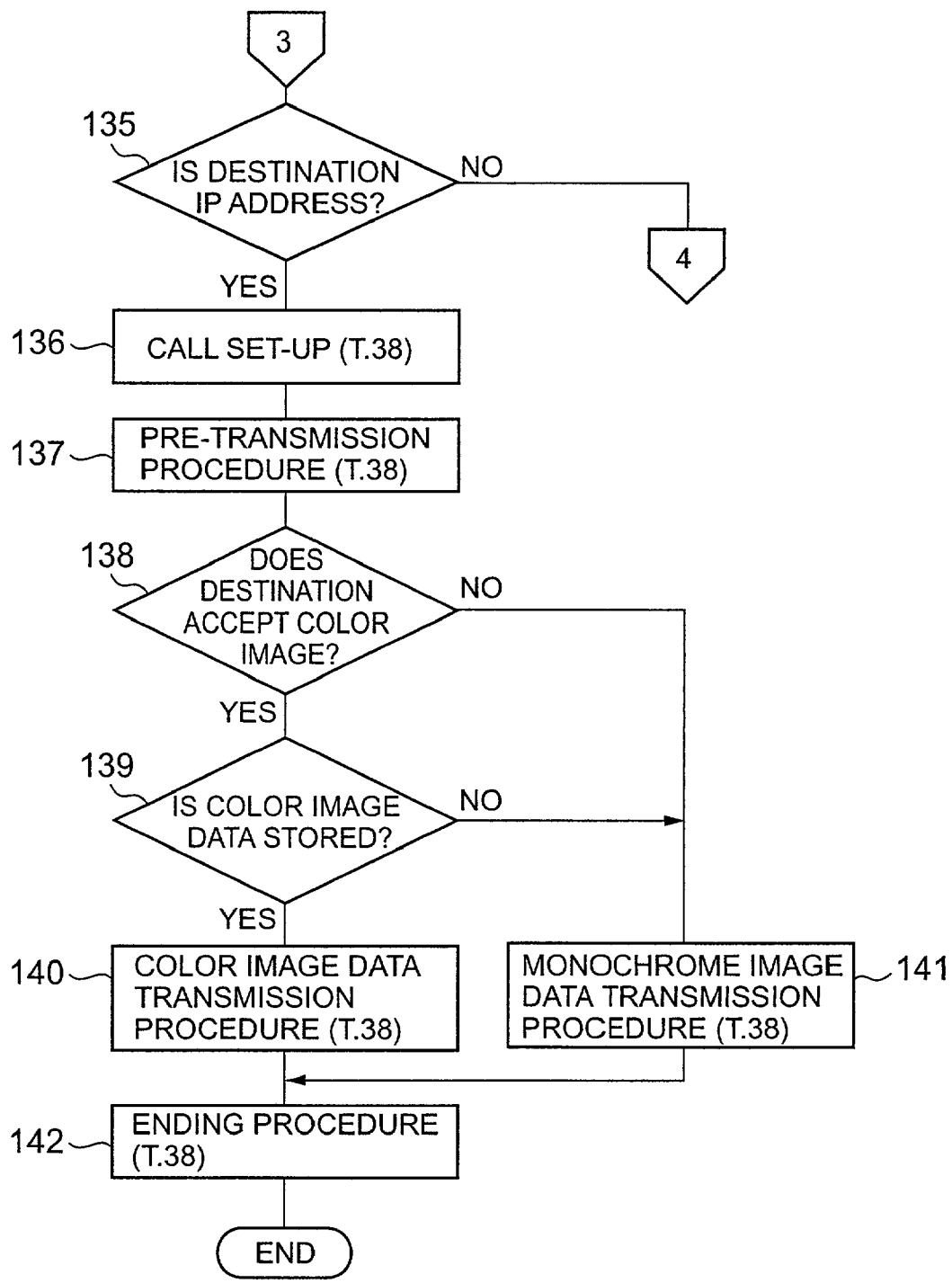

FIG.5
(a)
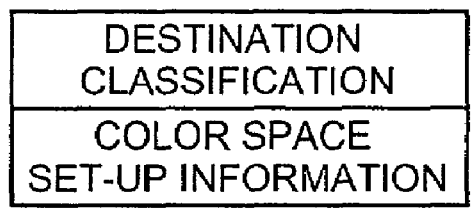
(b)
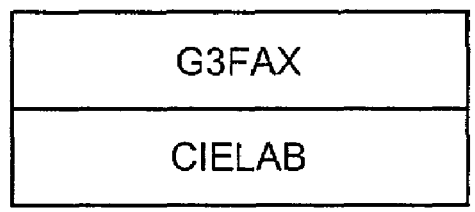
(c)
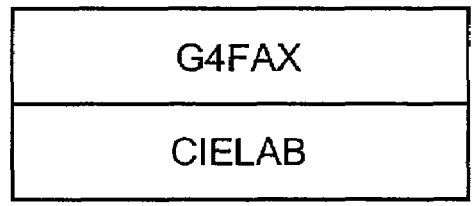
(d)
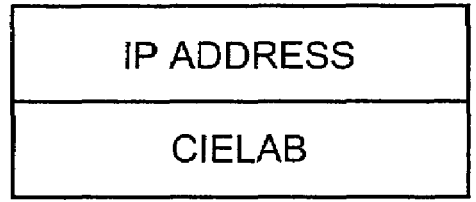
(e)
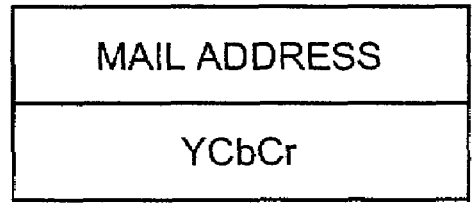

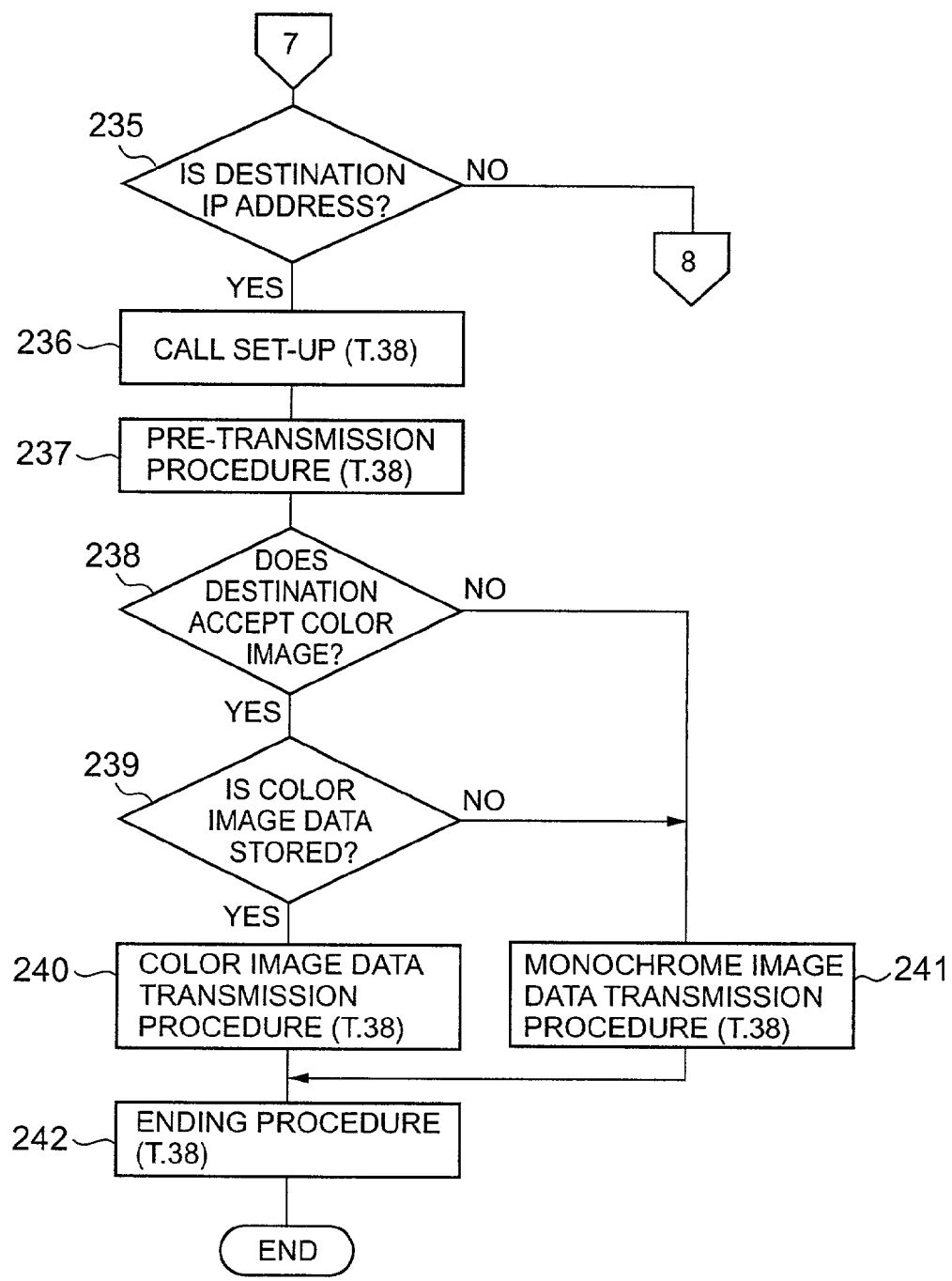

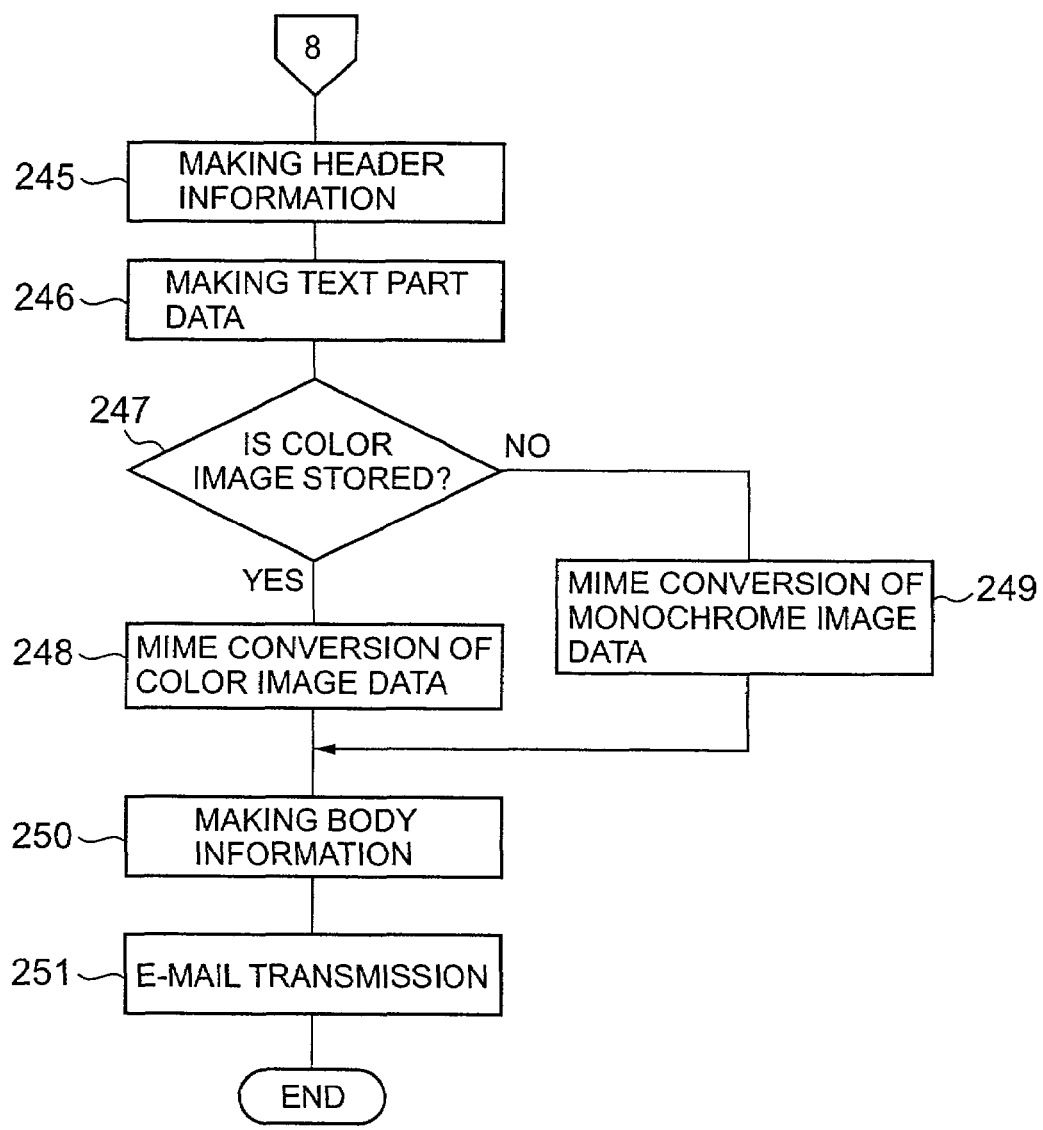

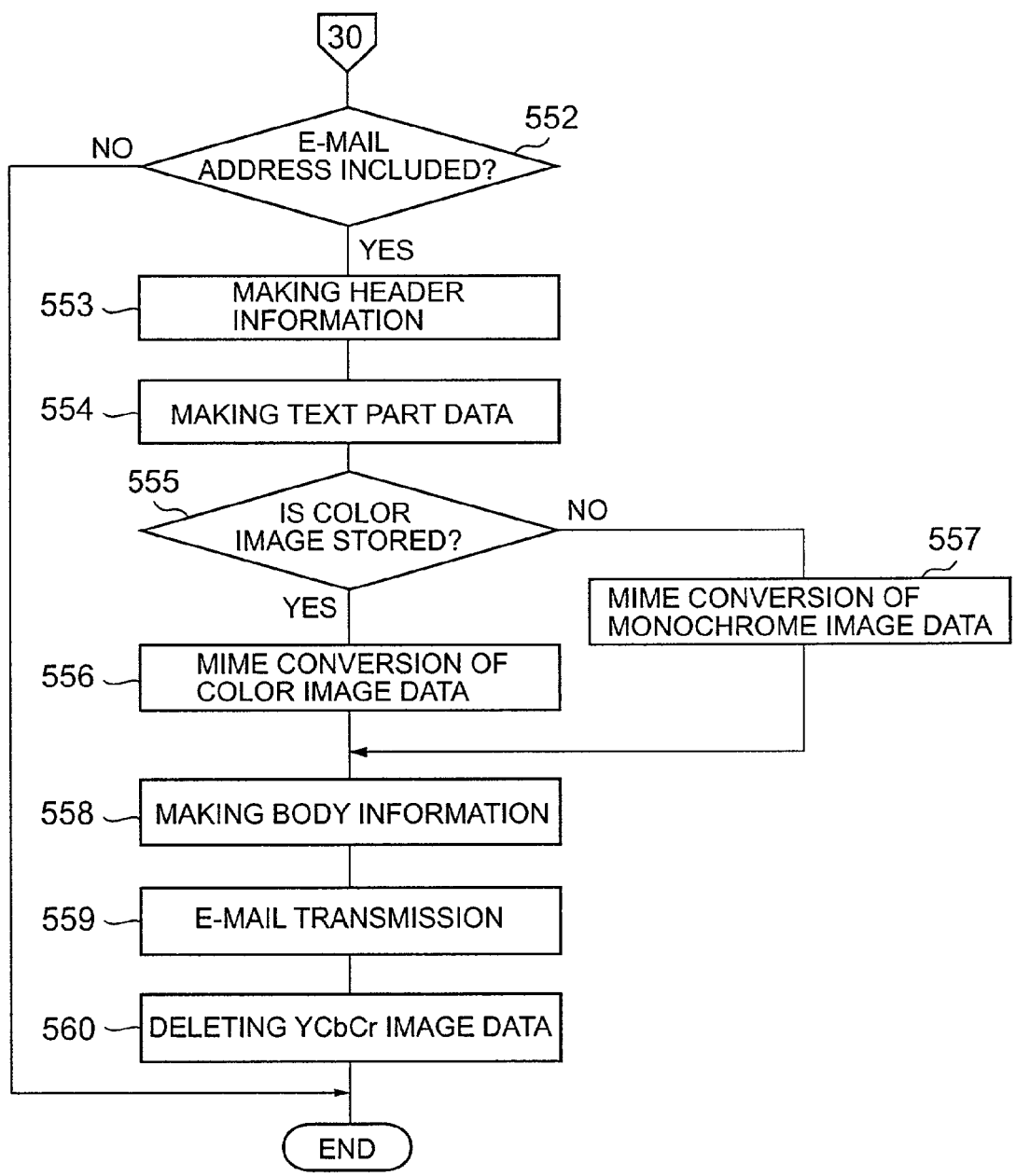

COLOR FACSIMILE DEVICE CAPABLE OF TRANSMITTING COLOR IMAGE INFORMATION REPRESENTED IN APPROPRIATE COLOR SPACE THROUGH MULTIPLE COMMUNICATION CHANNELS

BACKGROUND OF THE INVENTION

1. Field of the Invention

The present invention generally relates to a color facsimile device, and more particularly, to a color facsimile device that can send color image data through a plurality of communication channels.

2. Description of the Related Art

Generally, with respect to color image data communication through a group 3 facsimile device, the TTC Standard JT-T4 "Specification on Group 3 Facsimile Terminal for Document Transmission" specifies, in the appendix E (Continuous Gradation Color Mode Option), CIELAB as a color space in which an original color image is represented, and JPEG as a coding method by which the color image is encoded.

On the other hand, the recent evolution of network technology has realized network facsimile devices which can transmit image information through a network such as the internet.

With respect to the network facsimile device, both T.37 communication method conforming to the ITU-T Recommendation T.37 and T.38 communication method conforming to ITU-T Recommendation T.38 are specified as communication methods. A network facsimile device can exchange image data through the internet by sending an e-mail (T.37) or establishing a direct session with the other device for real-time exchange (T.38).

The network facsimile devices usually have a group 3 facsimile device function and a group 4 facsimile device function, for example.

Accordingly, as is often the case, a network facsimile device has, as an optional communication function of a group 3 facsimile device, a communication function of exchanging color image information. When the network facsimile device exchanges color image information, through an e-mail for example, the network facsimile device must transmit the color image information in an adequate manner so that a receiving device can properly receive and process the color image information.

When image data is exchanged through an e-mail, the e-mail may be addressed to a data processing device such as an ordinary personal computer, instead of a network facsimile having an identical function to the network facsimile device.

A personal computer may use a different color space, such as YCbCr, for representing color image, from the color space used by the network facsimile device.

Conventionally, when a network facsimile device transmits color image information to a personal computer through an e-mail, the color space difference between the network facsimile device and the personal computer has sometimes caused problems such that a reproduced color image has a different tone from an original.

SUMMARY OF THE INVENTION

Accordingly, it is an object of the present invention to provide a novel and useful color facsimile device which can transmit color image data by choosing an appropriate color space corresponding to the receiving device.

In order to achieve the above objects according to the present invention, a color facsimile device which, by scanning documents, generates first color image information represented in a first color space and transmits, to a destination designated by a user, second color image information through a plurality of communication methods, including a color space conversion unit which converts, said first color image information represented in said first color space into said second color image information by changing color representation from said first color space to a second color space in which said second color image information is necessary to be represented so that said destination can reproduce said documents in a right color and tone.

If a plurality of communication methods is required to transmit color image information, the color conversion unit converts the first color image information, before transmission, into color image information which is represented in an appropriate color space that the destination can accept and display the image in a right tone.

Other objects, features, and advantages of the present invention will be more apparent from the following detailed description when read in conjunction with the accompanying drawings.

BRIEF DESCRIPTION OF THE DRAWINGS

FIGS. 4A through 4E illustrates a flowchart of image information transmission transaction of a network facsimile device, for example;

FIG. 5 illustrates an example of a color table;

FIGS. 6A through 6E illustrates a flowchart of image information transmission transaction, as another example;

FIGS. 8A through 8I illustrates a flowchart of image information transmission transaction, as yet another example;

FIGS. 9A through 9M illustrates a flowchart of image information transmission transaction, as yet another example.

DETAIL DESCRIPTION OF THE PREFERRED EMBODIMENTS

A detail description of the preferred embodiments of the present invention will now be given with reference to attached figures.

Figure 1:
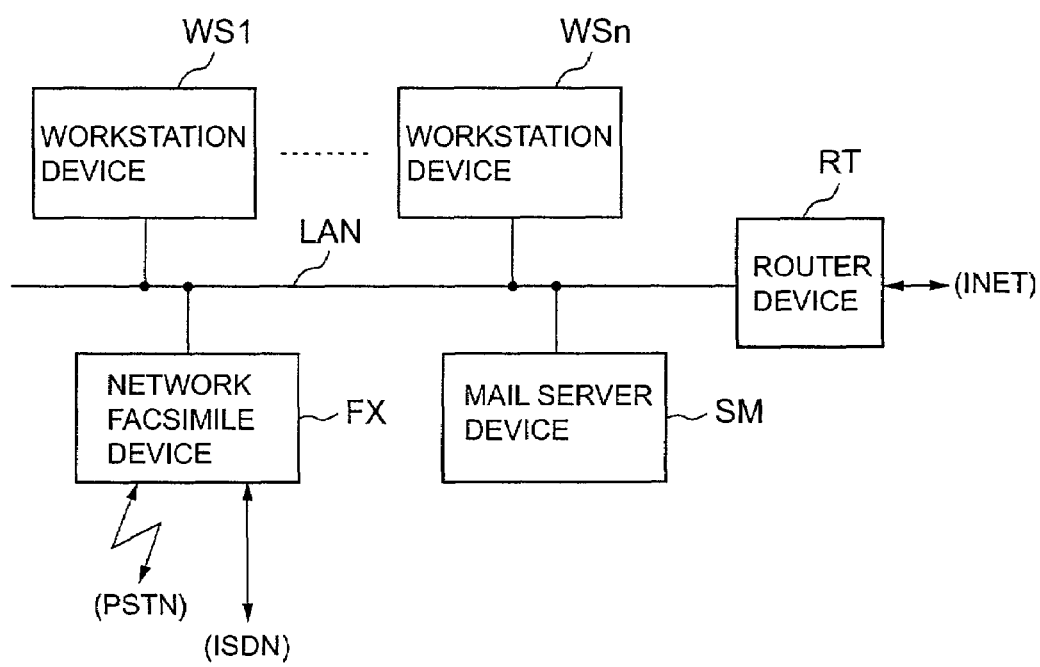
FIG. 1 illustrates a block diagram of a network system relative to an embodiment of the present invention.

FIG. 1 is a drawing showing a network system relative to an embodiment of the present invention.

A plurality of workstation devices WS1-WSn, a mail server device SM, and a network facsimile device FX are connected to a local area network LAN. The local area network LAN is connected to the internet through a router device RT. Accordingly, the workstation devices WS1-WSn, the mail server device SM, and the network facsimile device FX are able to exchange data with another adequate terminal device through the internet.

The mail server device SM provides an e-mail collection service and an e-mail delivery service to users of the workstation devices WS1-WSn and the network facsimile device FX connected to the local area network LAN.

The workstation devices WS1-WSn are provided with facsimile application software for producing and displaying facsimile image information, and a variety of software for exchanging data, for example, through the local area network LAN, and are used by one of more specific users.

The network facsimile device FX is provided with an e-mail processing function (including T.37 communication function) for exchanging image data and various reports through e-mails, a group 3 facsimile transmission function for transmitting image information in compliance with the group 3 facsimile transmission procedure through an analog public network PSTN, a group 4 facsimile transmission function for transmitting image information in compliance with the group 4 facsimile transmission procedure through a digital public network ISDN, and a T.38 communication function for real-time exchanging image information with another network facsimile device (not shown) through the local area network LAN and the internet INET. The network facsimile device FX is also provided with a communication function of color image information.

Figure 2:
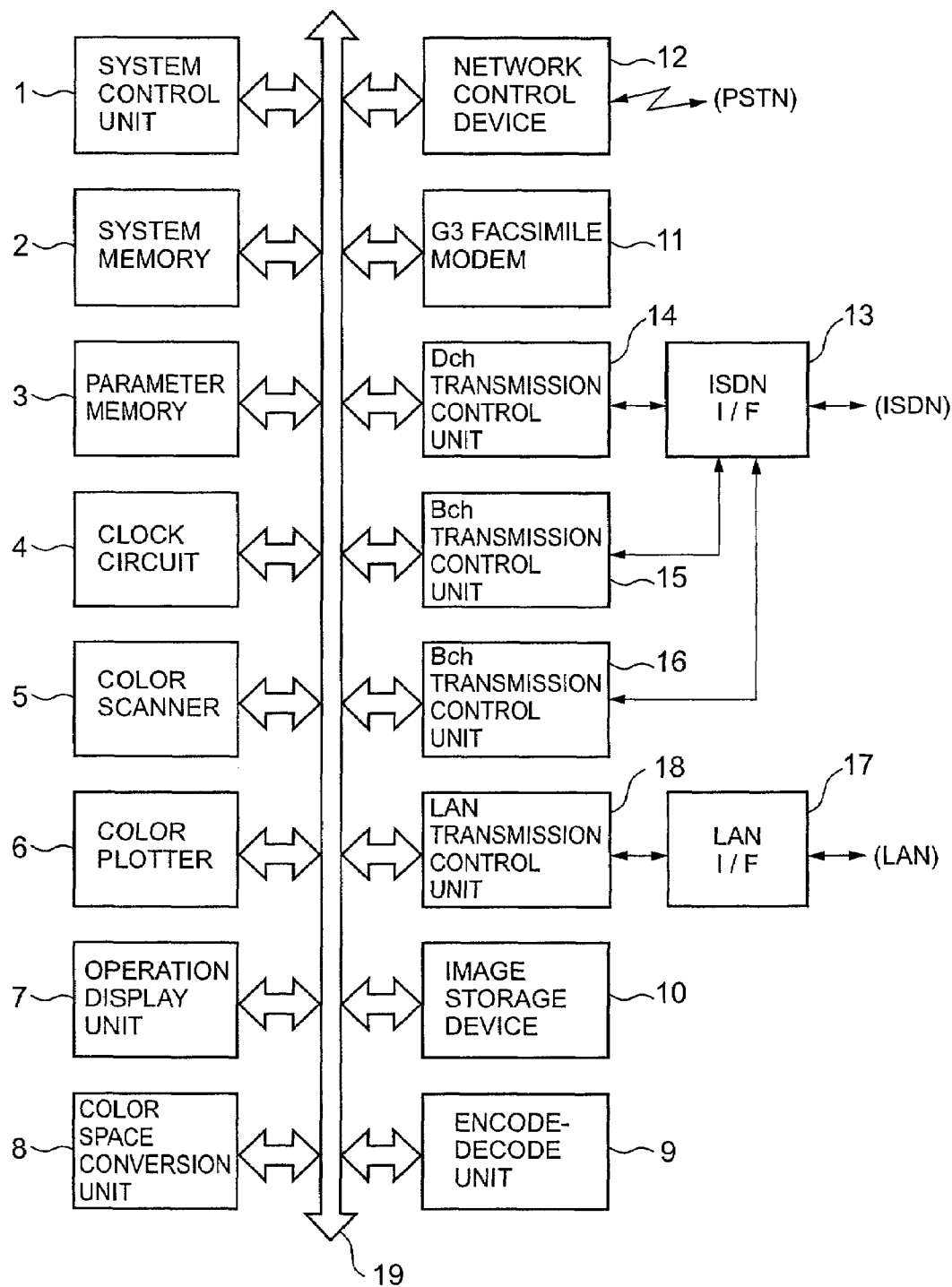
FIG. 2 illustrates a block diagram of a configuration of a network facsimile device FX.

FIG. 2 is a block diagram showing a configuration of a network facsimile device FX for example.

A system control unit 1 controls the other units of this network facsimile device FX, and controls various transactions such as a facsimile transmission procedure transaction. A system memory 2 stores a control program executed by the system control unit 1 and various data necessary for execution of the control program, and provides the system control unit 1 a working memory area. A parameter memory 3 stores a variety of information unique to this network facsimile device FX. A clock circuit 4 provides the present time information.

A color scanner 5 inputs a color image at a predetermined spatial resolution and a predetermined color resolution. A color plotter 6 outputs a monochrome image or a color image at a predetermined spatial resolution and a predetermined color resolution. An operation display unit 7 is a user interface unit including various operation buttons and various displays.

A color space conversion unit 8 converts RGB format color image data, input by the color scanner 5, into a color image data represented in a CIELAB color space (hereinafter referred to as "CIELAB image data") or a color image data represented in a YCbCr color space (hereinafter referred to as "YCbCr image data").

An encode-decode unit 9 encodes a monochrome image signal into monochrome image data by one of MH, MR, or MMR coding methods, and encodes color image data (CIELAB image data or YCbCr image data) into color image information by the JPEG coding method. The encode-decode unit 9, on the other hand, decodes the monochrome image data or the color image information into the original monochrome image signal or the original color image data, respectively. An image storage device 10 stores a mass of encoded monochrome image data and a mass of color image information.

A group 3 facsimile modem 11 has a modem function of a group 3 facsimile, and provides both a low speed modem function (V.21 modem) for exchanging a transmission procedure signal and a high speed modem function (V.17 modem, V.34 modem, V.29 modem, V.27ter modem etc.) for mainly exchanging image information.

A network control unit 12 connects this network facsimile device FX to an analog public network PSTN, and automatically transmits and receives a call.

An ISDN interface circuit 13 connects this network facsimile device FX to a digital public network ISDN, and provides a layer 1 signal processing function and a signal unification/separation function of a D channel (a signal channel) signal and two B channels (information channels) signals. A D channel transmission control unit 14 performs a D channel signal processing of ISDN, such as setting up a call and disconnecting a call. Two B channel transmission control units 15 and 16 perform group 4 facsimile transmission procedure.

A local area network interface circuit 17 connects this network facsimile device FX to the local area network LAN. A local area network transmission control unit 18 performs communication control transactions of various predetermined protocol suite for exchanging various data with another data terminal device through the local area network LAN. A real-time communication function of a T.38 communication function is performed by this local area network transmission control unit 18.

The system control unit 1, the system memory 2, the parameter memory 3, the clock circuit 4, the color scanner 5, the color plotter 6, the operation display unit 7, the color space conversion unit 8, the encode-decode unit 9, the image storage device 10, the group 3 facsimile modem 11, the network control device 12, the D channel transmission control unit 14, the B channel transmission control units 15 and 16, and the local area network transmission control unit 18 are connected to the internal bus 19. These system components mainly exchange data through this internal bus 19.

The network control unit 12 and the group 3 facsimile modem 11, however, exchange data directly.

In this embodiment, system components connected to the local area network LAN basically exchange data based on a combination of so-called TCP/IP, which is a set of transmission protocol covering up to a transport layer, and a communication protocol for upper layers than the transport layer (so-called protocol suite). For example, a communication protocol called SMTP (Simple Mail Transfer Protocol) is used for exchanging e-mail data as an upper layer communication protocol for an e-mail.

When each terminal device inquires the mail server SM for arrival of an e-mail addressed to a user, or requests the mail server SM for collection of an e-mail, so-called POP (Post Office Protocol) is applicable.

Communication protocols such as TCP/IP, SMTP, and POP, and data format and data structure of an e-mail are specified by respective RFC documents issued by IETF. For example, TCP, IP, and SMTP are specified by RFC793, RFC791, RFC821, respectively. Data structure of an e-mail is specified by RFC822, RFC1521, and RFC1522 (Multi Purpose Mail Extension format, or MIME format).

With respect to a facsimile communication, T.37 communication method is specified by ITU-T recommendation T.37, and T.38 communication method is specified by ITU-T recommendation T.38.

The network facsimile device FX can transmit input image to another group 3 facsimile device through an analog public network PSTN (group 3 facsimile communication function), and to another group 4 facsimile device through the digital public network ISDN (group 4 facsimile communication function). The network facsimile device FX can transmit input image, by setting up real-time direct session, to another network facsimile device through a local area network LAN and, further, through the internet (T.38 communication function), and can transmit input image, by sending an e-mail, to users of the workstation device WS1-WSn or another network facsimile device FX through a local area network LAN and, further, through the internet (T.37 communication function).

The network facsimile device FX receives image information from another group 3 facsimile device or another group 4 facsimile device through the analog public network PSTN and the digital public network ISDN, respectively, and transfers the received image data, by sending an e-mail, to users corresponding to specified sub-addresses. On the contrary, the network facsimile device FX receives image information contained in an e-mail from a workstation WS connected to the local area network LAN, and transfers the image information to a specified group 3 facsimile device connected to an analog public network PSTN (transfer service function).

When the network facsimile device FX receives an e-mail containing image information, the network facsimile device FX takes out the image information from a body of the e-mail, and print out the image information.

It should be noted that image information is binary data which cannot be put into an e-mail without data conversion. The image information must be converted, by applying a predetermined conversion method (Base 64 coding method for example), into readable information (7 bit character code) before being stored in a body of the e-mail. Such body format of the e-mail is called MIME format.

Figure 3:
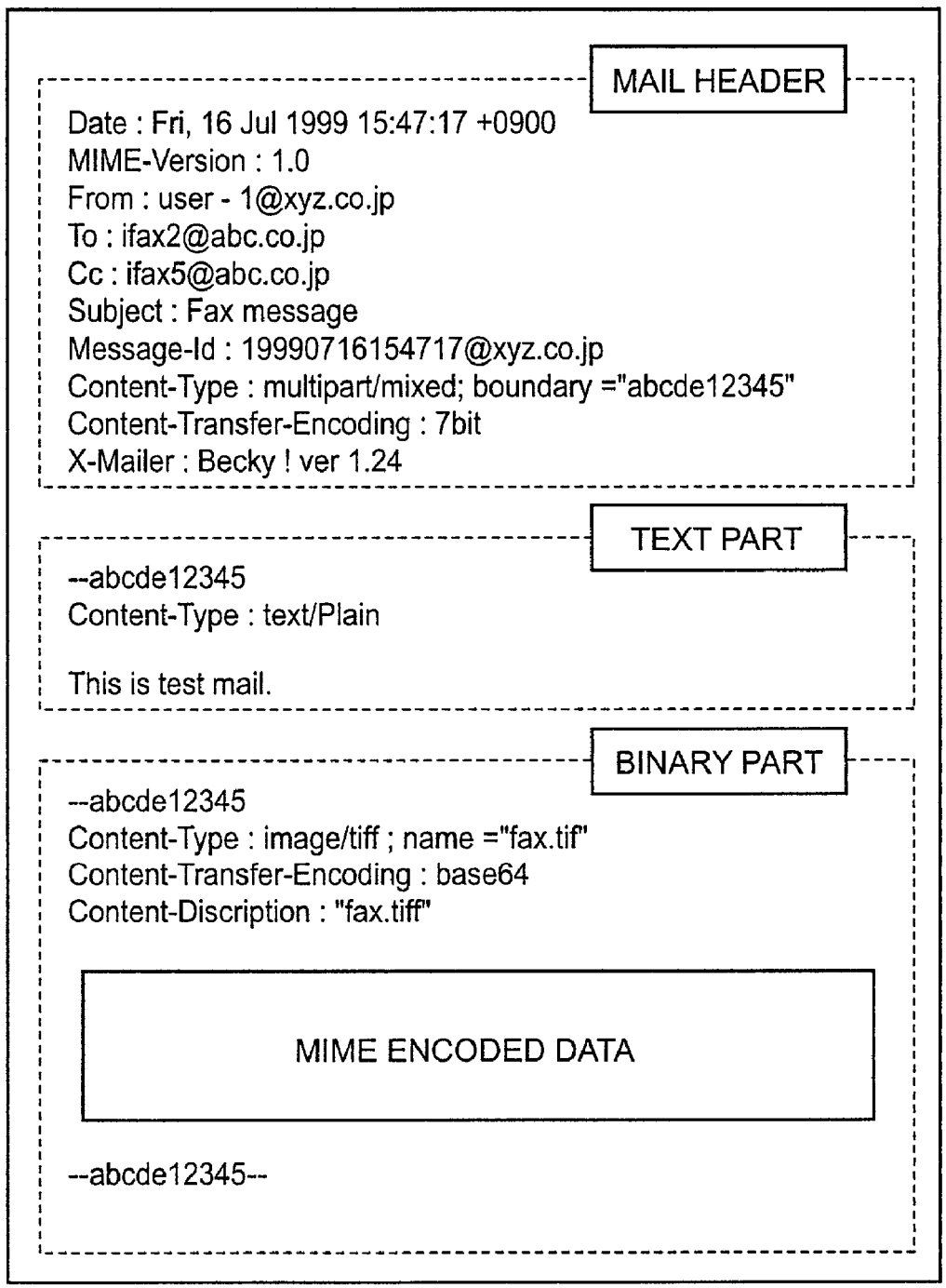
FIG. 3 illustrates an e-mail for transmitting facsimile image information, for example.
Figure 4A:
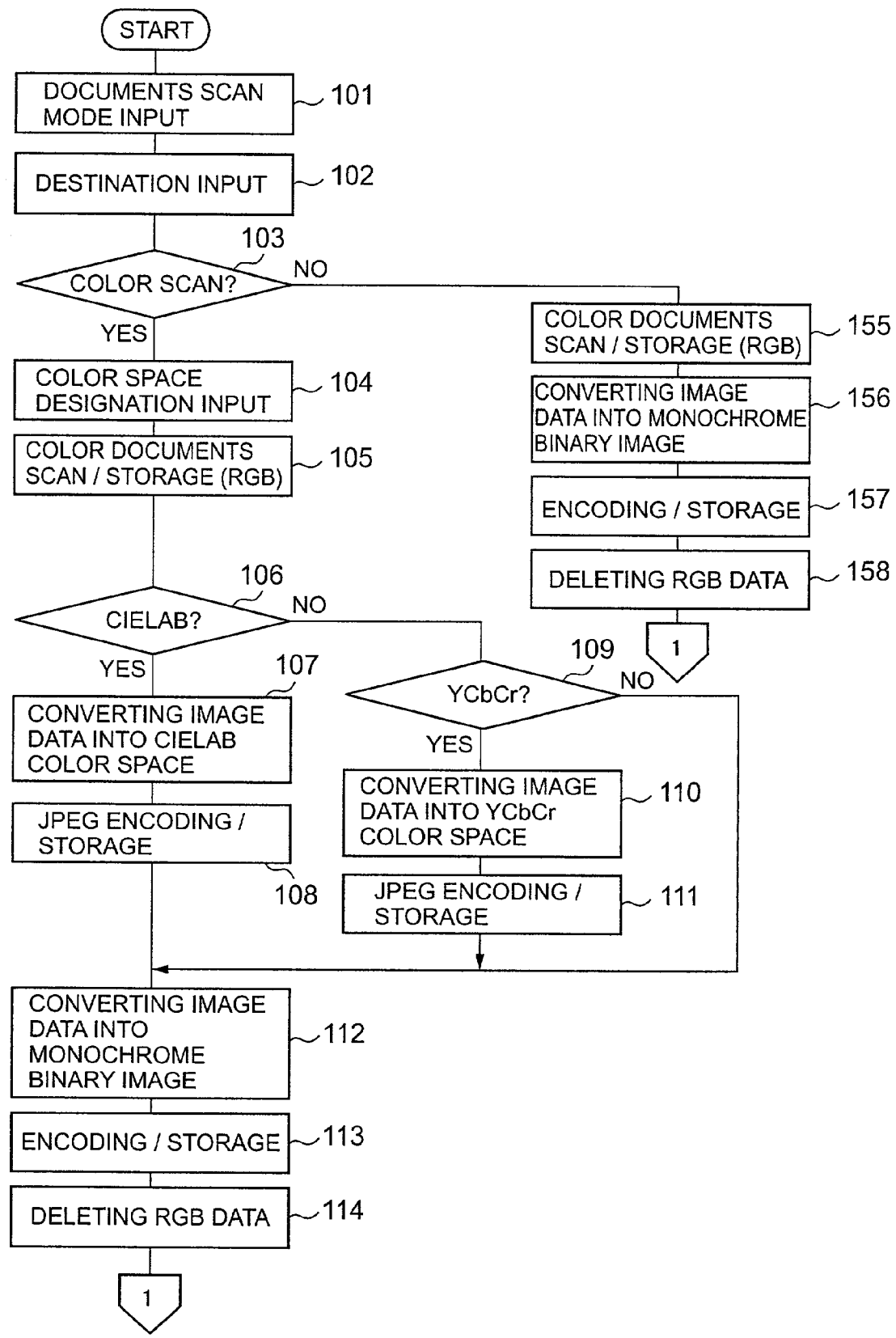
Figure 4B:
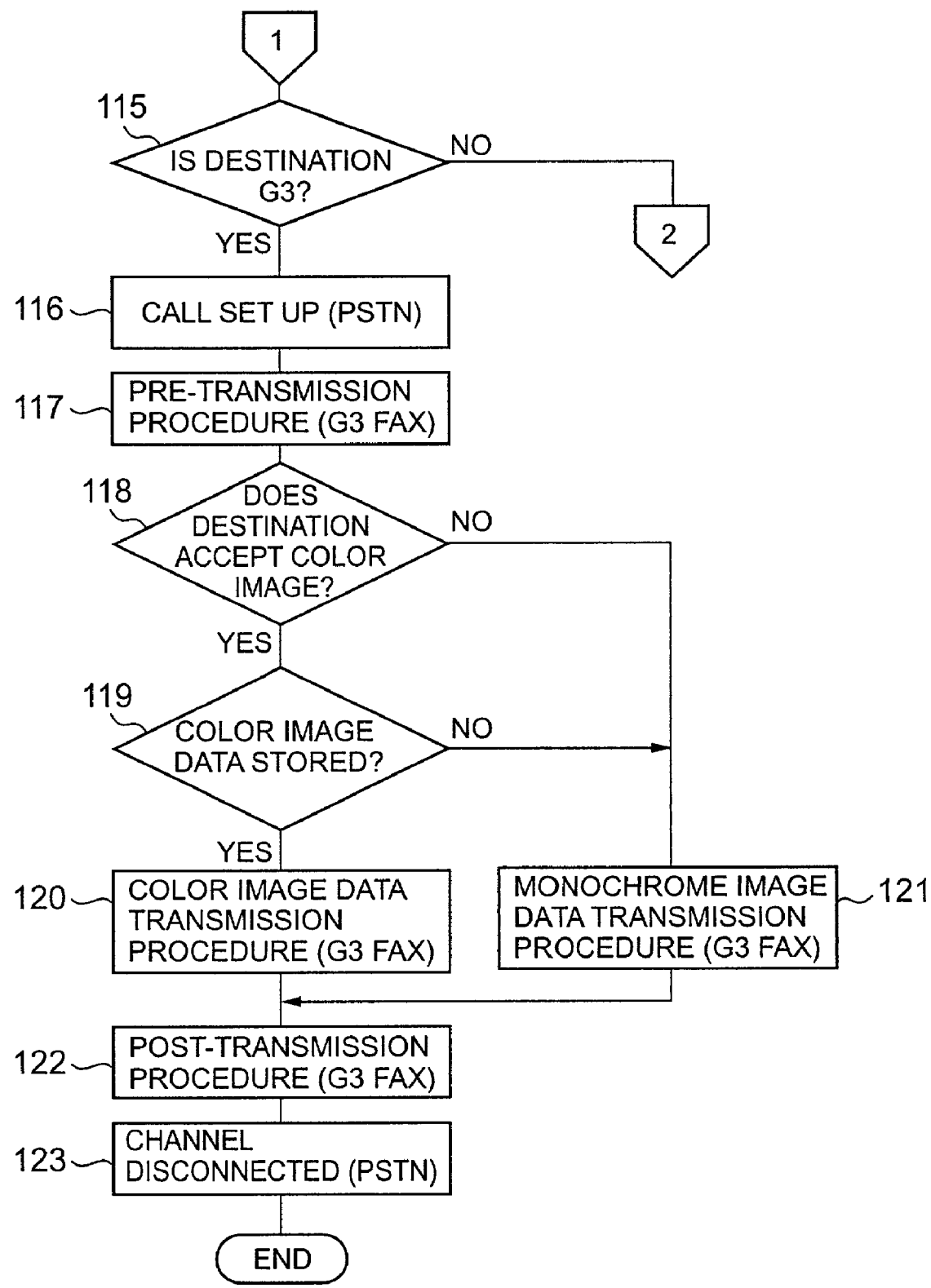
Figure 4C:
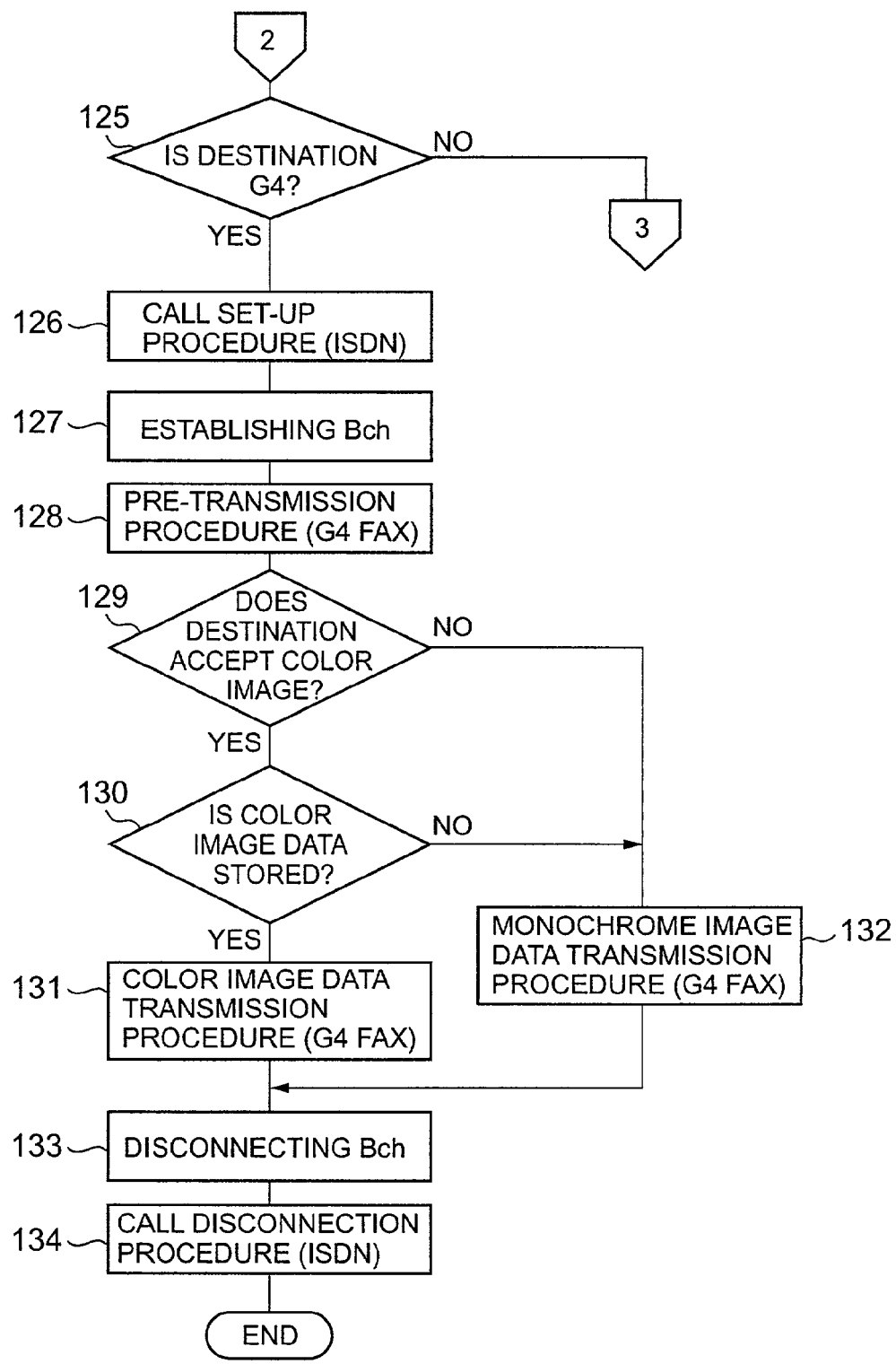
Figure 4E:
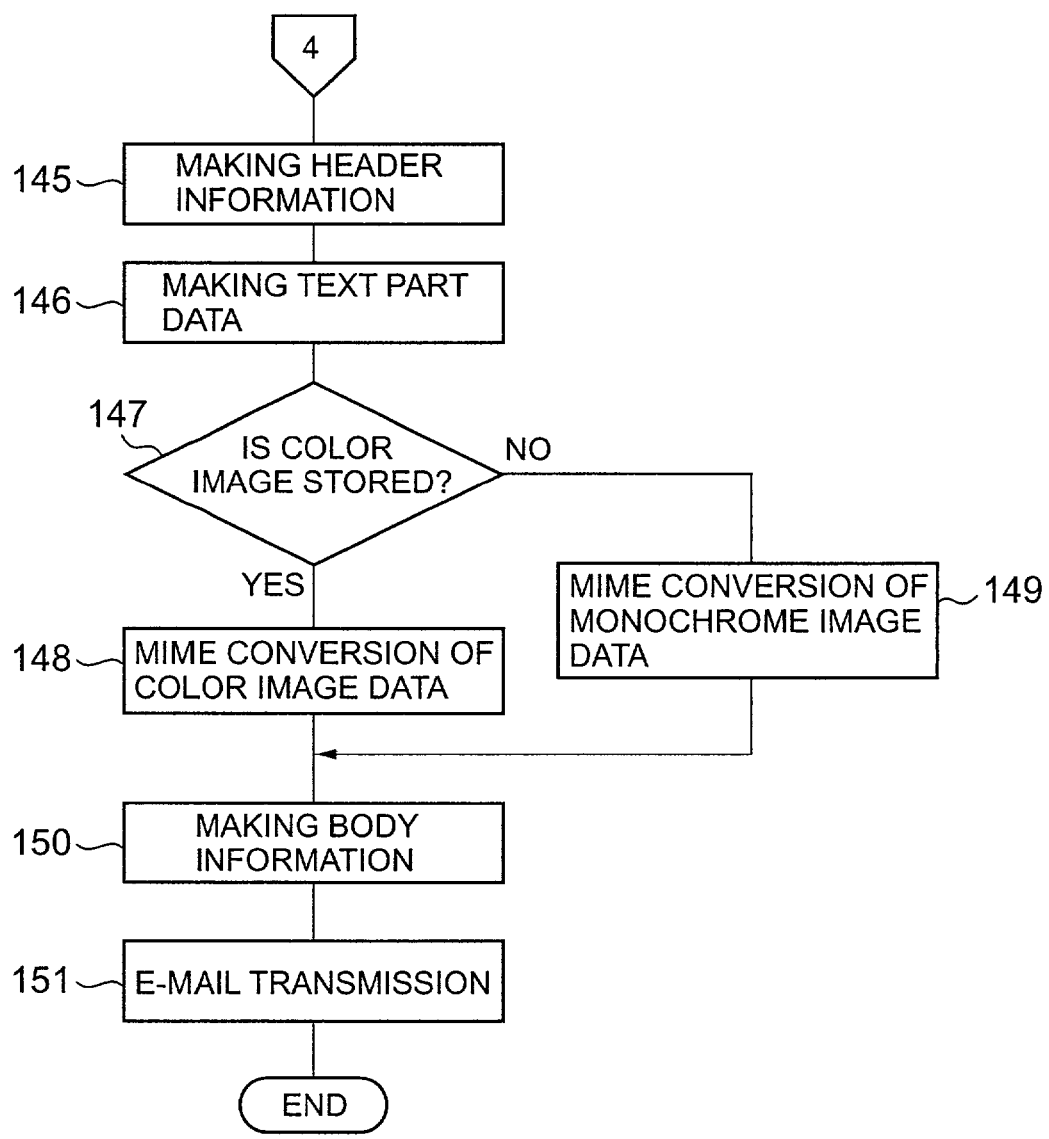
Figure 6A:
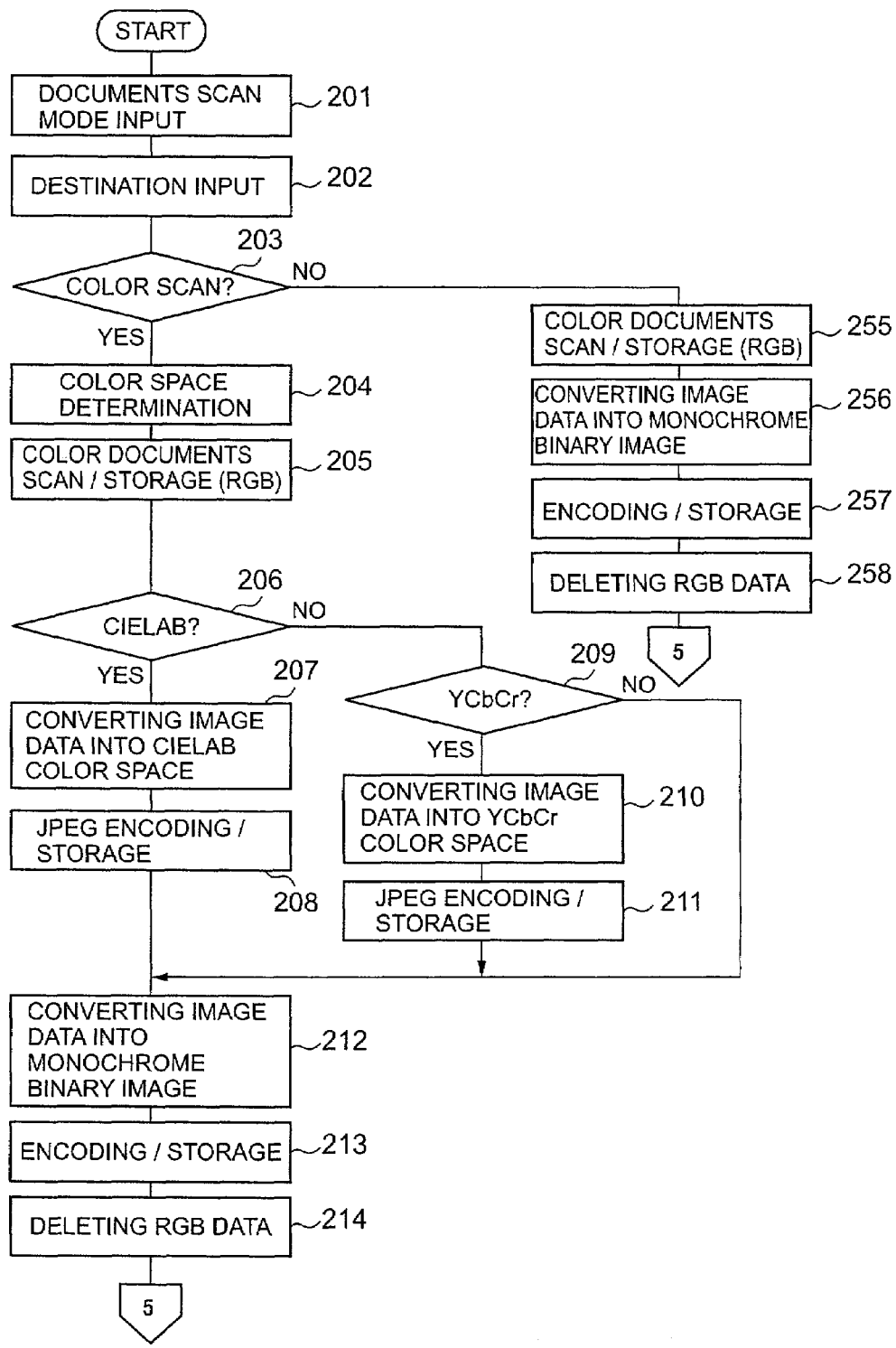
Figure 6B:
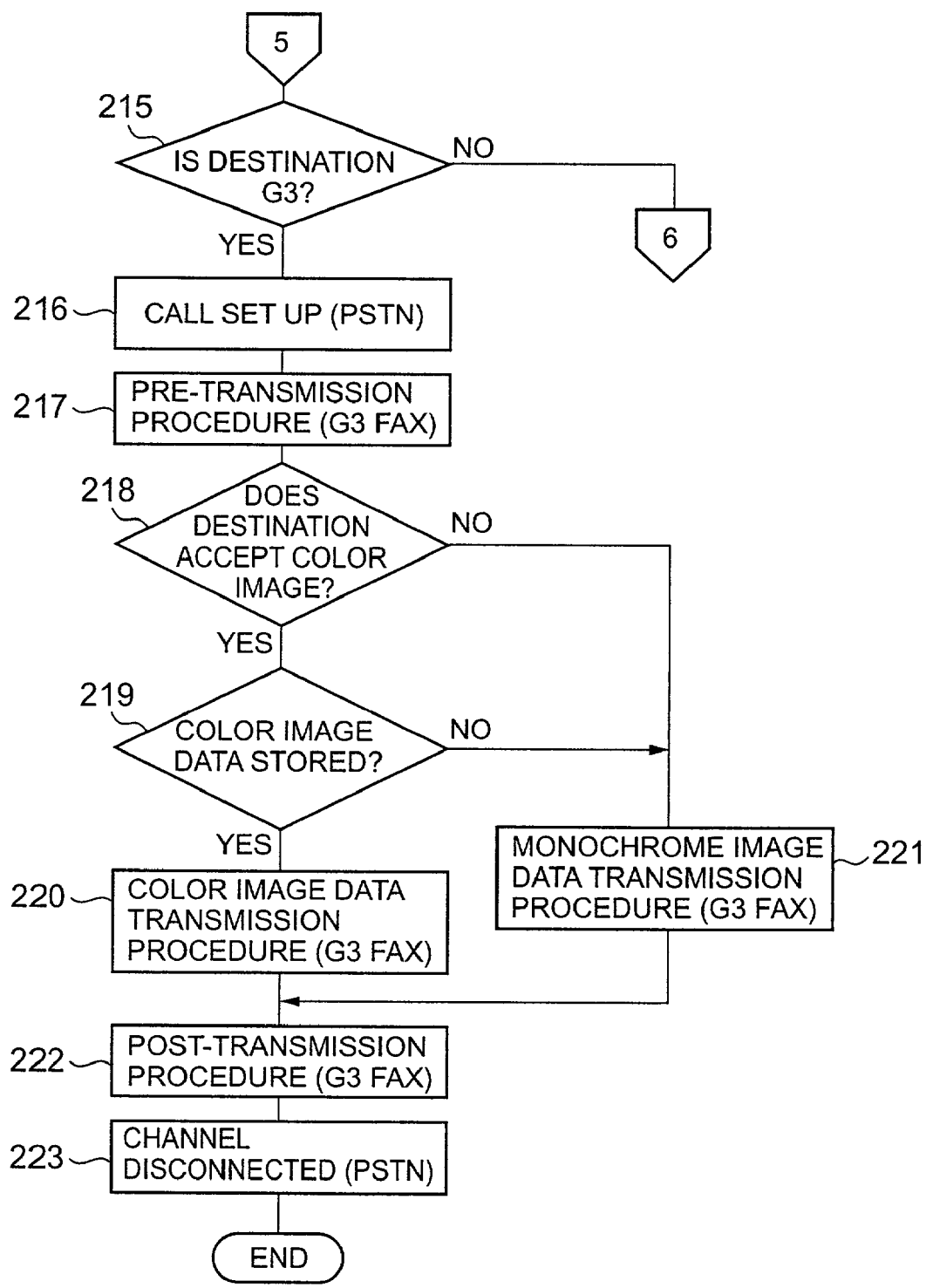
Figure 6C:
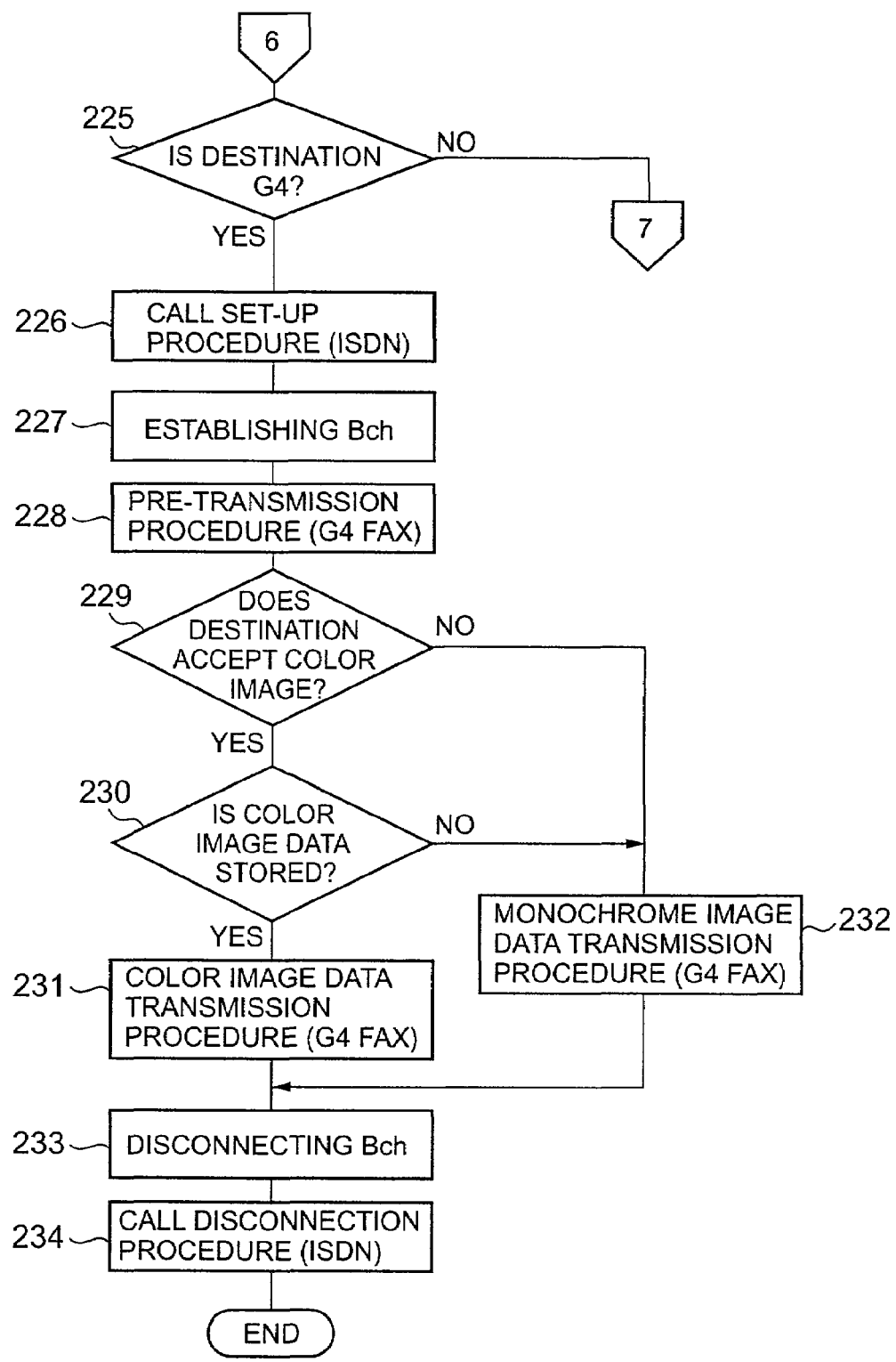
Figure 7A:
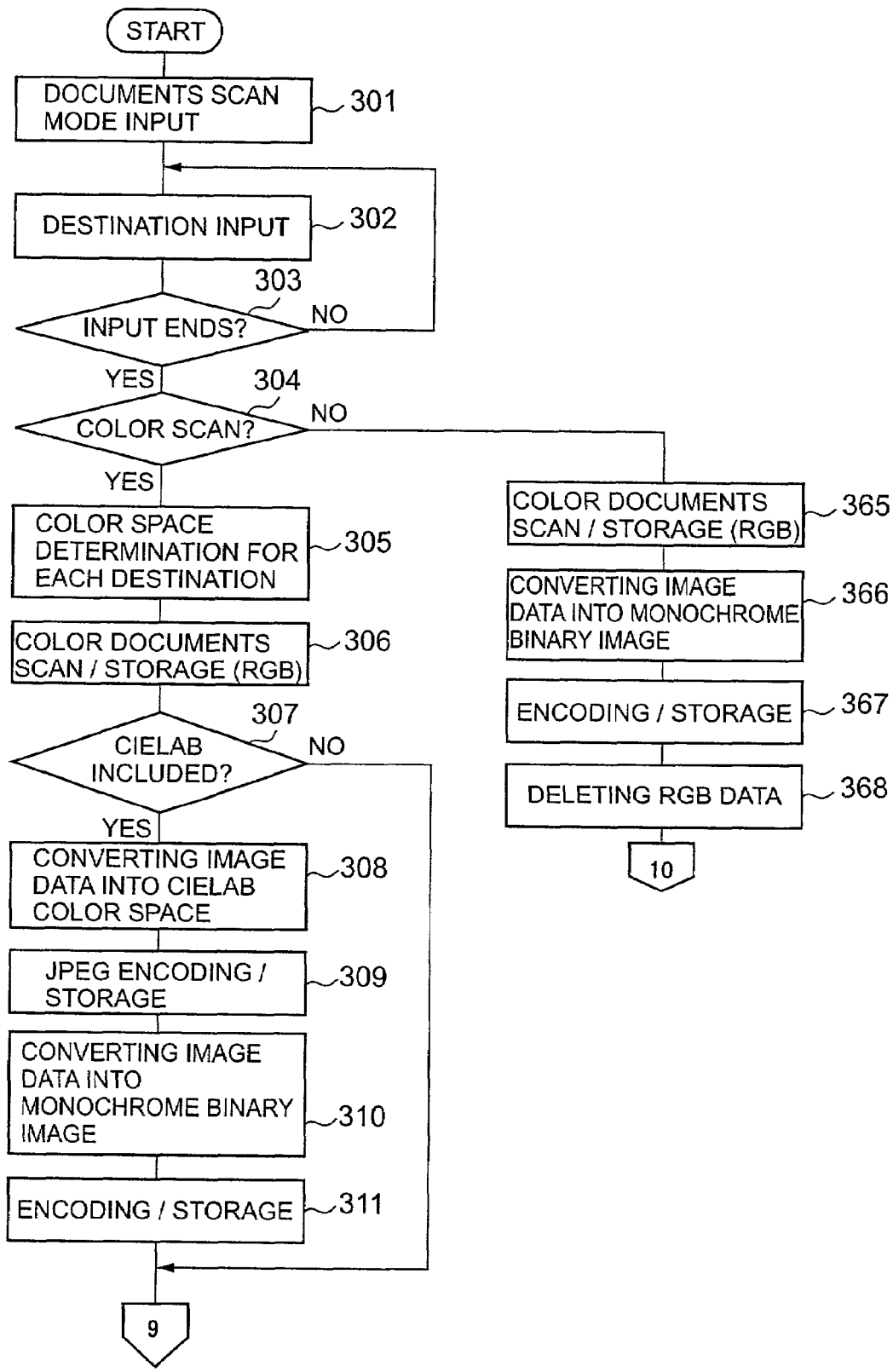
FIGS. 7A through 7E illustrates a flowchart of image information transmission transaction, as yet another example.
Figure 7B:
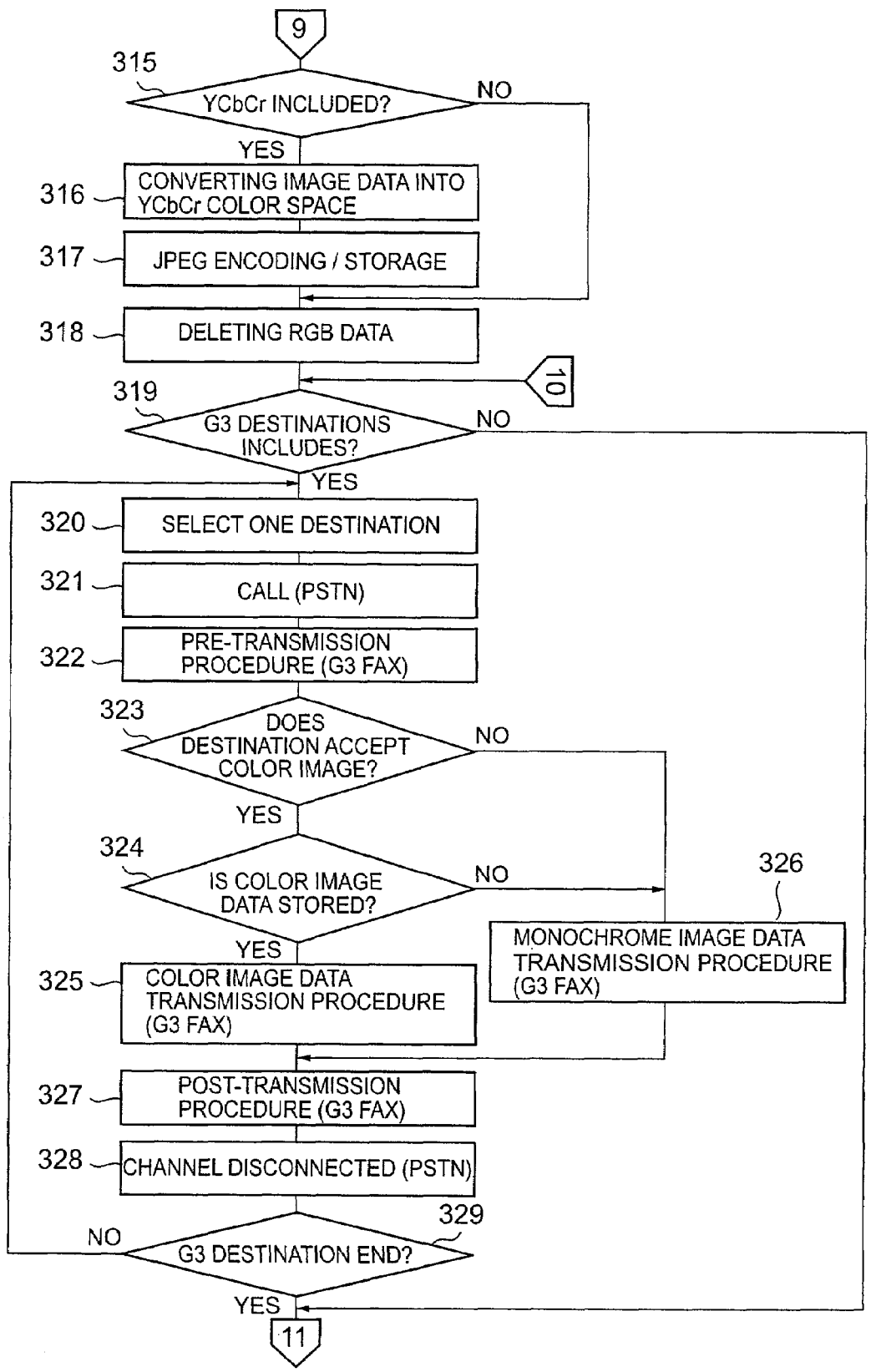
Figure 7C:
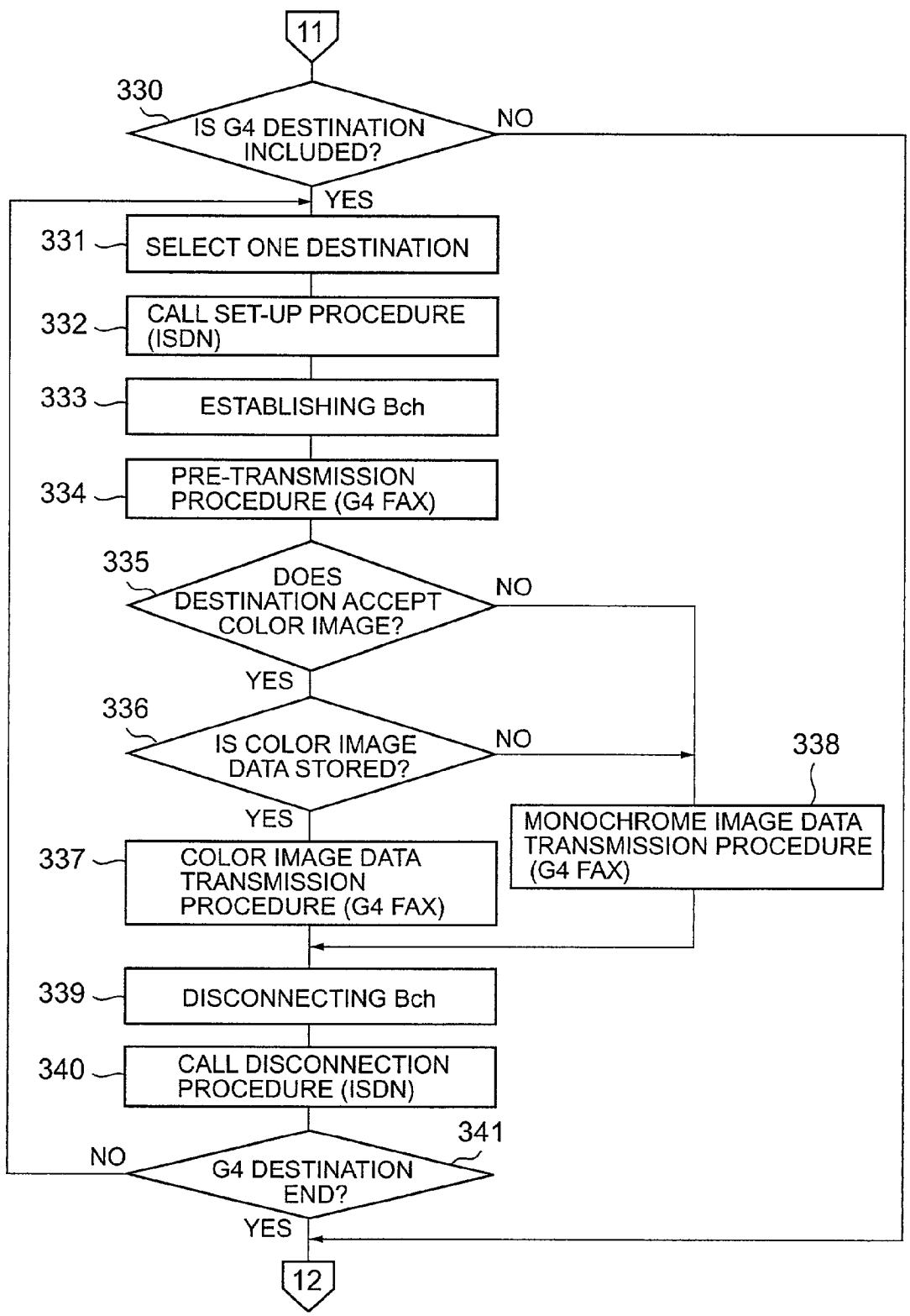
Figure 7D:
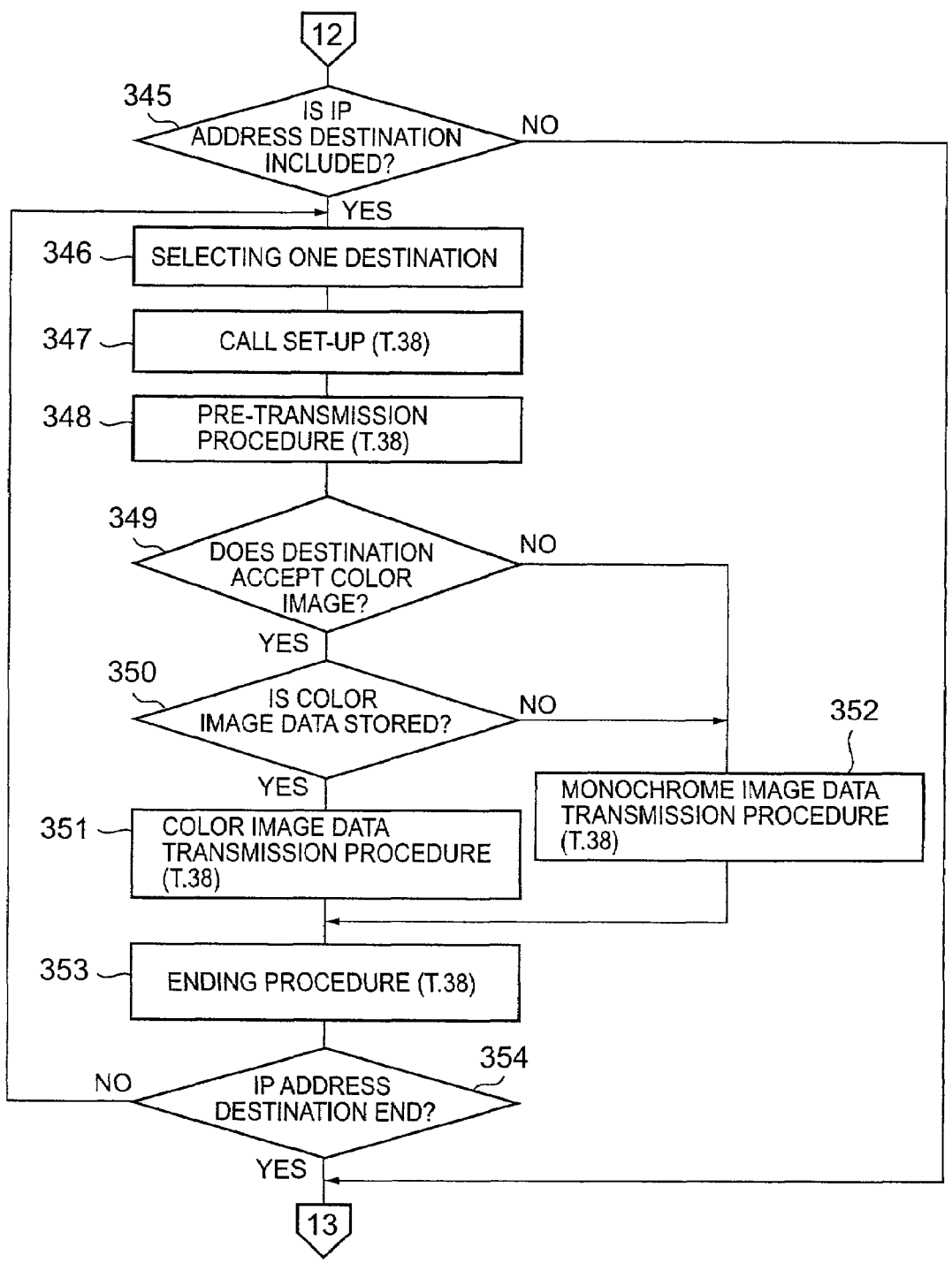
Figure 7E:
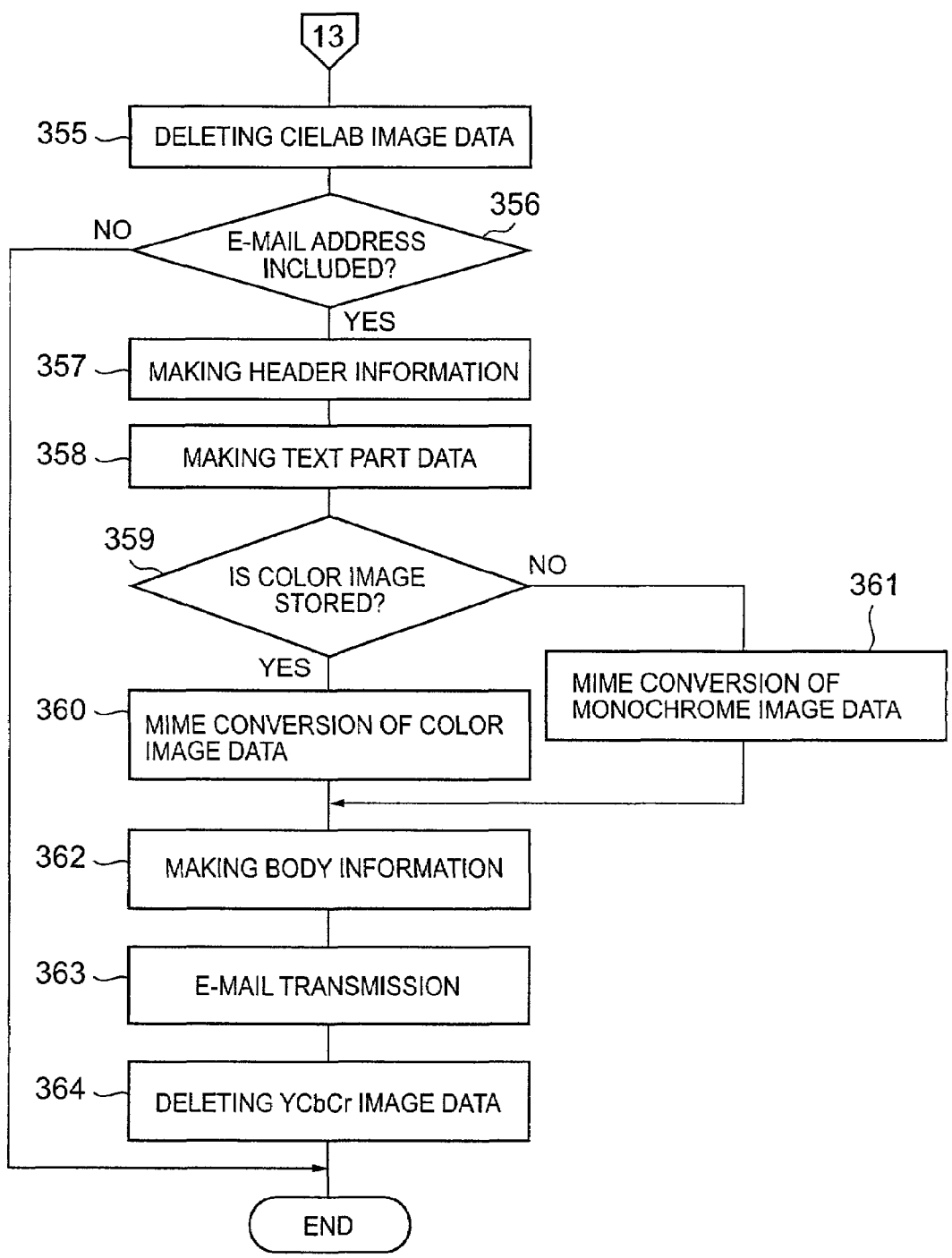
Figure 8A:
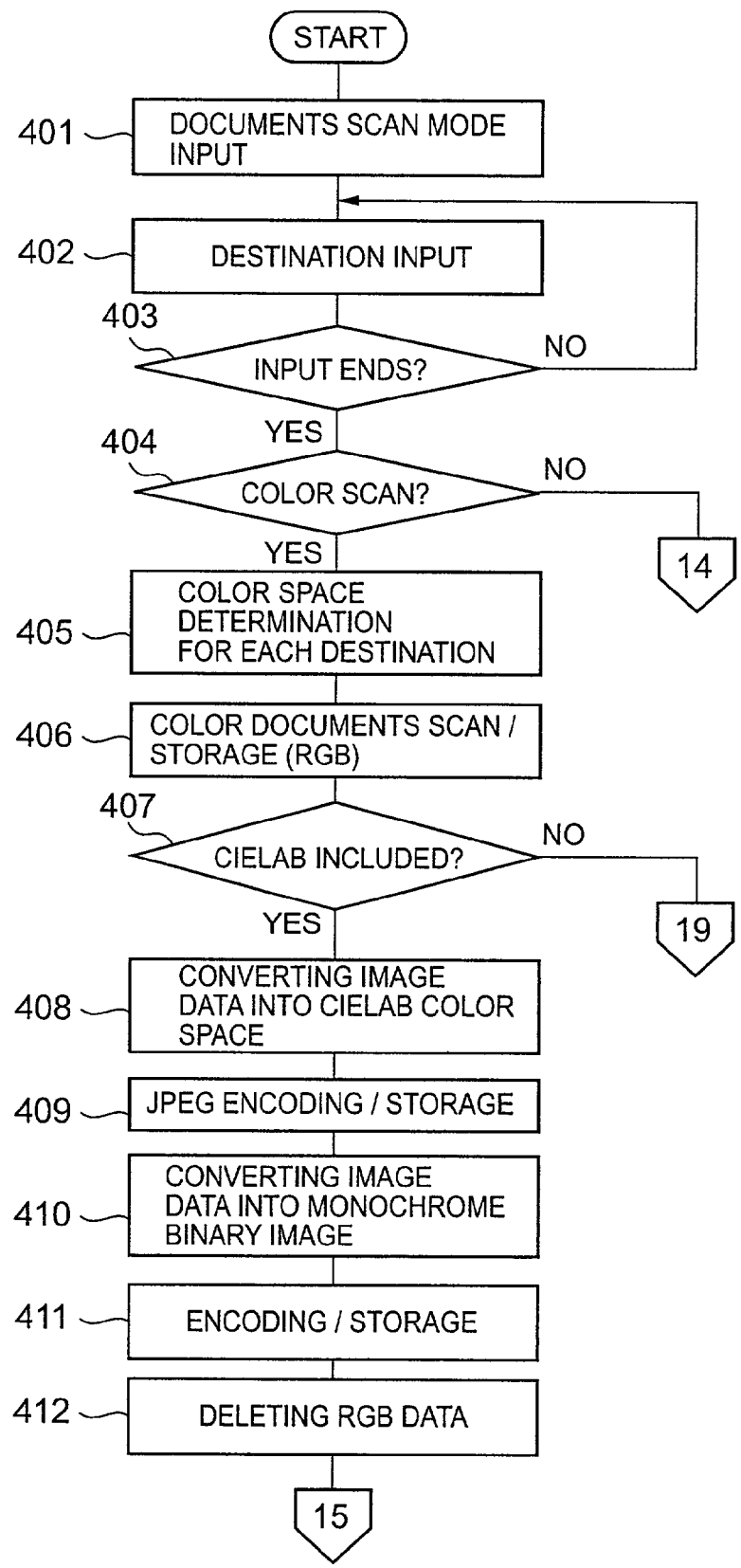
Figure 8B:
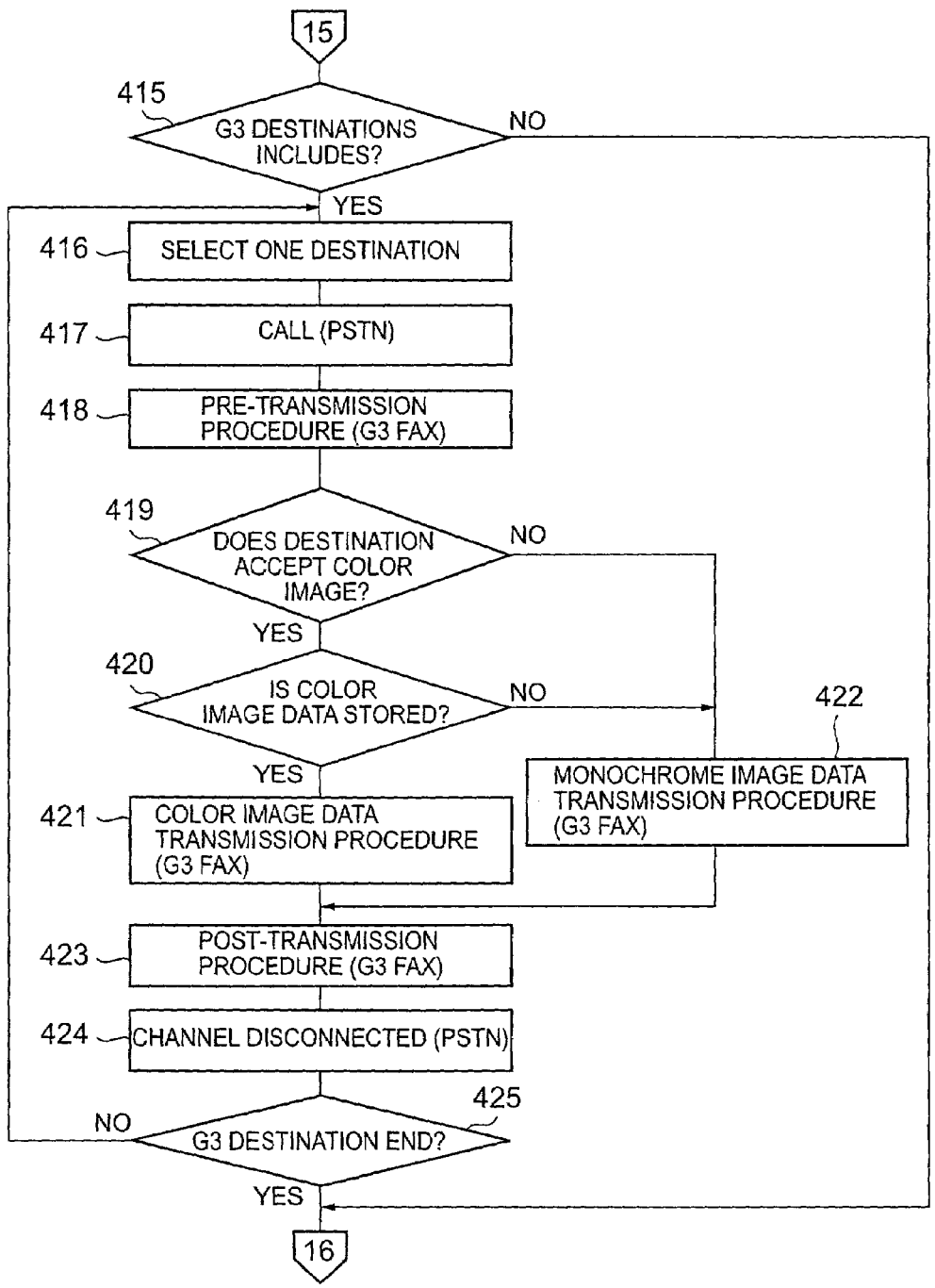
Figure 8C:
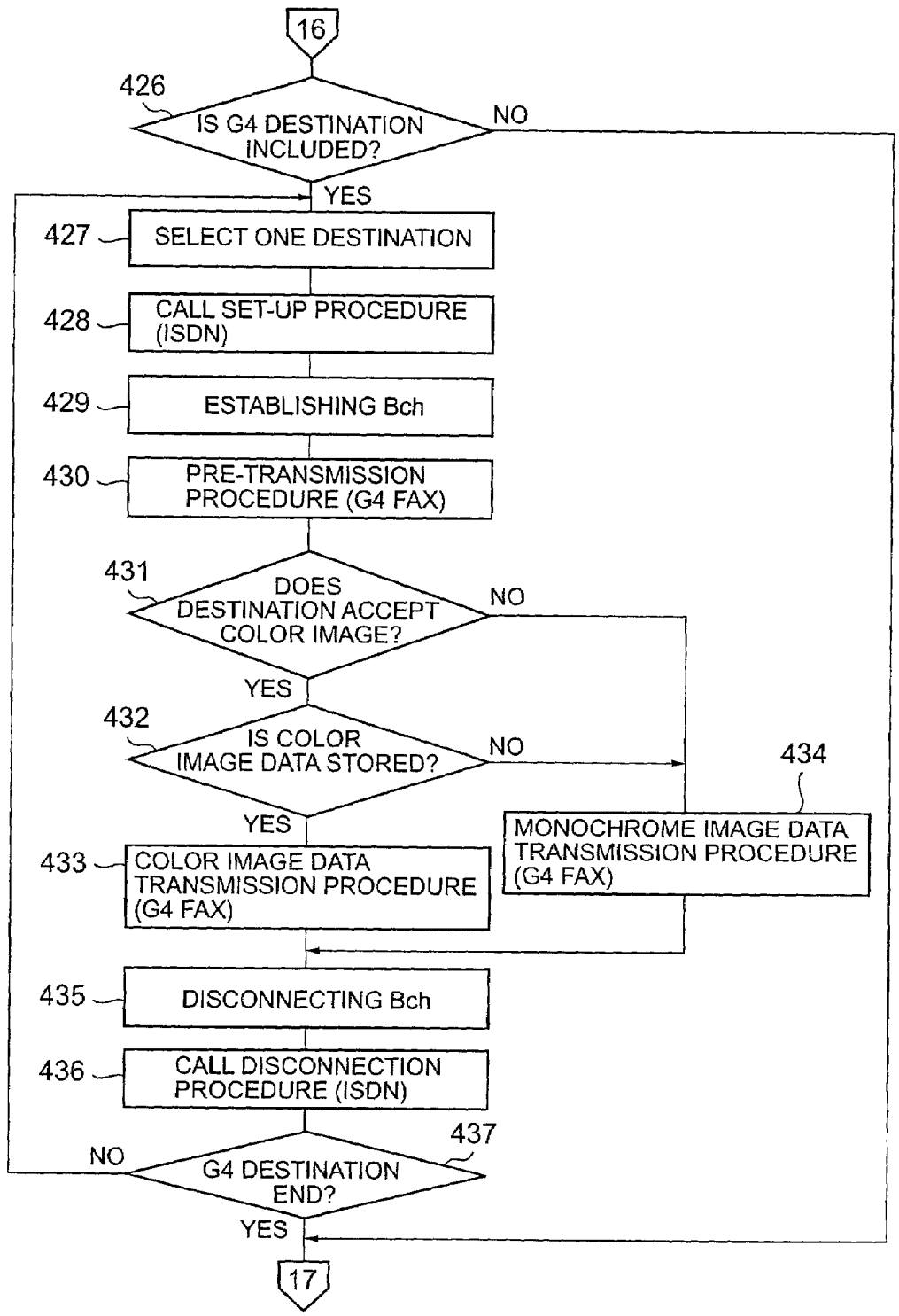
Figure 8D:
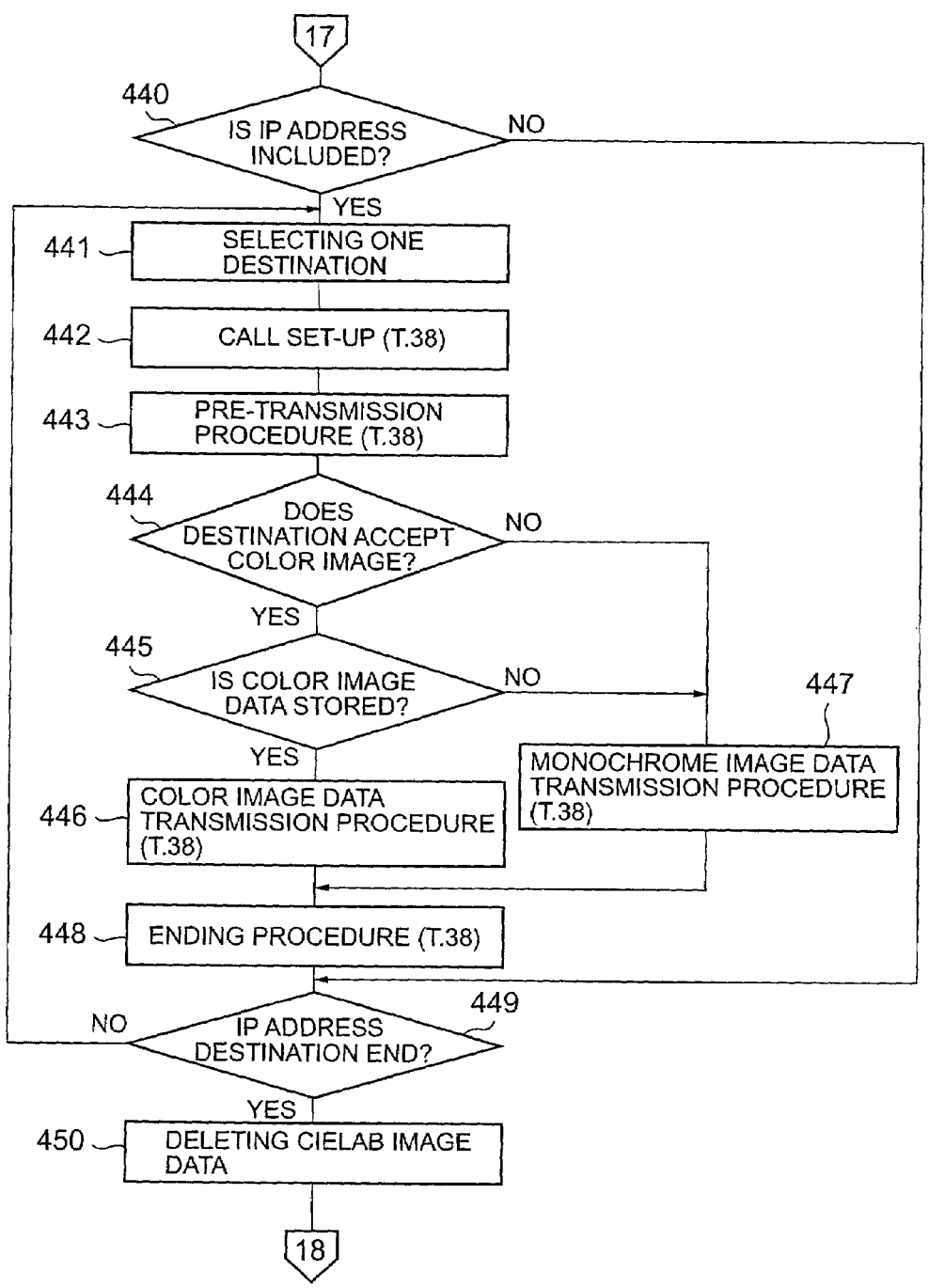
Figure 8E:
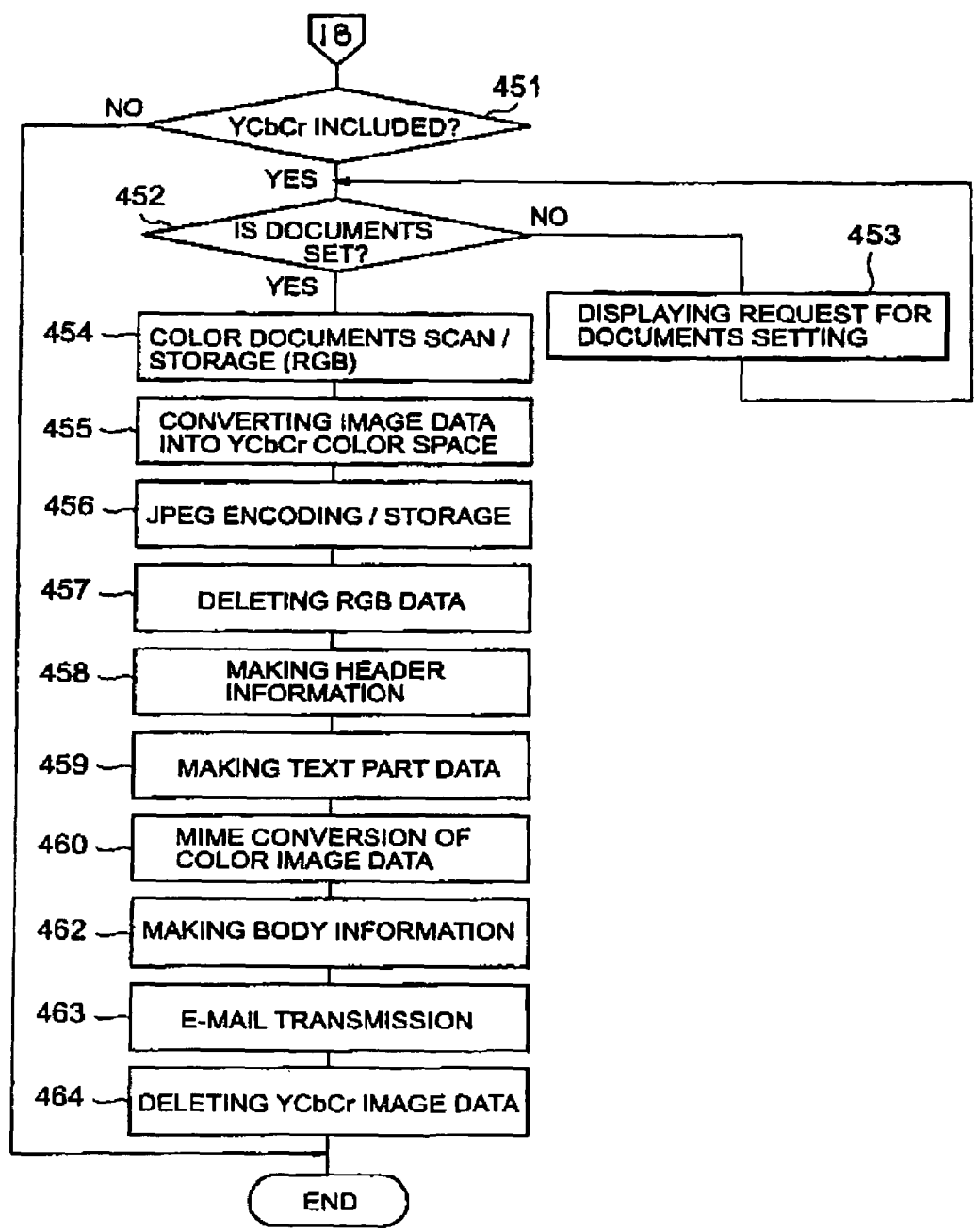
Figure 8F:
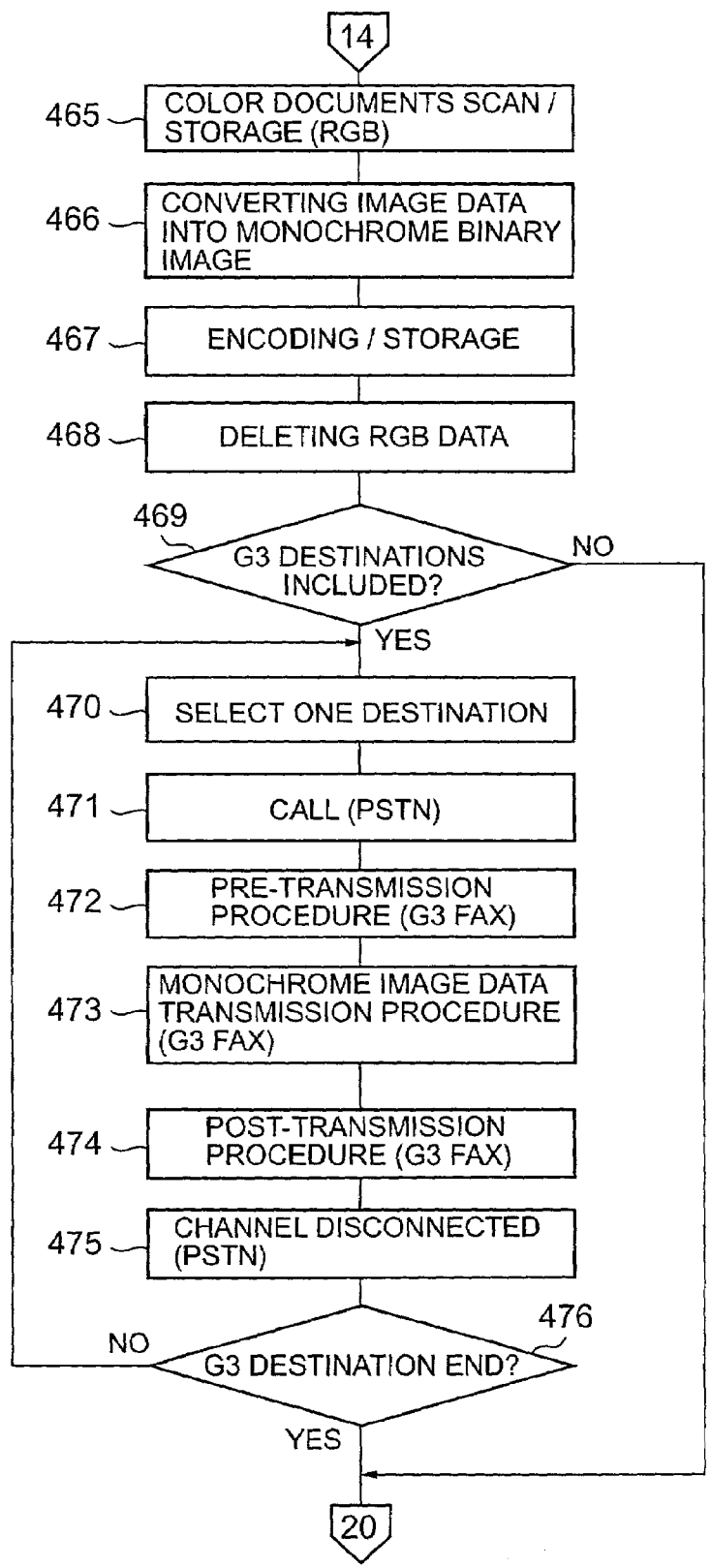
Figure 8G:
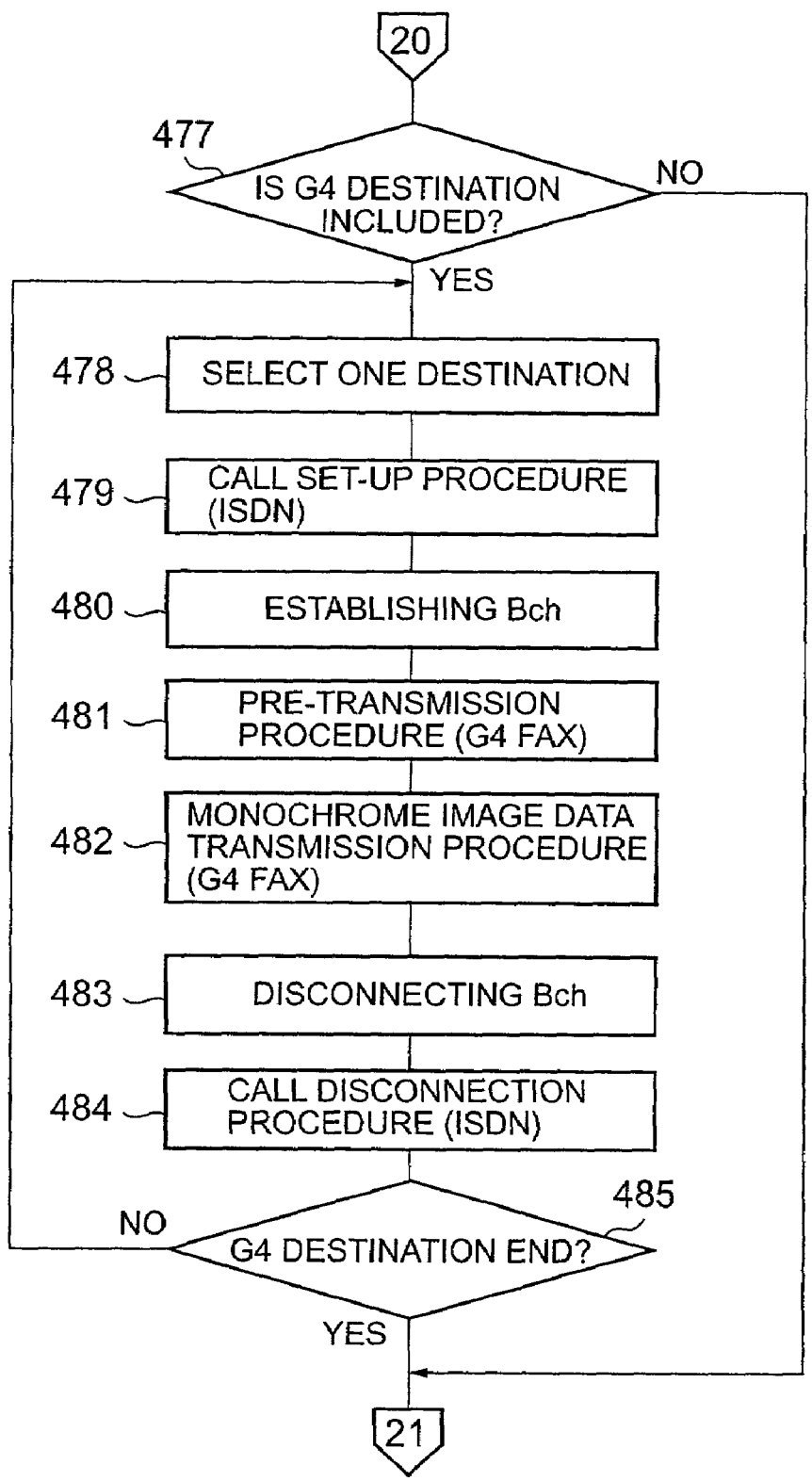
Figure 8H:
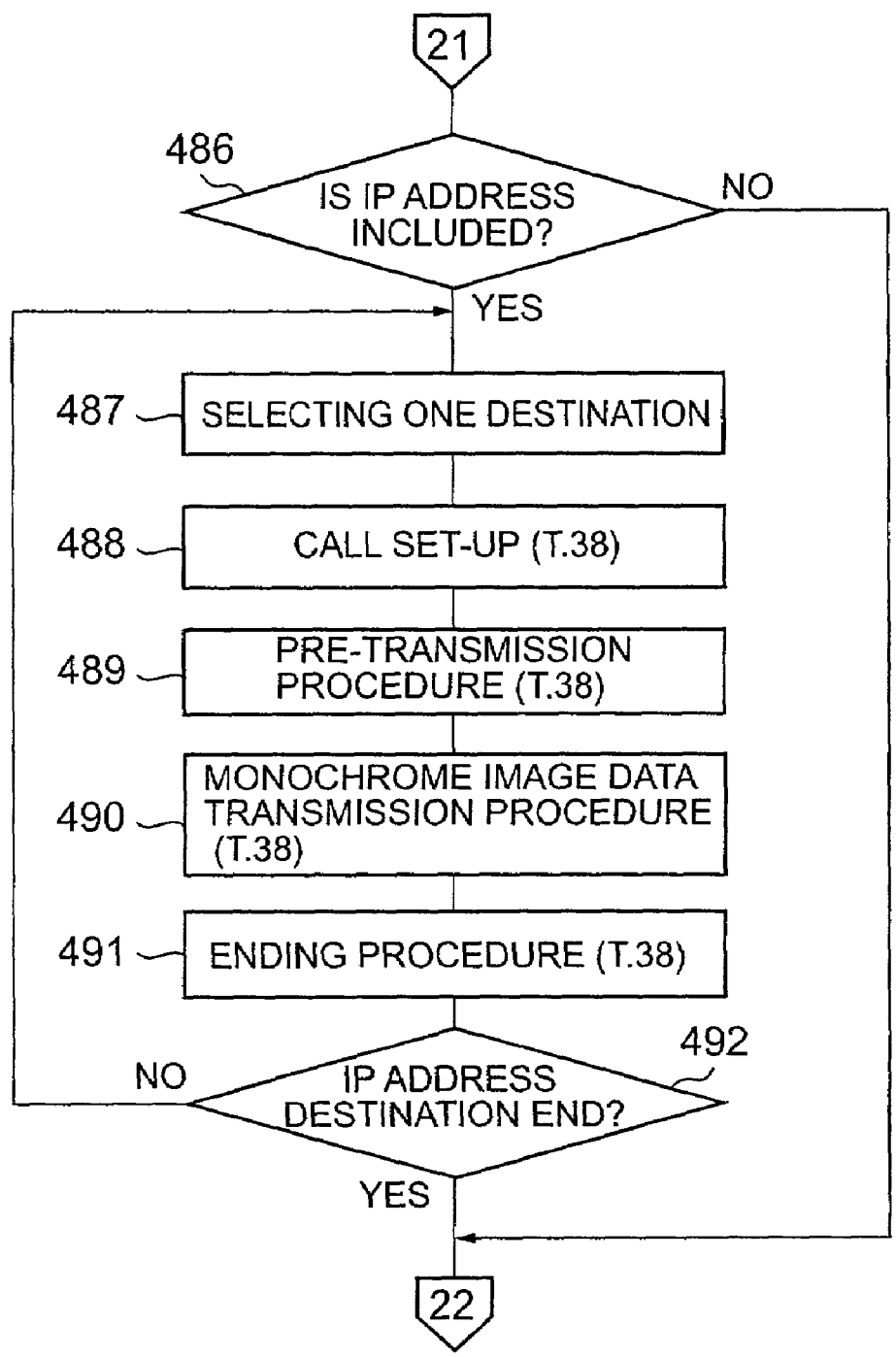
Figure 81:
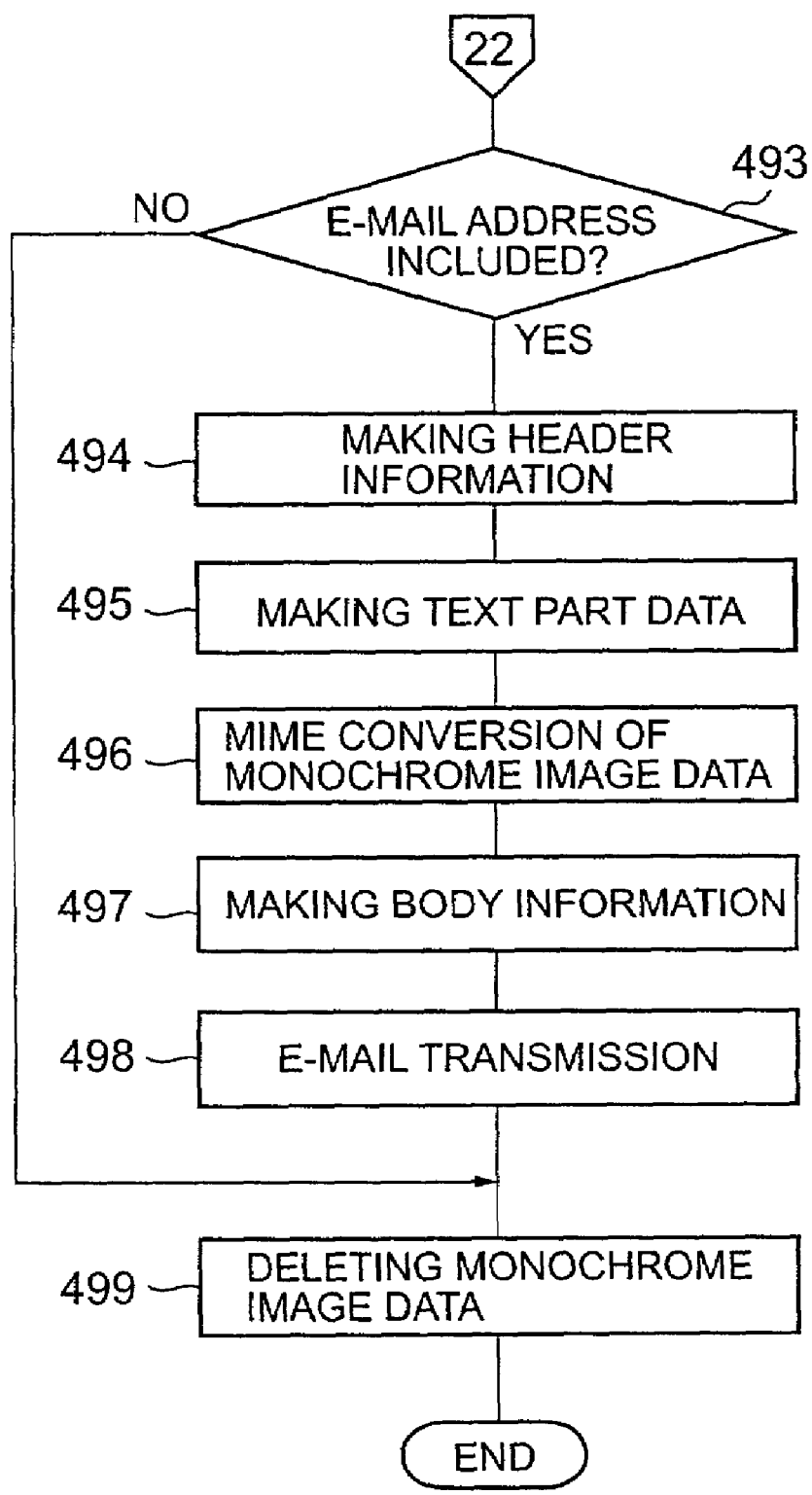
Figure 9A:
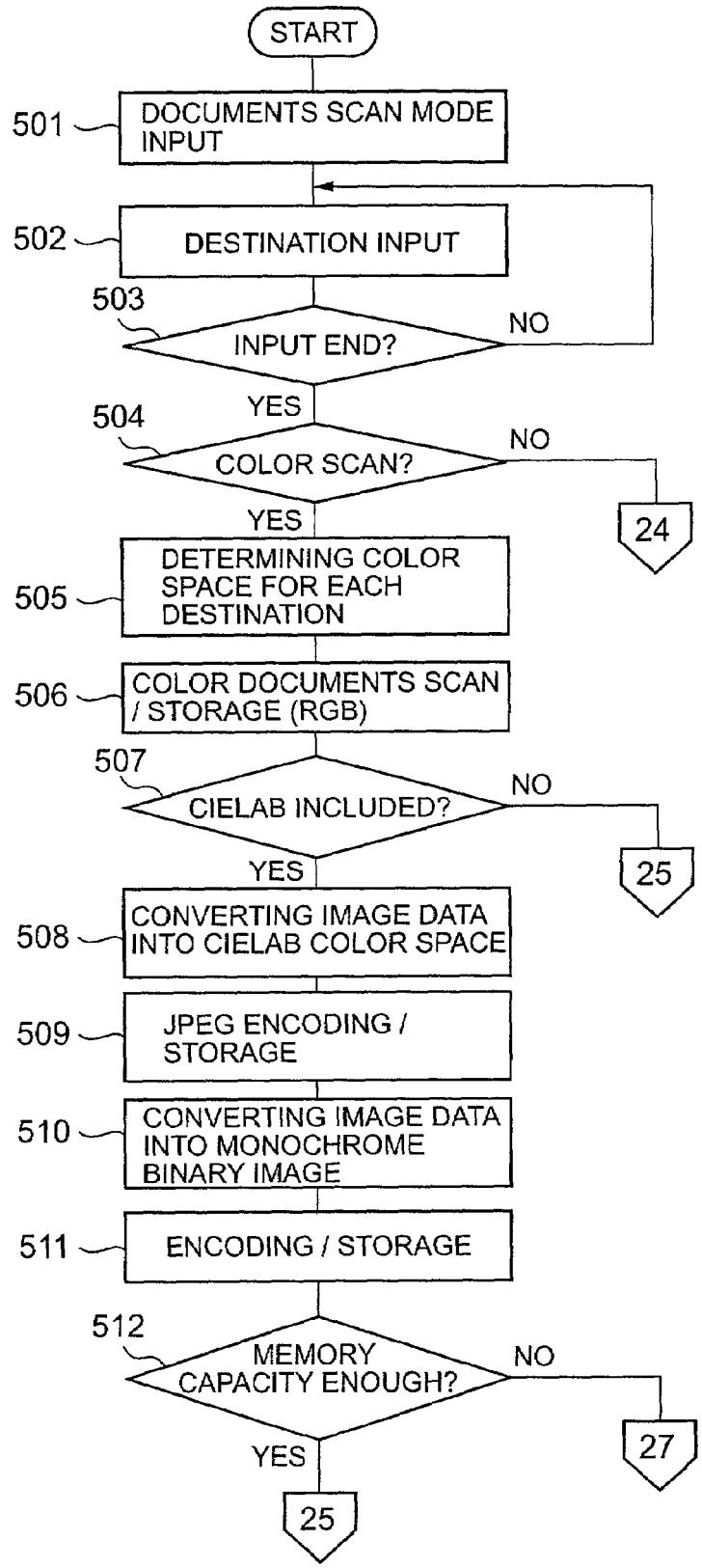
Figure 9B:
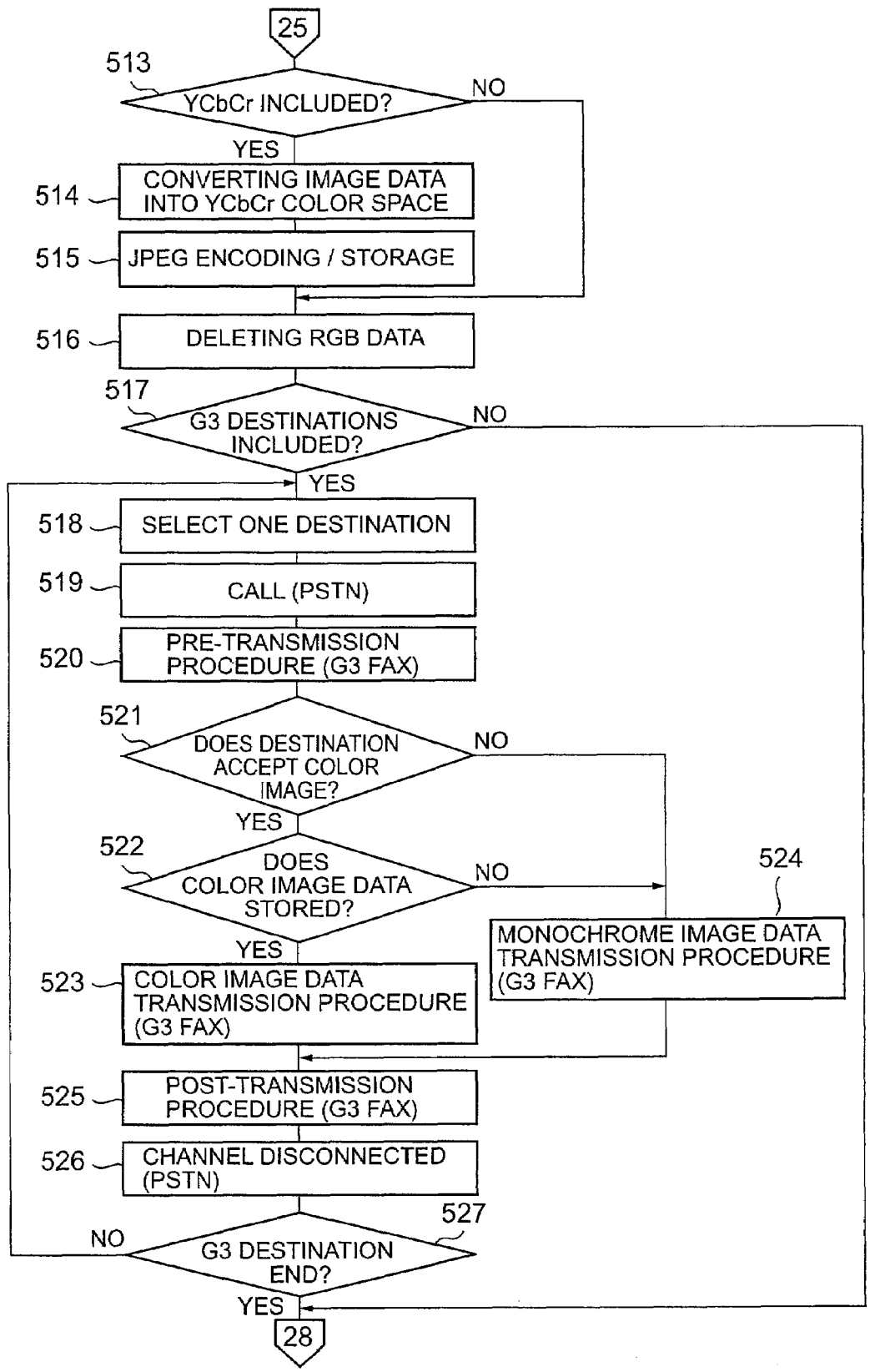
Figure 9C:
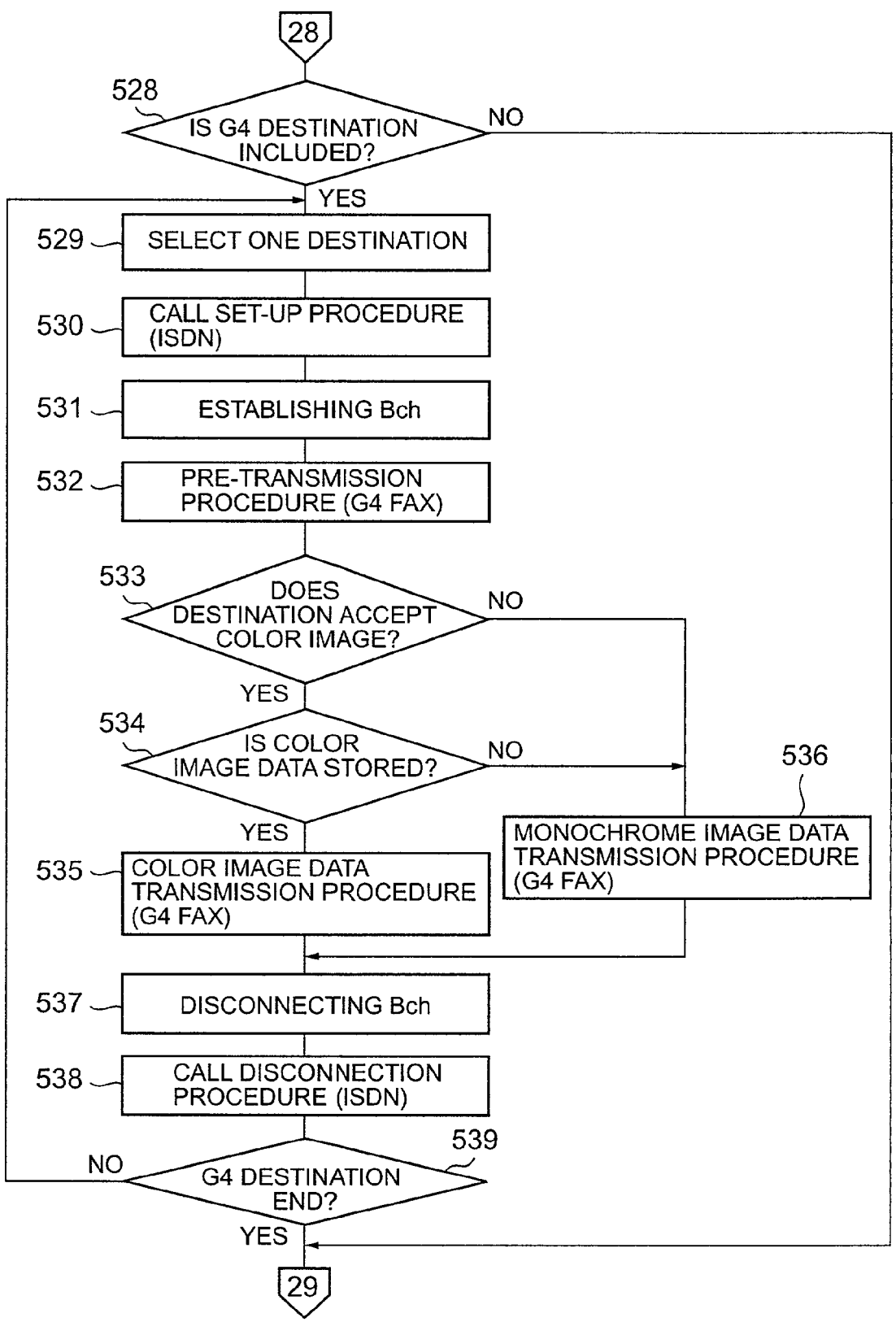
Figure 9D:
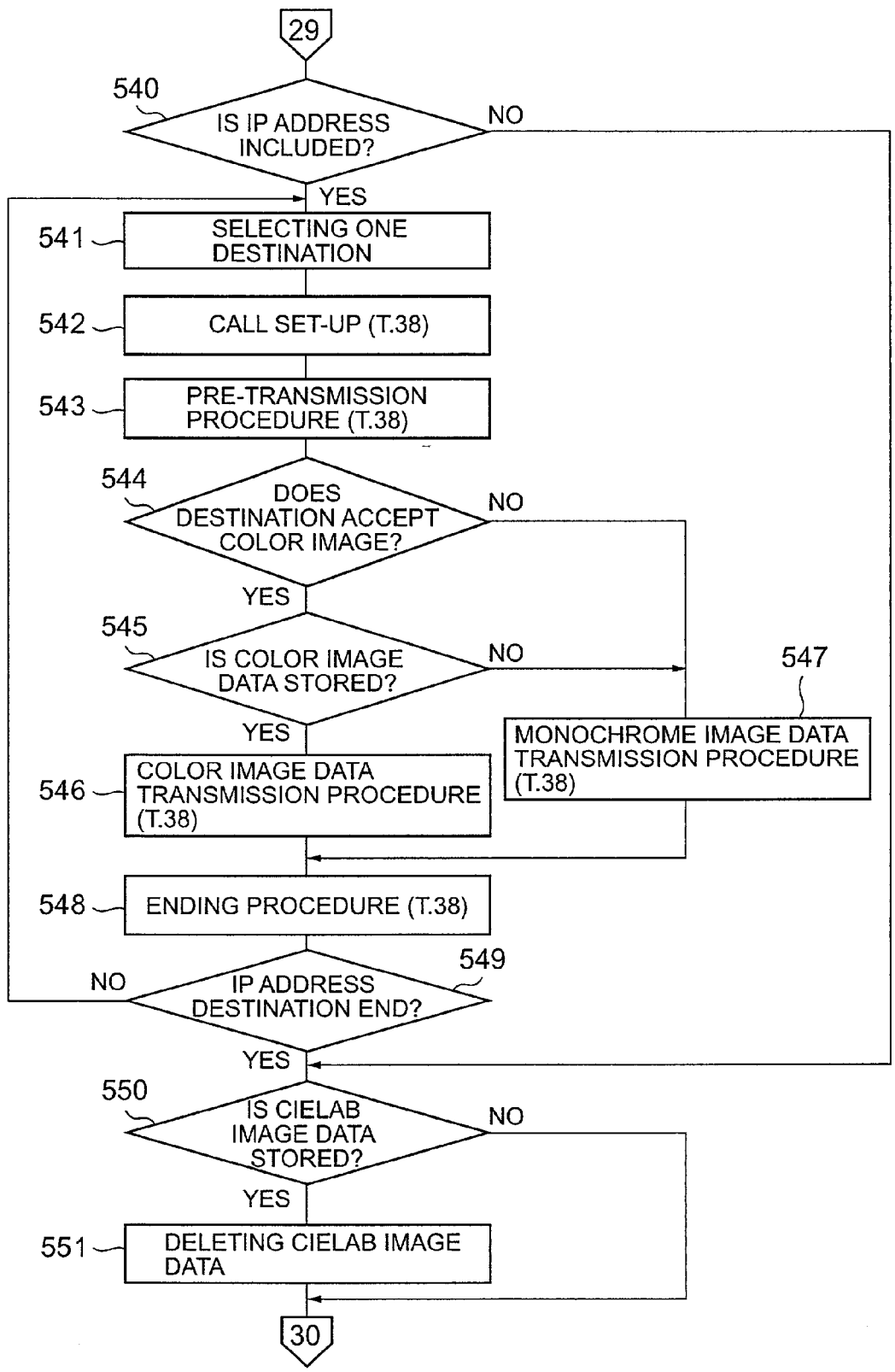
Figure 9F:
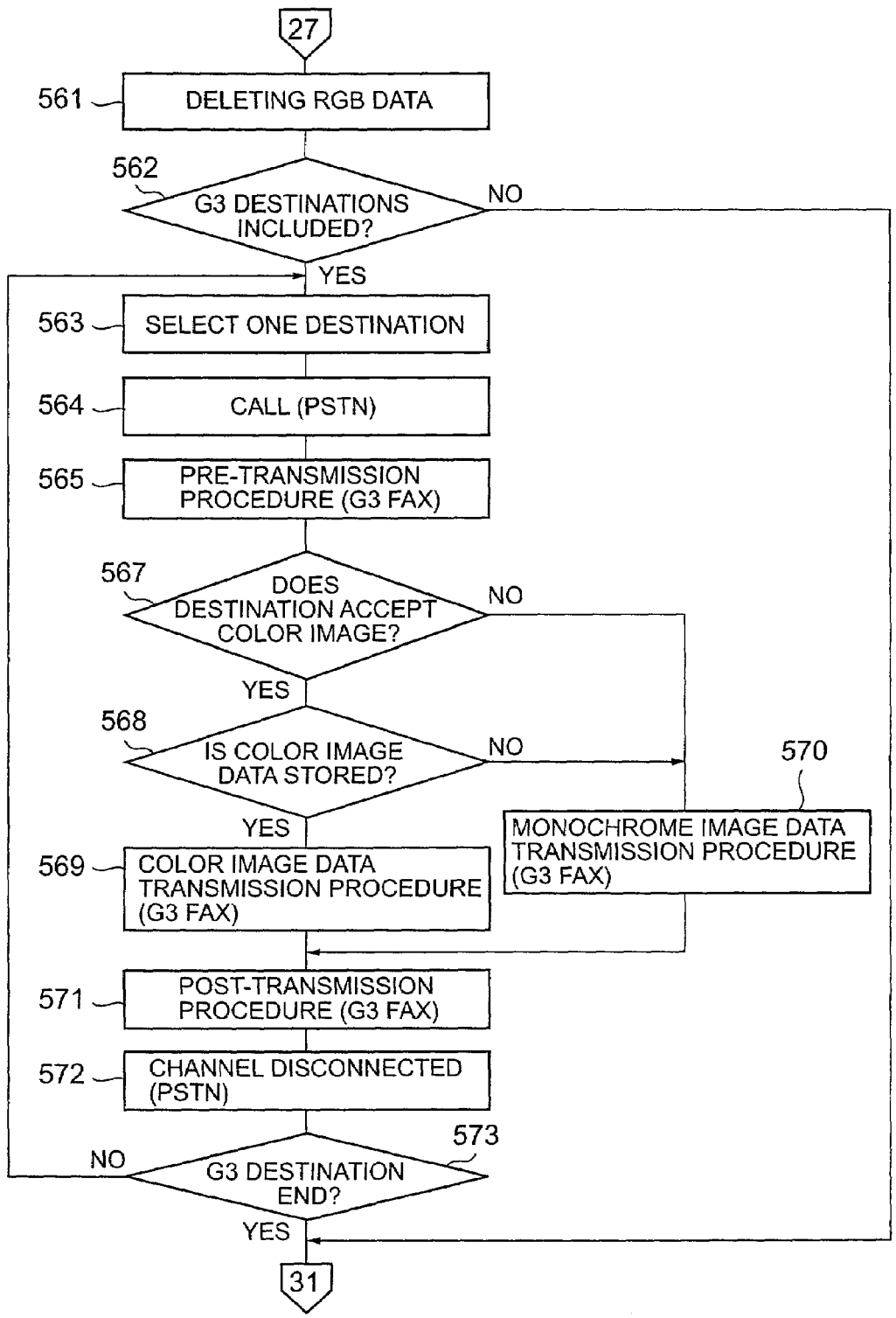
Figure 9G:
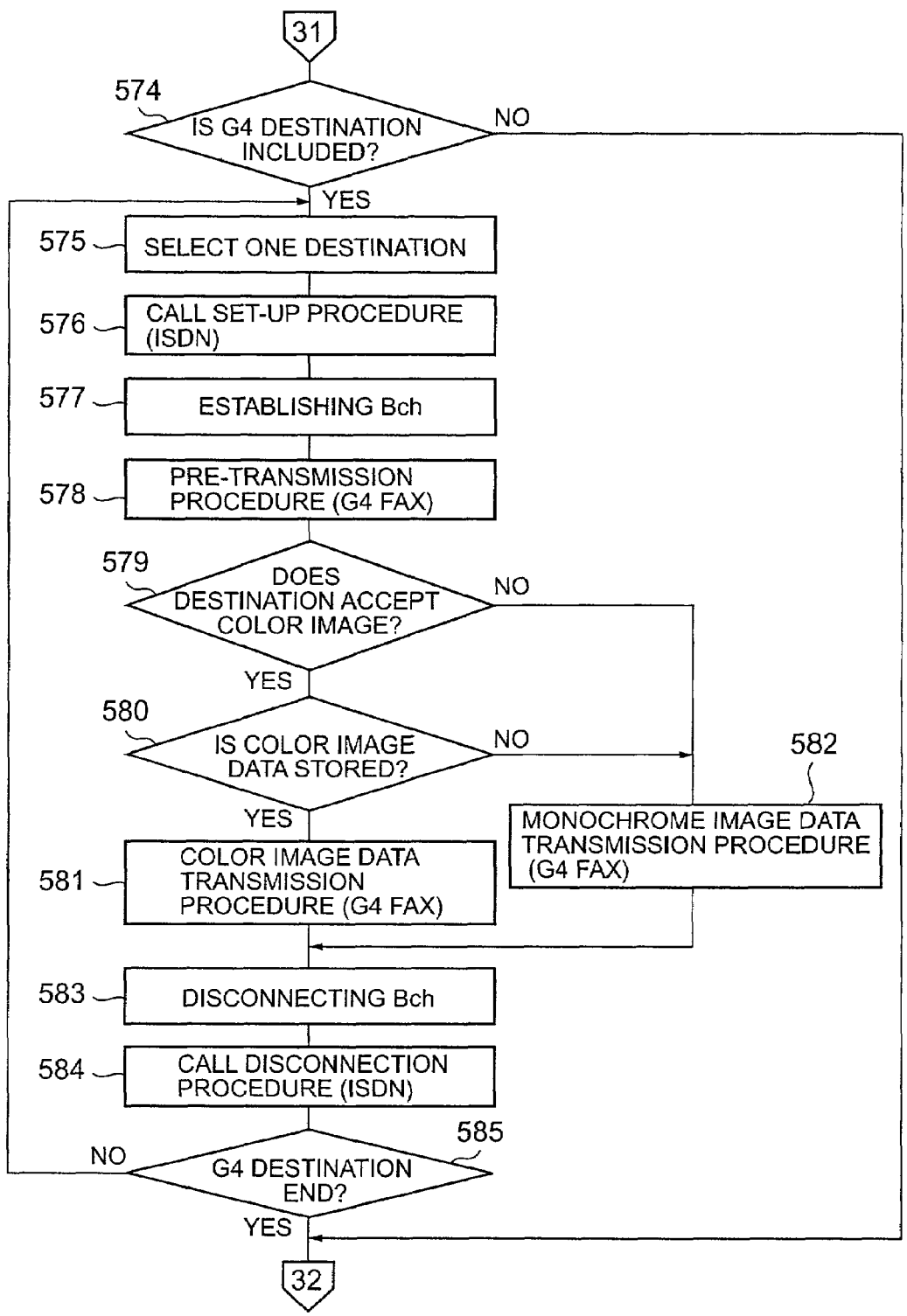
Figure 9H:
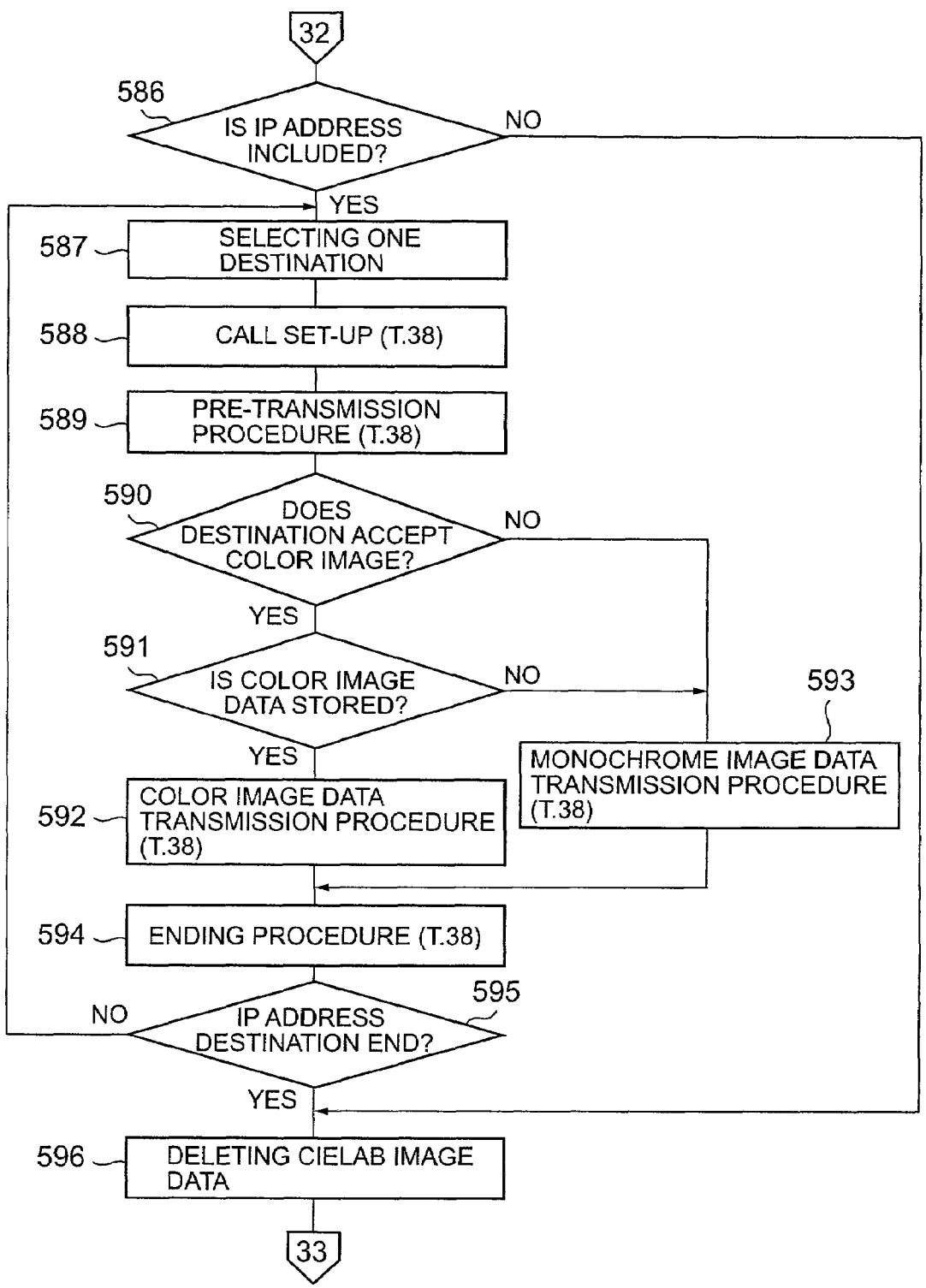
Figure 91:
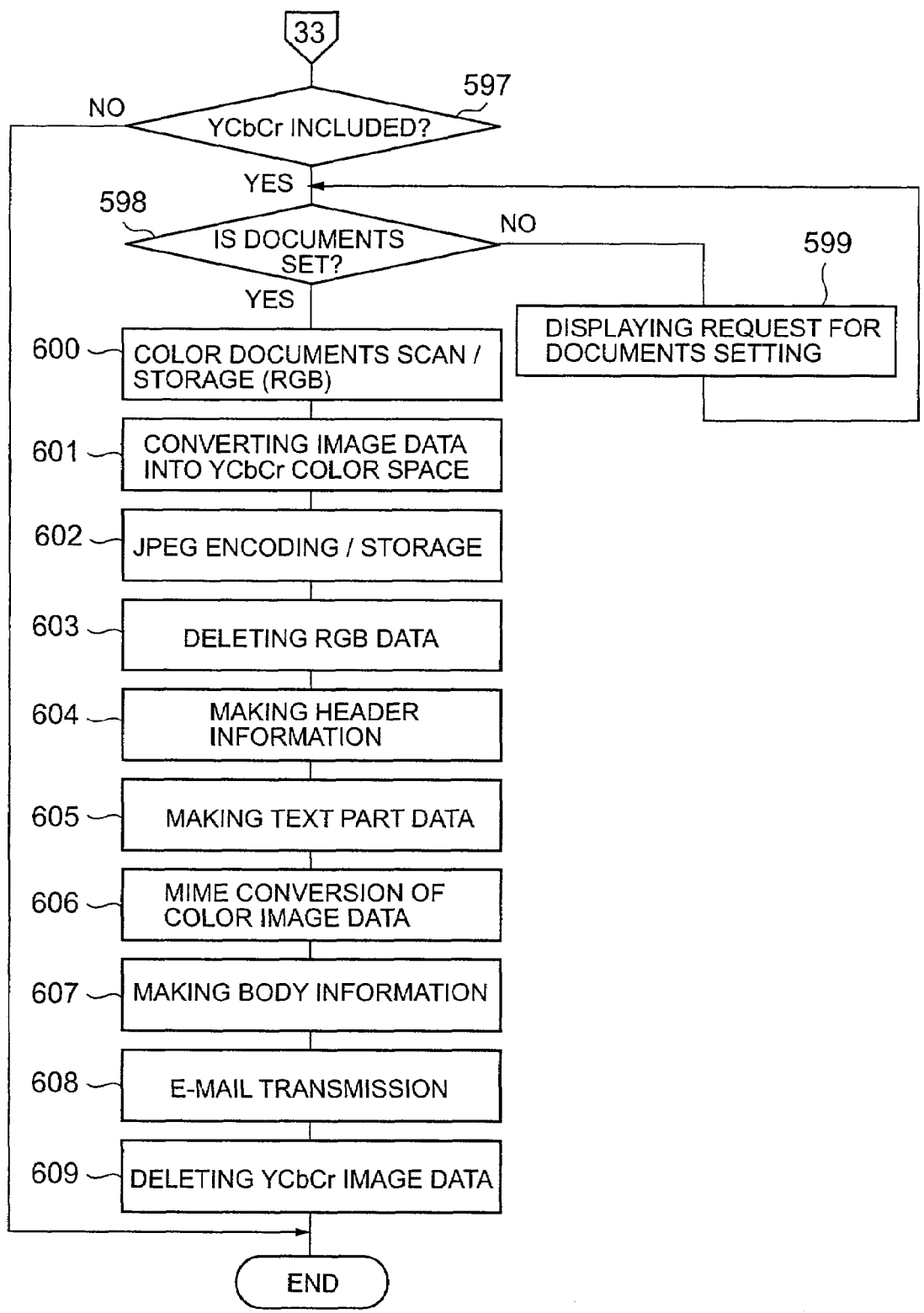
Figure 9J:
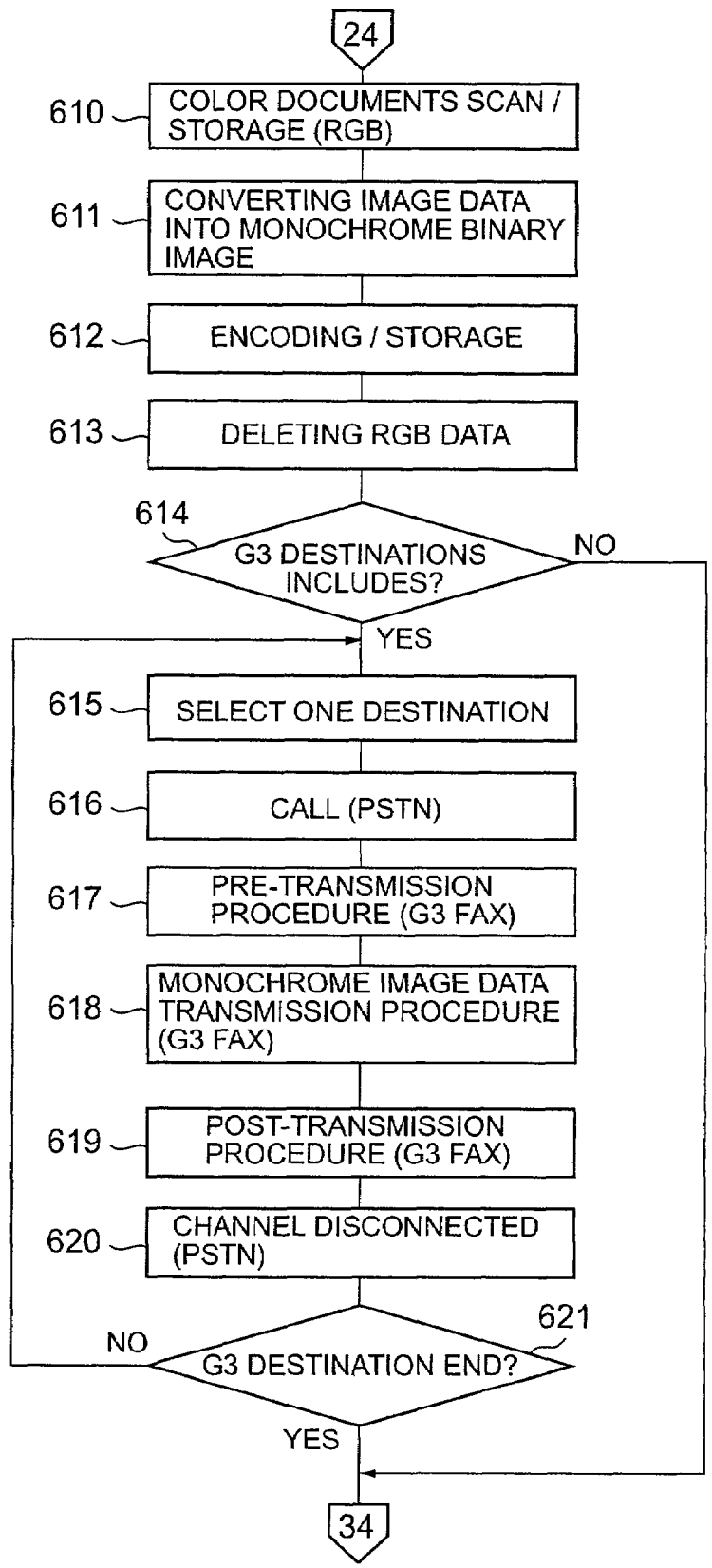
Figure 9K:
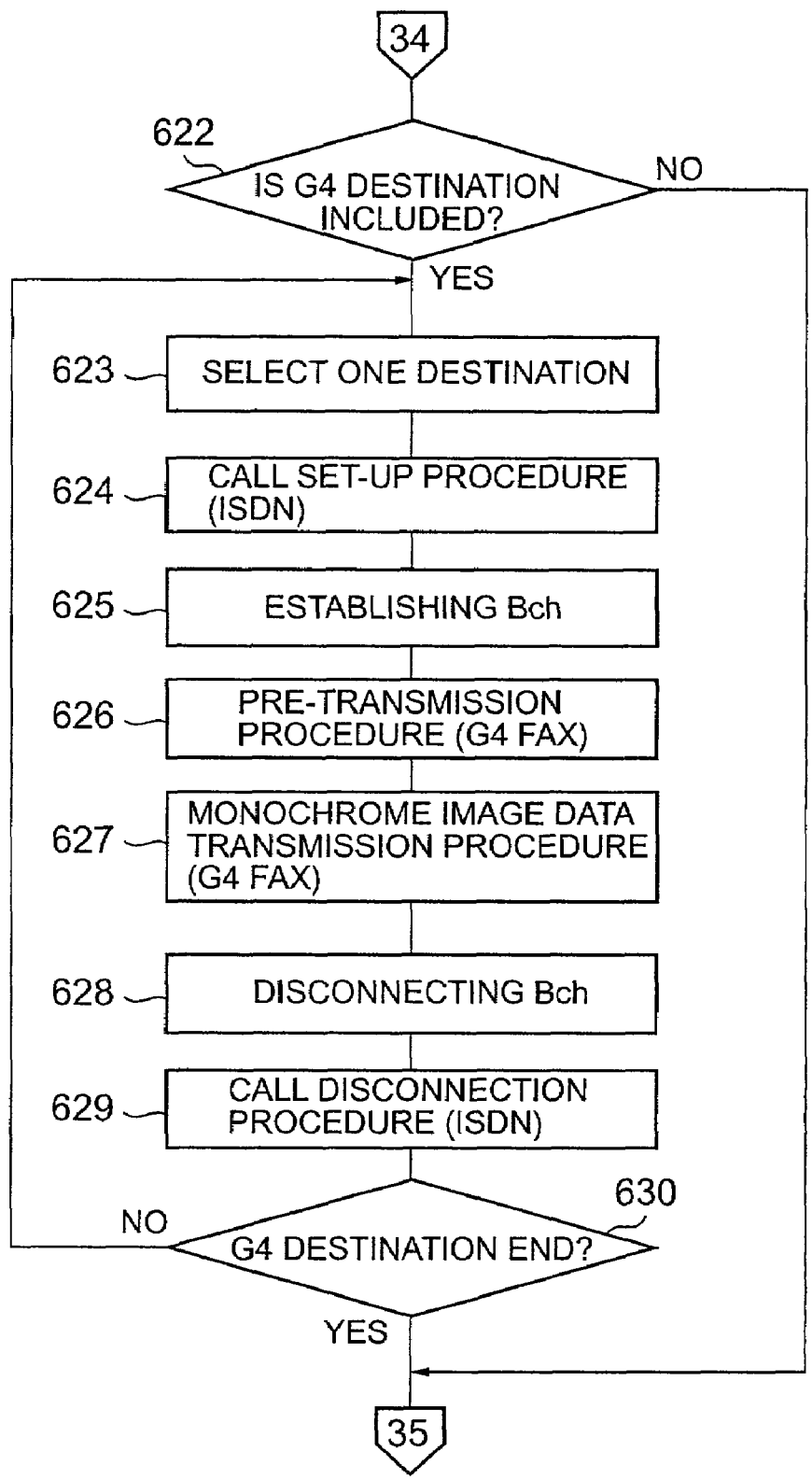
Figure 9L:
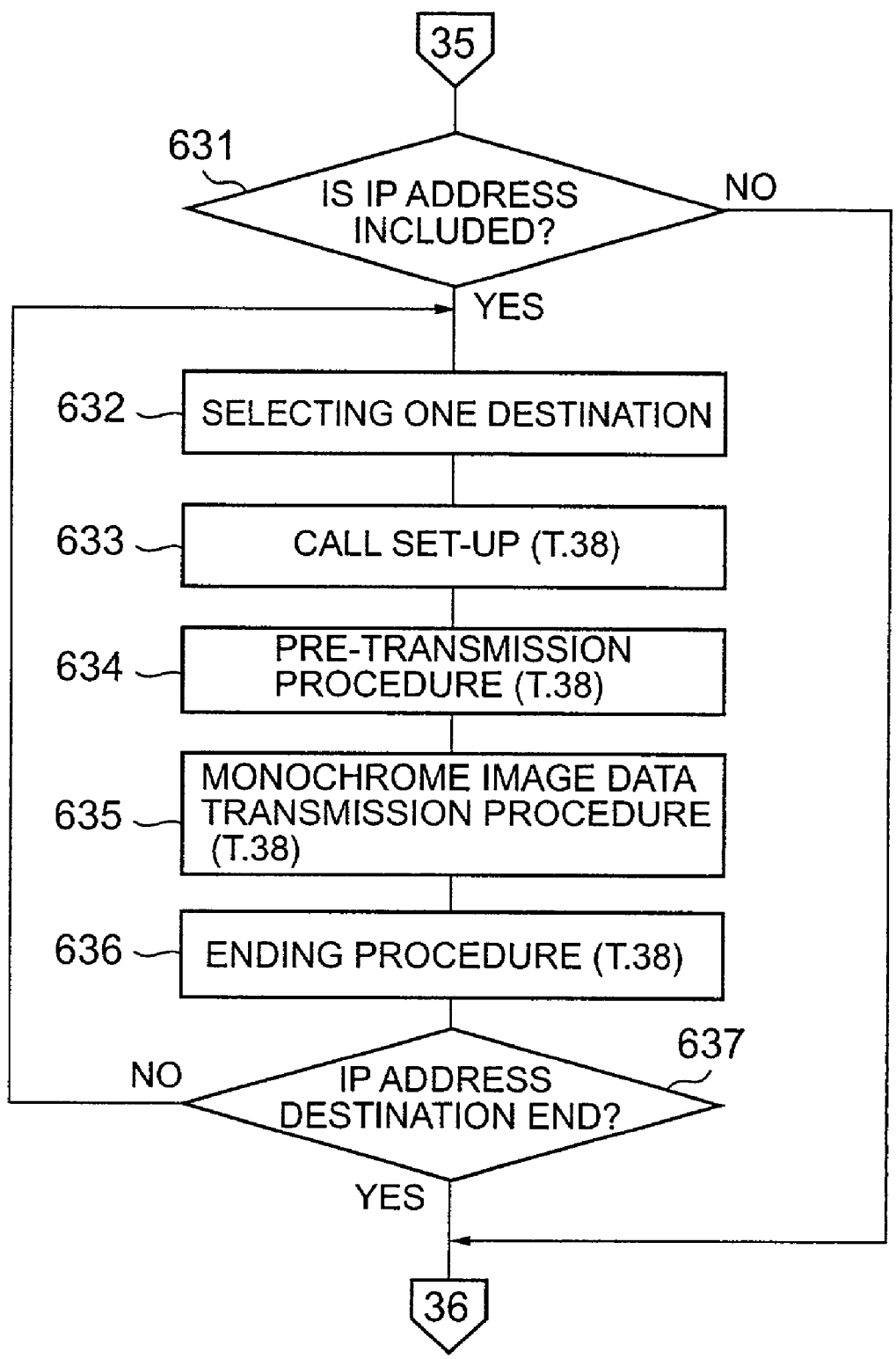
Figure 9M:
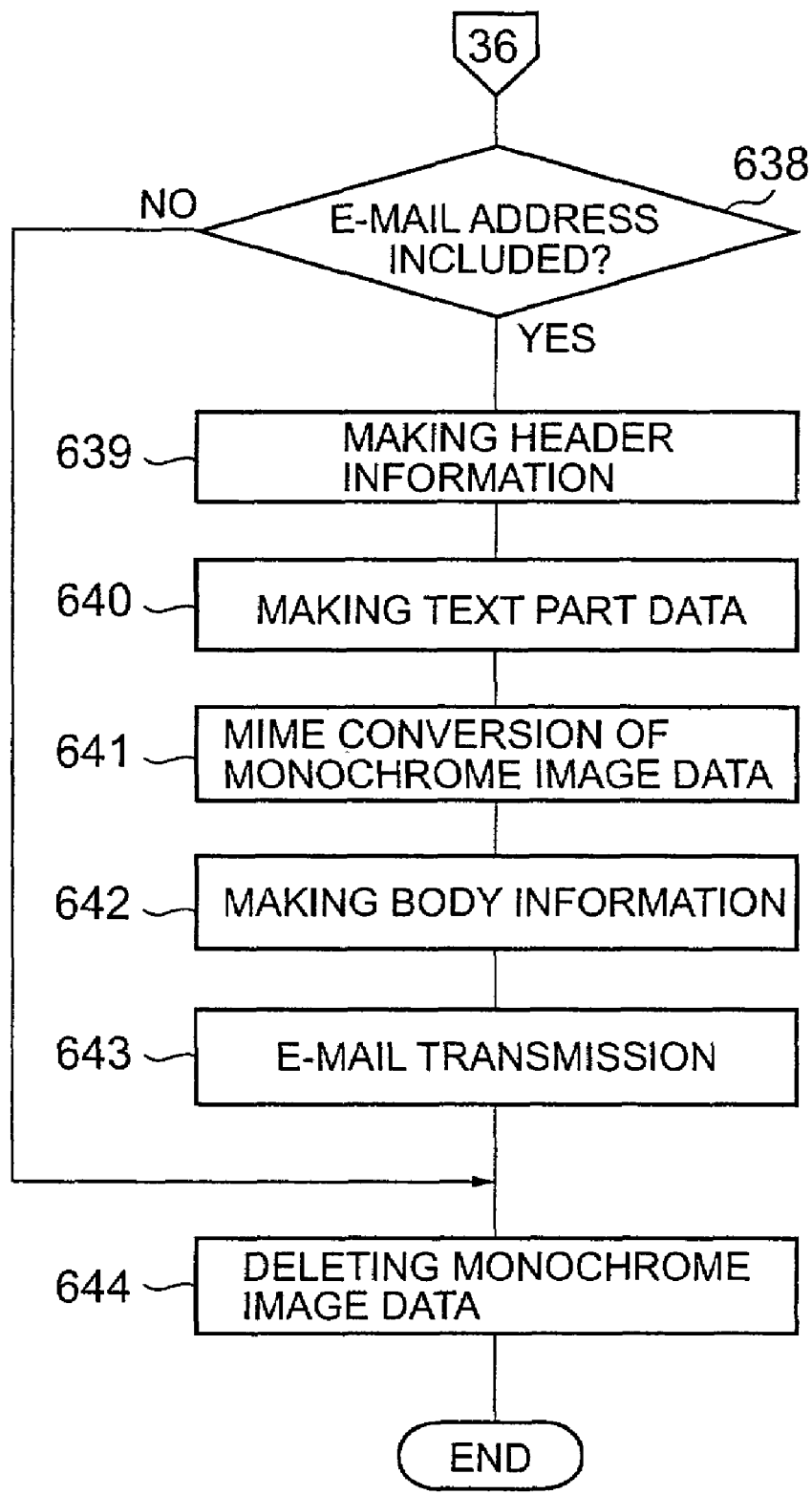

FIG. 3 is an e-mail used for transmitting facsimile image information for example.

This e-mail is a multi-part MIME format e-mail having multiple bodies, and has a mail header part including a transmission date (a "Date" field), the destination e-mail address (a "To" field), and the sender e-mail address (a "From" field). The e-mail further has a text part carrying text data and a binary part carrying facsimile image information. The binary part contains MIME encoded data obtained by converting the facsimile image information into MIME format.

In case of the simple mode of the T.37 communication function, original image data is compressed by the MH coding, and further converted into the TIFF-F format before the original image data is transmitted as facsimile image information contained in an e-mail.

A binary part of an e-mail can contain a plurality of pages of image data because the pages of image data can be combined into a single file of the TIFF-F format.

In case of color image information, JPEG data of the color image information (CIELAB image data or YCbCr image data) is converted into the MIME format, and contained in a binary part as MIME encoded data.

In this embodiment, it is assumed that e-mail containing color image information is sent to a data processing device such as a personal computer.

FIGS. 4A–4E shows a flowchart of an image information transmission of the network facsimile device FX for example.

When a user sets documents on the scanner 5, the user is requested to select a scan mode, either a color scan or a monochrome scan (Process 101), and then, to input a destination (Process 102).

It is determined whether the color scan is selected (Decision 103). If the result of the decision 103 is YES, the user is requested to select a color space, either a CIELAB color space or a YCbCr color space (Process 104).

The color scanner 5 scan documents, and RGB formatted color image data (RGB data) is stored in the image storage device 10 (Process 105).

It is determined whether the selection of the color space is the CIELAB color space (Decision 106). If the result of the decision 106 is YES, the RGB data stored in the image storage device 10 is converted into CIELAB image data in the CIELAB color space by the color space conversion unit 8 (Process 107). The CIELAB image data is encoded based on JPEG code by the encode-decode unit 9, and then, the JPEG data is stored, as a color image information, in the image storage device 10 (Process 108).

If the result of the decision 106 is NO, it is determined whether the selection of a color space is the YCbCr color space (Decision 109). If a result of the decision 109 is YES, the RGB data stored in the image storage device 10 is converted into YCbCr image data of the YCbCr color space by the color space conversion unit 8 (Process 110). The YCbCr image data is encoded into JPEG code by the encode-decode unit 9. The resulting JPEG data is stored, as color image information, in the image storage device 10 (Process 111). If the result of the decision 109 is NO, no color image information is produced.

The RGB data stored in the image storage device 10 is converted into monochrome binary image data (Process 112), and compressed by the encoding-decoding unit 9 using a coding system for compression. The resulting monochrome image information is stored in the image storage device 10 (Process 113). The RGB data stored in the image storage device 10 is deleted (Process 114).

It is determined whether the destination is a group 3 facsimile device (Decision 115). For example, the user can select a classification of the destination when the user inputs the destination. Otherwise, the user may register the classification as a one-touch dial or abbreviated dial for example.

If the designated destination is a group 3 facsimile device and a result of the decision 115 is YES, the network control device sets up a call to the designated destination (Process 116), and determines various communication functions by performing a pre-transmission procedure in a predetermined group 3 facsimile communication procedure (Process 117).

It is determined whether a notice that the destination can receive color image information is received (Decision 118). If a result of the decision 118 is YES, it is further determined whether color image information is stored in the image storage device 10 (Decision 119).

If a result of the decision 119 is YES, color image information stored in the image storage device 10 is transmitted in accordance with a predetermined color image data transmission procedure of a group 3 facsimile communication procedure (Process 120). If the result of either the decision 119 or the decision 118 is NO, monochrome image information stored in the image storage device 10 is transmitted in accordance with a predetermined monochrome image data communication procedure of the group 3 facsimile communication procedure (Process 121).

After transmitting image information, a predetermined post-transmission procedure of the group 3 facsimile communication procedure is performed (Process 122). A channel is released (Process 123). This is the end of an image information transmission operation.

If a classification of the destination is not a group 3 facsimile device and a result of the decision 115 is NO, it is determined whether the destination then designated is a group 4 facsimile device (Decision 125).

If a result of the decision 125 is YES, the D channel transmission control unit 14 performs a call establishment procedure to the designated destination (Process 126), and establishes an information channel (B channel) to the destination (Process 127). By performing a predetermined pre-transmission procedure of the group 4 facsimile communication procedure through the established information channel, various communication functions to be used in a transmission is determined (Process 128).

It is determined whether a notice that the destination can receive color image information is received (Decision 129). If a result of the decision 129 is YES, it is further checked whether color image information is stored in the image storage device 10 (Decision 130).

If a result of the decision 130 is YES, the color image information stored in the image storage device 10 is transmitted in accordance with a predetermined color image data transmission procedure of the group 4 facsimile communication procedure (Process 131). If the result of either the decision 130 or the decision 129 is NO, monochrome image information stored in the image storage device 10 is transmitted in accordance with a predetermined monochrome image data transmission procedure of the group 4 facsimile communication procedure (Process 132).

After transmitting the image information, the established information channel is disconnected (Process 133), and a predetermined call release procedure is performed (Process 134). This is the end of the image information transmission operation.

If a classification of the destination is not a group 4 facsimile device, and a result of the decision 125 is NO, it is determined whether the destination is an IP address (Decision 135).

If a result of the decision 135 is YES, the local area network transmission control unit 18 performs a predetermined call operation of the T.38 communication function (Process 136 and 137).

It is checked whether a notice that the destination can receive color image information is received (Decision 138). If a result of the decision 138 is YES, it is further determined whether color image information is stored in the image storage device 10 (Process 139).

If a result of the decision 139 is YES, the color image information stored in the image storage device 10 is transmitted in accordance with a predetermined color image data transmission procedure of the T.38 communication procedure (Process 140). If the result of either the decision 139 or the decision 138 is NO, monochrome image information stored in the image storage device 10 is transmitted in accordance with a predetermined monochrome image data transmission procedure of the T.38 communication procedure (Process 141).

After the transmission of image information, a predetermined ending procedure of the T.38 communication procedure is performed (Process 142). This is the end of an image information transmission operation.

In case that an e-mail address is designated as a destination and the result of the decision 135 is NO, a multi-part MIME format e-mail header addressed to the designated destination is generated (Process 145). Text part data including a title and contents of the image information is also generated (Process 146).

It is determined next whether color image information is stored in the image storage device 10 (Decision 147). If a result of the decision 147 is YES, the color image information stored in the image storage device 10 is converted into binary data and binary part data of MIME format is generated (Process 148).

Based on the text part data generated in the process 146 and the binary part data generated in the process 148 and 149, body information is generated (Process 150). An e-mail including the header information generated in the process 145 and the body information generated in the process 150 is transmitted to the mail server device SM (Process 151). A transmission operation ends then.

If a monochrome scan mode is designated and a result of the decision 103 is NO, the color scanner 5 scans the documents first. RGB formatted color image data (RGB data) obtained by the scan is stored in the image storage device 10 (Process 155).

The RGB data stored in the image storage device 10 is converted into monochrome binary image data (Process 156), and compressed by the encode-decode unit 9 by applying a coding method for compression. Monochrome image information obtained by the compression is stored in the image storage device 10 (Process 157). The RGB data stored in the image storage device 10 is deleted (Process 158). The process 115 followed by the other processes is performed.

As described above, since a user can designate a color space used for transmitting color image information in this embodiment, color image information of an appropriate color space can be transmitted.

By the way, in the embodiment described above, the users have to designate the color space of the color image information by themselves. The manipulation of designating the color space may be confusing. If any mistake is made, color image reproduced and printed at a receiving side would have different tone from the original image.

To avoid such a problem, color space setup information corresponding to a destination classification can be registered in color table information shown in FIG. 5(a), for example, so that color image information having a color space corresponding to a classification of a designated destination is reproduced.

For example, CIELAB is registered as color space setup information for the destination classification, a group 3 facsimile device, a group 4 facsimile device, and an IP address, as shown in FIGS. 5(b), 5(c), and 5(d), and YCbCr is registered as color space setup information for the destination classification of an e-mail address.

FIGS. 6A–6E shows an image information transmission transaction of the network facsimile device FX in this case, for example.

When a user sets documents on the color scanner 5, the user is requested to input a selection of documents scanning modes, a color scan or a monochrome scan (Process 201), and further requested to input a destination of a transmission after inputting the documents scan mode (Process 202).

It is determined whether the user designated a color scan as the documents scanning mode (Decision 203). If a result of the decision 203 is YES, an applicable color space is determined based on a destination classification of the destination, which is a group 3 facsimile device, a group 4 facsimile device, an IP address, or an e-mail address, with reference to the color table information described above (Process 204).

The color scanner 5 scans the documents, and RGB formatted color image data (RGB data) is stored in the image storage device 10 (Process 205).

It is determined whether a color space is a CIELAB color space (Decision 206). If a result of the decision 206 is YES, the RGB data stored in the image storage device is converted, by the color space conversion unit 8, into CIELAB image data represented by a CIELAB color space (Process 207). The CIELAB image data is encoded to JPEG format by the encode-decode unit 9, and resulting JPEG data is stored in the image storage device 10 (Process 208).

If the result of the decision 206 is NO, it is determined whether the color space checked at the process 204 is a YCbCr color space (Decision 209). If a result of the decision 209 is YES, the RGB data stored in the image storage device 10 is converted by the color space conversion unit 8 into YCbCr image data represented in a YCbCr color space (Process 210), and resulting YCbCr image data is encoded to a JPEG format by the encode-decode unit 9. Resulting JPEG data is stored in the image storage device 10 as color image information (Process 211). If the result of the decision 209 is NO, no color image information is produced.

The RGB data stored in the image storage device 10 is converted into monochrome binary image data (Process 212), and encoded and compressed by the encode-decode unit 10 applying an encoding method for a compression. The monochrome image information is stored in the image storage device 10 (Process 213). The RGB data stored in the image storage device 10 is deleted (Process 214).

It is determined whether a classification of the designated destination is a group 3 facsimile device (Decision 215). If a result of the decision 215 is YES, the network control unit 12 sets up a call to the destination (Process 216), and determines various communication functions used during a transmission by performing a pre-transmission procedure of the predetermined group 3 facsimile communication procedure (Process 217).

Whether a notice that the destination can receive color image information is received is checked (Decision 218). If a result of the decision 218 is YES, whether color image information is stored in the image storage device 10 is further checked (Decision 219).

If a result of the decision 219 is YES, the color image information stored in the image storage device 10 is transmitted in accordance with a predetermined color image data transmission procedure of the group 3 facsimile communication procedure (Process 220). If the result of the decision 219 is NO, or the result of the decision 218 is NO, monochrome image information stored in the image storage device 10 is transmitted in accordance with a predetermined monochrome image data transmission procedure of the group 3 facsimile communication procedure (Process 221).

After transmitting image information, a predetermined post-transmission procedure of the group 3 facsimile communication procedure is performed (Process 222). A channel is released (Process 223), and an image information transmission operation ends.

If the classification of the destination is not group 3 facsimile and the result of the decision 215 is NO, whether the classification is a group 4 facsimile device is checked (Process 225).

If a result of the decision 225 is YES, the D channel transmission control unit 14 begins a call establishment procedure against the designated destination (Process 226), establish an information channel (B channel) to the destination (Process 227). The D channel transmission control unit 14, using the established information channel, performs a predetermined pre-transmission procedure of the group 4 facsimile communication procedure, and fixes various communication functions (Process 228).

It is checked whether a notice that the destination can receive color image information is received (Decision 229). If a result of the decision 229 is YES, whether color image information is stored in the image storage device 10 is further determined (Decision 230).

If a result of the decision 230 is YES, the color image information stored in the image storage device 10 is transmitted in accordance with a predetermined color image data transmission procedure (group 4 facsimile communication procedure) (Process 231). If the result of the decision 230 is NO, or the result of the decision 229 is NO, monochrome image information stored in the image storage device 10 is transmitted in accordance with a predetermined monochrome image data transmission procedure (group 4 facsimile communication procedure) (Process 232).

After a transmission of the image information as described above, the established information channel is terminated (Process 233). A predetermined call release procedure is performed (Process 234), and an image information transmission operation ends.

If a destination classification is not a group 4 facsimile and the result of the decision 225 is NO, whether the destination classification is an IP address is determined (Decision 235).

If a result of the decision 235 is YES, the local area network transmission control unit 18 performs a predetermined call operation of the T.38 communication function (Process 236). After establishing a communication path to the destination, the control unit 18 further performs a predetermined pre-transmission procedure, and decides various communication functions to be used during a transmission (Process 237).

Whether a notice that the destination is capable to receive color image information is received is checked (Decision 238). If a result of the decision 238 is YES, whether color image information is stored in the image storage device 10 is further checked (Decision 239).

If a result of the decision 239 is YES, the color image information stored in the image storage device 10 is transmitted in accordance with a predetermined color image data transmission procedure of the T.38 communication procedure (Process 240). If the result of either the decision 239 or the decision 238 is NO, monochrome image information stored in the image storage device 10 is transmitted in accordance with a predetermined monochrome image data transmission procedure of the T.38 communication procedure (Process 241).

After the transmission of image information, a predetermined ending procedure of the T.38 communication procedure is performed (Process 242). This is the end of an image information transmission operation.

In case that an e-mail address is designated as a destination and the result of the decision 235 is NO, a multi-part MIME format e-mail header addressed to the designated destination is generated (Process 245). Text part data including a title and contents of the image information is also generated (Process 246).

It is determined next whether color image information is stored in the image storage device 10 (Decision 247). If a result of the decision 247 is YES, the color image information stored in the image storage device 10 is converted into binary data and binary part data of MIME format is generated (Process 248).

Based on the text part data generated in the process 246 and the binary part data generated in the process 248 and 249, body information is generated (Process 250). An e-mail including the header information generated in the process 245 and the body information generated in the process 250 is transmitted to the mail server device SM (Process 251). A transmission operation ends then.

If a monochrome scan mode is designated and a result of the decision 203 is NO, the color scanner 5 scans the documents first. RGB formatted color image data (RGB data) obtained by the scan is stored in the image storage device 10 (Process 255).

The RGB data stored in the image storage device 10 is converted into monochrome binary image data (Process 256), and compressed by the encode-decode unit 9 by applying a coding method for compression. Monochrome image information obtained by the compression is stored in the image storage device 10 (Process 257). The RGB data stored in the image storage device 10 is deleted (Process 258). The process 215 followed by the other processes is performed.

As described above, since this embodiment automatically checks a color space corresponding to a destination classification with reference to color table information, a user does not need to input a color space. Accordingly, any effect of manipulation error is eliminated.

By the way, only one destination is designated in the embodiments described above. The present invention is further applicable to a broadcast communication where the same image information (color image information) is transmitted to a plurality of destinations.

FIGS. 7A–7E is a flowchart of image information transmission transaction of a network facsimile for example.

When a user sets documents on the color scanner 5, the user inputs a selection of a scan mode, either a color scan or a monochrome scan (Process 301). After the input, the user further inputs transmission destinations (Process 302). Until the user finishes inputting the destinations, the process 302 is repeated. At least one destination is stored ("NO" loop of Decision 303).

Whether the user designated a color scan as the scanning mode is checked (Decision 304). If a result of the decision 304 is YES, an applicable color space is assigned to each destination based on a classification (a group 3 facsimile device, a group 4 facsimile device, an IP address, or an e-mail address) of the destination with reference to the color table information described above (Process 305).

RGB format color image data (RGB data) is obtained by the color scanner 5, and stored in the image storage device 10 (Process 306).

Whether the CIELAB color space is assigned to any of the destinations in the process 305 is checked (Decision 307). If a result of the decision 307 is YES, the RGB data stored in the image storage device 10 is converted into CIELAB image data represented in the CIELAB color space by the color space conversion unit 8 (Process 308). The CIELAB image data is encoded into JPEG format by the encode-decode unit 9, and resulting JPEG data is stored in the image storage device 10 (Process 309).

Since some destinations may accept only monochrome image information, the RGB data stored in the image storage device 10 is always converted into monochrome binary data (Process 310), and stored in the image storage device 10 after being encoded by the encode-decode unit 9 using a coding method for data compression (Process 311).

If the result of the decision 307 is NO, the color image information of the CIELAB image data and the monochrome image information are not produced.

Whether the YCbCr color space is assigned to any of the destinations in the process 305 is checked (Decision 315). If a result of the decision 315 is YES, the RGB data stored in the image storage device 10 is converted into YCbCr image data represented in the YCbCr color space by the color space conversion unit 8 (Process 316). The YCbCr image data is encoded into JPEG format by the encode-decode unit 9, and resulting JPEG data is stored in the image storage device 10 (Process 317). If the result of the decision 315 is NO, color image data of YCbCr image data is not produced.

The RGB data stored in the image storage device 10 is erased (Process 318).

It is determined whether one or more destinations whose destination classification is the group 3 facsimile devices are designated (Decision 319). If a result of the decision 319 is YES, one destination to which no transmission has been made yet is selected out of the one or more destinations (Process 320). The network control unit 12 sets up a call to the destination (Process 321), and determines various communication functions by performing a pre-transmission procedure of a predetermined group 3 facsimile communication procedure (Process 322).

Whether a notice that the destination can receive color image information is given is checked (Decision 323). If a result of the decision 323 is YES, whether color image information of CIELAB image data is stored in the image storage device 10 is further checked (Decision 324).

If a result of the decision 324 is YES, the color image information of the CIELAB image data stored in the image storage device 10 is transmitted following a predetermined color image data transmission procedure (a group 3 facsimile communication procedure) (Process 325). If the result of the decision 324 is NO, or the result of decision 323 is NO, monochrome image information stored in the image storage device 10 is transmitted following a predetermined monochrome image data transmission procedure (a group 3 facsimile communication procedure) (Process 326).

After transmitting image information, a predetermined post-transmission procedure of the group 3 facsimile communication procedure is performed (Process 327). A channel is released (Process 328). Whether image information has been transmitted to all destinations whose destination classification is the group 3 facsimile device is checked (Decision 329).

If a result of the decision 329 is NO, the process 320 is performed and identical transmission operation is performed for the remaining destinations.

If no destination whose destination classification is the group 3 facsimile device is designated, and if the result of the decision 319 is NO, processes 320 through 329 are skipped. If the result of the decision 329 is YES, whether one or more destinations whose destination classification is the group 4 facsimile device are designated (Decision 330).

If one or more destinations whose destination classification is the group 4 facsimile device is designated, and if a result of the decision 330 is YES, a destination out of the one or more destinations is selected (Process 331). The D channel transmission control unit 14 begins a call set-up procedure (Process 332), and establishes an information channel (B channel) to the destination (Process 333). Then, the predetermined pre-transmission procedure of the group 4 facsimile communication procedure is performed using the established information channel, and various communication functions to be used during the transmission are determined (Process 334).

Whether a notice that the destination can receive color image information is given is checked (Decision 335). If a result of the decision 335 is YES, whether color image information is stored in the image storage device 10 is further checked (Decision 336).

If a result of the decision 336 is YES, color image information of the CIELAB image data stored in the image storage device 10 is transmitted following the predetermined image data transmission procedure (group 4 facsimile communication procedure) (Process 337). If the result of the decision 336 is NO, or the result of the decision 335 is NO, the monochrome image information stored in the image storage device is transmitted in accordance with the monochrome image data transmission procedure (group 4 facsimile communication procedure) (Process 338).

After transmitting image information, the established information channel is disconnected (Process 339). The predetermined call disconnection procedure is performed (Process 340). Whether image information has been transmitted to all destinations whose destination classification is the group 4 facsimile device is determined (Decision 341).

If a result of the decision 341 is NO, identical transmission processes starting from the process 331 are repeated for the remaining destinations.

If no destination whose destination classification is the group 4 facsimile device is designated, and if the result of the decision 330 is NO, the processes 331 through 341 are skipped. If the result of the decision 341 is YES, whether one or more IP addresses are designated as the destinations is checked (Decision 345).

If there is one or more destination whose IP address is designated, and a result of the decision 345 is YES, a destination which has not been transmitted yet is selected out of the one or more destinations whose IP address is designated (Process 346). The local area network transmission control unit 18 sets up a call using the predetermined T.38 communication function (Process 347). After establishing a communication path to the destination, the predetermined pre-transmission procedure of the T.38 communication is performed, and various communication functions to be used during the transmission is determined (Process 348).

Whether a notice that the destination can receive color image information is received is determined (Decision 349). If a result of the decision 349 is YES, whether color image information of CIELAB image data is stored in the image storage device 10 is further checked (Decision 350).

If a result of the decision 350 is YES, the color image information of the CIELAB image data stored in the image storage device 10 is transmitted by performing the predetermined color image data transmission procedure (T.38 communication procedure) (Process 351). If a result of the decision 350 is NO, or the result of the decision 349 is NO, monochrome image information stored in the image storage device 10 is transmitted by following the predetermined monochrome image data transmission procedure (T.38 communication procedure) (Process 352).

After the transmission of the image information, the predetermined ending procedure of the T.38 communication procedure is performed (Process 353). It is checked whether the image information has been transmitted to all destinations whose IP address is designated (Decision 354). If a result of the decision 354 is NO, an identical transmission operation starting from the process 346 is repeated.

If a result of the decision is YES, the image information of the CIELAB image data stored in the image storage device 10 is deleted (Process 355). Processes 346 through 354 are skipped if there is no destination whose IP address is designated, and the result of the decision 345 is NO.

Whether there is one or more destination whose e-mail address is designated (Decision 356). If a result of the decision 356 is YES, e-mail header information of the multi-part MIME format containing all designated e-mail addresses as destinations is generated (Process 357). Text part data for notifying the destinations of the title and contents of the image information is further generated (Process 358).

At the next step, whether color image information of YCbCr image data is stored in the image storage device 10 is examined (Decision 359). If a result of the decision 359 is YES, the color image information of YCbCr image data stored in the image storage device 10 is converted into binary-part data of MIME format (Process 360). If the result of the decision 359 is NO, the monochrome image information stored in the image storage device 10 is converted into binary-part data of the MIME format (Process 361). The text-part data generated in the process 358 and the binary-part data generated in the process 360 and 361 are combined as body information (Process 362). An e-mail including the header information generated in the process 357 and the body information generated in the process 362 is transmitted to the mail server device SM (Process 363). The color image information of YCbCr image data stored in the image storage device 10 is deleted (Process 364). This is the end of the operation.

If the result of the decision 356 is NO, this transmission operation ends without performing the processes 357 through 364.

If the monochrome scan mode is designated as document scan mode, and the result of the decision 304 is NO, the color scanner 5 scans the documents in the color scan mode. Color image data of the RGB format (RGB data) is stored in the image storage device 10 (Process 365).

The RGB data stored in the image storage device 10 is converted into monochrome binary image data (Process 366). Monochrome image information is stored in the image storage device 10 after being encoded by the encode-decode unit 9 using a coding method for data compression (Process 367). The RGB data stored in the image storage device 10 is deleted (Process 368). The remaining processes starting from the process 319 are performed.

As described above, the simultaneous communication of color image information is properly performed.

FIGS. 8A through 8I is a flowchart of the image information transmission transaction, for example, of the network facsimile device FX relative to yet another embodiment of the present invention.

When a user sets documents on the color scanner 5, the user inputs a selection of a scan mode, either a color scan or a monochrome scan (Process 401). After the input, the user further inputs transmission destinations (Process 402). Until the user finishes inputting the destinations, the process 402 is repeated. At least one destination is stored ("NO" loop of Decision 403).

Whether the user designated a color scan as the scanning mode is checked (Decision 404). If a result of the decision 404 is YES, an applicable color space is assigned to each destination based on a classification (a group 3 facsimile device, a group 4 facsimile device, an IP address, or an e-mail address) of the destination with reference to the color table information described above (Process 405).

At the next step, RGB format color image data (RGB data) is obtained by the color scanner 5, and stored in the image storage device 10 (Process 406).

Whether the CIELAB color space is assigned to any of the destinations in the process 405 is checked (Decision 407). If a result of the decision 407 is YES, the RGB data stored in the image storage device 10 is converted into CIELAB image data represented in the CIELAB color space by the color space conversion unit 8 (Process 408). The CIELAB image data is encoded into JPEG format by the encode-decode unit 9, and resulting JPEG data is stored in the image storage device 10 (Process 409).

Since some destinations may accept only monochrome image information, the RGB data stored in the image storage device 10 is always converted into monochrome binary data (Process 410), and stored in the image storage device 10 after being encoded by the encode-decode unit 9 using a coding method for data compression (Process 411). The RGB data stored in the image storage device 10 is deleted (Process 412)

It is checked whether one or more destinations whose destination classification is the group 3 facsimile devices are designated (Decision 415). If a result of the decision 415 is YES, one destination to which no transmission has been made yet is selected out of the one or more destinations (Process 416). The network control unit 12 sets up a call to the destination (Process 417), and determines various communication functions by performing a pre-transmission procedure of a predetermined group 3 facsimile communication procedure (Process 418).

Whether a notice that the destination can receive color image information is given is checked (Decision 419). If a result of the decision 419 is YES, whether color image information of CIELAB image data is stored in the image storage device 10 is further checked (Decision 420).

If a result of the decision 420 is YES, the color image information of the CIELAB image data stored in the image storage device 10 is transmitted following a predetermined color image data transmission procedure (a group 3 facsimile communication procedure) (Process 421). If the result of the decision 420 is NO, or the result of decision 419 is NO, monochrome image information stored in the image storage device 10 is transmitted following a predetermined monochrome image data transmission procedure (a group 3 facsimile communication procedure) (Process 422).

After transmitting image information, a predetermined post-transmission procedure of the group 3 facsimile communication procedure is performed (Process 423). A channel is released (Process 424). Whether image information has been transmitted to all destinations whose destination classification is the group 3 facsimile device is checked (Decision 425).

If a result of the decision 425 is NO, identical transmission operation starting from the process 416 is performed for the remaining destinations.

If the result of the decision 425 is YES, whether one or more destinations whose destination classification is the group 4 facsimile device are designated (Decision 426). If no destination whose destination classification is the group 3 facsimile device is designated, and the result of the decision 415 is NO, processes 416 through 425 are skipped.

If one or more destinations whose destination classification is the group 4 facsimile device is designated, and if a result of the decision 426 is YES, a destination out of the one or more destinations is selected (Process 427). The D channel transmission control unit 14 begins a call set-up procedure (Process 428), and establishes an information channel to the destination (Process 429). Then, the predetermined pre-transmission procedure of the group 4 facsimile communication procedure is performed using the established information channel, and various communication functions to be used during the transmission are determined (Process 430).

Whether a notice that the destination can receive color image information is given is checked (Decision 431). If a result of the decision 431 is YES, whether color image information is stored in the image storage device 10 is further checked (Decision 432).

If a result of the decision 432 is YES, color image information of the CIELAB image data stored in the image storage device 10 is transmitted following the predetermined image data transmission procedure (group 4 facsimile communication procedure) (Process 433). If the result of the decision 432 is NO, or the result of the decision 431 is NO, the monochrome image information stored in the image storage device is transmitted in accordance with the monochrome image data transmission procedure (group 4 facsimile communication procedure) (Process 434).

After transmitting image information, the established information channel is disconnected (Process 435). The predetermined call disconnection procedure is performed (Process 436). Whether image information has been transmitted to all destinations whose destination classification is the group 4 facsimile device is determined (Decision 437).

If a result of the decision 437 is NO, identical transmission processes starting from the process 427 are repeated for the remaining destinations.

If the result of the decision 437 is YES, whether one or more IP addresses are designated as the destinations is checked (Decision 440). If no destination whose destination classification is the group 4 facsimile device is designated, and if the result of the decision 426 is NO, the processes 427 through 437 are skipped.

If there is one or more destination whose IP address is designated, and a result of the decision 440 is YES, a destination which has not been transmitted yet is selected out of the one or more destinations whose IP address is designated (Process 441). The local area network transmission control unit 18 sets up a call using the predetermined T.38 communication function (Process 442). After establishing a communication path to the destination, the predetermined pre-transmission procedure of the T.38 communication is performed, and various communication functions to be used during the transmission is determined (Process 443).

Whether a notice that the destination can receive color image information is received is determined (Decision 444). If a result of the decision 444 is YES, whether color image information of CIELAB image data is stored in the image storage device 10 is further checked (Decision 445).

If a result of the decision 445 is YES, the color image information of the CIELAB image data stored in the image storage device 10 is transmitted by performing the predetermined color image data transmission procedure (T.38 communication procedure) (Process 446). If a result of the decision 445 is NO, or the result of the decision 444 is NO, monochrome image information stored in the image storage device 10 is transmitted by following the predetermined monochrome image data transmission procedure (T.38 communication procedure) (Process 447).

After the transmission of the image information, the predetermined ending procedure of the T.38 communication procedure is performed (Process 448). It is checked whether the image information has been transmitted to all destinations whose IP address is designated (Decision 449). If a result of the decision 449 is NO, an identical transmission operation starting from the process 441 is repeated.

If a result of the decision 449 is YES, the image information of the CIELAB image data stored in the image storage device 10 is deleted (Process 450). Processes 441 through 449 are skipped if there is no destination whose IP address is designated, and the result of the decision 440 is NO.

On the other hand, if the resulting color spaces from the process 405 do not include the CIELAB color space and the result of the decision 407 is NO, whether the resulting color spaces from the process 405 include the YCbCr color space is further checked (Process 451).

If a result of the decision 451 is YES, whether documents are set on the color scanner 5 is further checked (Process 452). If a result of the decision 452 is NO, until the user sets the documents, the operation display unit 7 displays a message requesting the user to set documents. The operation stops until the user sets the documents (NO loop of Decision 452, Process 453).

If the documents are set on the color scanner 5, the result of the decision 452 turns to YES. The color scanner 5 is requested to perform the color scanning operation. Color image data of the RGB format (RGB data) is stored in the image storage device 10 (Process 454).

The RGB data stored in the image storage device 10 is converted into YCbCr image data represented in the YCbCr color space by the color space conversion unit 8 (Process 455). The YCbCr image data is encoded into JPEG format by the encode-decode unit 9, and resulting JPEG data is stored in the image storage device 10 (Process 456). The RGB data stored in the image storage device 10 is deleted (Process 457).

As described above, e-mail header information of the multi-part MIME format containing all designated e-mail addresses as destinations is generated (Process 458). Text part data for notifying the destinations of the title and contents of the image information is further generated (Process 459).

At the next step, the color image information of YCbCr image data stored in the image storage device 10 is converted into binary-part data of MIME format (Process 460). The text-part data generated in the process 459 and the binary-part data generated in the process 460 are combined as body information (Process 462). An e-mail including the header information generated in the process 458 and the body information generated in the process 462 is transmitted to the mail server device SM (Process 463). The color image information of YCbCr image data stored in the image storage device 10 is deleted (Process 464). This is the end of the operation.

If the result of the decision 451 is NO, this transmission operation ends without performing the processes 452 through 464.

If the monochrome scan mode is designated as document scan mode, and the result of the decision 404 is NO, the color scanner 5 is requested to scan the documents in the color scan mode. Color image data of the RGB format (RGB data) resulting from the color scan is stored in the image storage device 10 (Process 465).

The RGB data stored in the image storage device 10 is converted into monochrome binary image data (Process 466). Monochrome image information is stored in the image storage device 10 after being encoded by the encode-decode unit 9 using a coding method for data compression (Process 467). The RGB data stored in the image storage device 10 is deleted (Process 468).

It is determined whether one or more destinations whose destination classification is the group 3 facsimile devices are designated (Decision 469). If a result of the decision 469 is YES, one destination to which no transmission has been made yet is selected out of the one or more destinations (Process 470). The network control unit 12 sets up a call to the destination (Process 471), and determines various communication functions by performing a pre-transmission procedure of a predetermined group 3 facsimile communication procedure (Process 472).

At the next step, monochrome image information stored in the image storage device 10 is transmitted by following the predetermined monochrome image data transmission procedure (group 3 facsimile communication procedure) (Process 473).

After transmitting image information, the predetermined post-transmission procedure of the group 3 facsimile communication procedure is performed (Process 474). A channel is released (Process 475). Whether image information has been transmitted to all destinations whose destination classification is the group 3 facsimile device is checked (Decision 476).

If a result of the decision 476 is NO, the identical transmission operation starting from the process 470 is performed for the remaining destinations.

If the result of the decision 476 is YES, it is determined whether one or more destinations whose destination classification is group 4 facsimile devices are designated (Decision 477). If no destination whose destination classification is the group 3 facsimile device is designated, and if the result of the decision 469 is NO, processes 470 through 476 are skipped.

If one or more destinations whose destination classification is the group 4 facsimile device is designated, and if a result of the decision 477 is YES, a destination out of the one or more destinations is selected (Process 478). The D channel transmission control unit 14 is requested to begin a call set-up procedure (Process 479), and establish an information channel (B channel) to the destination (Process 480). Then, the predetermined pre-transmission procedure of the group 4 facsimile communication procedure is performed using the established information channel, and various communication functions to be used during the transmission are determined (Process 481).

The monochrome image information stored in the image storage device 10 is transmitted by following the predetermined monochrome image data transmission procedure (group 4 facsimile communication procedure) (Process 482).

After transmitting image information, the established information channel is disconnected (Process 483). The predetermined call disconnection procedure is performed (Process 484). Whether image information has been transmitted to all destinations whose destination classification is the group 4 facsimile device is determined (Decision 485).

If a result of the decision 485 is NO, identical transmission processes starting from the process 478 are repeated for the remaining destinations.

If the result of the decision 485 is YES, whether one or more IP addresses are designated as the destinations is checked (Decision 486). If no destination whose destination classification is the group 4 facsimile device is designated, and if the result of the decision 477 is NO, the processes 478 through 485 are skipped.

If there is one or more destination whose IP address is designated, and a result of the decision 486 is YES, a destination which has not been transmitted yet is selected out of the one or more destinations whose IP address is designated (Process 487). The local area network transmission control unit 18 is requested to set up a call using the predetermined T.38 communication function (Process 488). After establishing a communication path to the destination, the predetermined pre-transmission procedure of the T.38 communication is performed, and various communication functions to be used during the transmission is determined (Process 489).

The monochrome image information stored in the image storage device 10 is transmitted by following the predetermined monochrome image data transmission procedure (T.38 communication procedure) (Process 490).

After the transmission of the image information, the predetermined ending procedure of the T.38 communication procedure is performed (Process 491). It is checked whether the image information has been transmitted to all destinations whose IP address is designated (Decision 492). If a result of the decision 492 is NO, an identical transmission operation starting from the process 487 is repeated.

If a result of the decision 492 is YES, it is checked whether there is one or more destination whose e-mail address is designated (Decision 493). Processes 487 through 492 are skipped if there is no destination whose IP address is designated, and the result of the decision 486 is NO.

If one or more destination whose e-mail address is designated, and a result of the decision 493 is YES, e-mail header information of the multi-part MIME format containing all designated e-mail addresses as destinations is generated (Process 494). Text part data for notifying the destinations of the title and contents of the image information is further generated (Process 495).

The monochrome image information stored in the image storage device 10 is converted into binary-part data of the MIME format (Process 496). The text-part data generated in the process 495 and the binary-part data generated in the process 496 are combined as body information (Process 497). An e-mail including the header information generated in the process 494 and the body information generated in the process 497 is transmitted to the mail server device SM (Process 498). The monochrome image information stored in the image storage device 10 is deleted (Process 499). This is the end of the operation.

If the result of the decision 493 is NO, the monochrome image information is deleted (Process 499) and this transmission operation ends.

As described above, in case of this embodiment, the color image information of a color space is generated, and immediately transmitted to destinations before the color image information of the next color space is generated. Since this embodiment requires less memory capacity than the other embodiments previously described, the cost of the image storage device 10 can be reduced.

FIGS. 9A through 9M is a flowchart of the image information transmission transaction relative to yet another embodiment of the present invention, for example.

When a user sets documents on the color scanner 5, the user inputs a selection of a scan mode, either a color scan or a monochrome scan (Process 501). After the input, the user further inputs transmission destinations (Process 502). Until the user finishes inputting the destinations, the process 502 is repeated. At least one destination is stored ("NO" loop of Decision 503).

Whether the user designated a color scan as the scanning mode is checked (Decision 504). If a result of the decision 504 is YES, an applicable color space is assigned to each destination based on a classification (a group 3 facsimile device, a group 4 facsimile device, an IP address, or an e-mail address) of the destination with reference to the color table information described above (Process 505).

RGB format color image data (RGB data) is obtained by the color scanner 5, and stored in the image storage device 10 (Process 506).

Whether the CIELAB color space is assigned to any of the destinations in the process 505 is checked (Decision 507). If a result of the decision 507 is YES, the RGB data stored in the image storage device 10 is converted into CIELAB image data represented in the CIELAB color space by the color space conversion unit 8 (Process 508). The CIELAB image data is encoded into JPEG format by the encode-decode unit 9, and resulting JPEG data is stored in the image storage device 10 (Process 509).

Since some destinations may accept only monochrome image information, the RGB data stored in the image storage device 10 is always converted into monochrome binary data (Process 510), and stored in the image storage device 10 after being encoded by the encode-decode unit 9 using a coding method for data compression (Process 511).

It is determined whether the image storage device 10 still has remaining memory capacity enough to store color image information of YCbCr image data (Decision 512). The memory capacity required for storing the color image information of YCbCr image data is substantially equal to that required for storing the color image information of CIELAB image data.

If a result of the decision 512 is YES, whether the YCbCr color space is assigned to any destination is further determined (Decision 513). If a result of the decision 513 is YES, RGB data stored in the image storage device 10 is converted into YCbCr image data represented in the YCbCr color space by the color space conversion unit 8 (Process 514). The YCbCr image data is further encoded into the JPEG data by the encode-decode unit 9, and the resulting JPEG data is stored in the image storage device 10 as color image information (Process 515). If the result of the decision 513 is NO, no color image information of a YCbCr image data is produced.

The RGB data stored in the image storage device 10 is deleted (Process 516). If the result of the decision 507 is NO, a decision 513 and processes following the decision 513 are performed.

At the next step, it is checked whether one or more destinations whose destination classification is the group 3 facsimile devices are designated (Decision 517). If a result of the decision 517 is YES, one destination to which no transmission has been made yet is selected out of the one or more destinations (Process 518). The network control unit 12 sets up a call to the destination (Process 519), and determines various communication functions by performing a pre-transmission procedure of a predetermined group 3 facsimile communication procedure (Process 520).

Whether a notice that the destination can receive color image information is given is checked (Decision 521). If a result of the decision 521 is YES, whether color image information of CIELAB image data is stored in the image storage device 10 is further checked (Decision 522).

If a result of the decision 522 is YES, the color image information of the CIELAB image data stored in the image storage device 10 is transmitted following a predetermined color image data transmission procedure (a group 3 facsimile communication procedure) (Process 523). If the result of the decision 522 is NO, or the result of decision 521 is NO, monochrome image information stored in the image storage device 10 is transmitted following a predetermined monochrome image data transmission procedure (a group 3 facsimile communication procedure) (Process 524).

After transmitting image information, a predetermined post-transmission procedure of the group 3 facsimile communication procedure is performed (Process 525). A channel is released (Process 526). Whether image information has been transmitted to all destinations whose destination classification is the group 3 facsimile device is checked (Decision 527).

If a result of the decision 527 is NO, the process 518 is performed and identical transmission operation is performed for the remaining destinations.

If the result of the decision 527 is YES, whether one or more destinations whose destination classification is the group 4 facsimile device are designated (Decision 528). If no destination whose destination classification is the group 3 facsimile device is designated, and if the result of the decision 517 is NO, processes 518 through 527 are skipped.

If one or more destinations whose destination classification is the group 4 facsimile device is designated, and if a result of the decision 528 is YES, a destination out of the one or more destinations is selected (Process 529). The D channel transmission control unit 14 begins a call set-up procedure (Process 530), and establishes an information channel (B channel) to the destination (Process 531). Then, the predetermined pre-transmission procedure of the group 4 facsimile communication procedure is performed using the established information channel, and various communication functions to be used during the transmission are determined (Process 532).

Whether a notice that the destination can receive color image information is given is checked (Decision 533). If a result of the decision 533 is YES, whether color image information is stored in the image storage device 10 is further checked (Decision 534).

If a result of the decision 534 is YES, color image information of the CIELAB image data stored in the image storage device 10 is transmitted following the predetermined image data transmission procedure (group 4 facsimile communication procedure) (Process 535). If the result of the decision 534 is NO, or the result of the decision 533 is NO, the monochrome image information stored in the image storage device is transmitted in accordance with the monochrome image data transmission procedure (group 4 facsimile communication procedure) (Process 536).

After transmitting image information, the established information channel is disconnected (Process 537). The predetermined call disconnection procedure is performed (Process 538). Whether image information has been transmitted to all destinations whose destination classification is the group 4 facsimile device is determined (Decision 539).

If a result of the decision 539 is NO, identical transmission processes starting from the process 529 are repeated for the remaining destinations.

If the result of the decision 539 is YES, whether one or more IP addresses are designated as the destinations is checked at the next step (Decision 540). If no destination whose destination classification is the group 4 facsimile device is designated, and if the result of the decision 528 is NO, the processes 529 through 539 are skipped.

If there is one or more destination whose IP address is designated, and a result of the decision 540 is YES, a destination which has not been transmitted yet is selected out of the one or more destinations whose IP address is designated (Process 541). The local area network transmission control unit 18 sets up a call using the predetermined T.38 communication function (Process 542). After establishing a communication path to the destination, the predetermined pre-transmission procedure of the T.38 communication is performed, and various communication functions to be used during the transmission is determined (Process 543).

Whether a notice that the destination can receive color image information is received is determined (Decision 544). If a result of the decision 544 is YES, whether color image information of CIELAB image data is stored in the image storage device 10 is further checked (Decision 545).

If a result of the decision 545 is YES, the color image information of the CIELAB image data stored in the image storage device 10 is transmitted by performing the predetermined color image data transmission procedure (T.38 communication procedure) (Process 546). If a result of the decision 545 is NO, or the result of the decision 544 is NO, monochrome image information stored in the image storage device 10 is transmitted by following the predetermined monochrome image data transmission procedure (T.38 communication procedure) (Process 547).

After the transmission of the image information, the predetermined ending procedure of the T.38 communication procedure is performed (Process 548). It is checked whether the image information has been transmitted to all destinations whose IP address is designated (Decision 549). If a result of the decision 549 is NO, an identical transmission operation starting from the process 541 is repeated.

If a result of the decision 549 is YES, it is checked whether color image information of the CIELAB image data is stored in the image storage device 10 (Decision 550). If a result of the decision 550 is YES, the color image information of the CIELAB image data stored in the image storage device 10 is deleted (Process 551). If no IP address destination is designated, and further if the result of the decision 540 is NO, processes 541 through 549 are skipped, and a decision 550 is immediately checked.

Whether there is one or more destination whose e-mail address is designated (Decision 552). If a result of the decision 552 is YES, e-mail header information of the multi-part MIME format containing all designated e-mail addresses as destinations is generated (Process 553). Text part data for notifying the destinations of the title and contents of the image information is further generated (Process 554).

At the next step, whether color image information of YCbCr image data is stored in the image storage device 10 is examined (Decision 555). If a result of the decision 555 is YES, the color image information of YCbCr image data stored in the image storage device 10 is converted into binary-part data of MIME format (Process 556). If the result of the decision 555 is NO, the monochrome image information stored in the image storage device 10 is converted into binary-part data of the MIME format (Process 557). The text-part data generated in the process 554 and the binary-part data generated in the process 556 and 557 are combined as body information (Process 558). An e-mail including the header information generated in the process 553 and the body information generated in the process 558 is transmitted to the mail server device SM (Process 559). The color image information of YCbCr image data stored in the image storage device 10 is deleted (Process 560). This is the end of the operation.

If the result of the decision 552 is NO, this transmission operation ends without performing the processes 553 through 560.

On the other hand, if there is no memory capacity remaining in the image storage device 10 enough to store the color image information of the YCbCr image data after storing the color image information of the CIELAB image data and the monochrome image information, and consequently the result of the decision 512 is NO, the RGB data stored in the image storage device 10 is deleted (Process 561).

It is determined whether one or more destinations whose destination classification is the group 3 facsimile devices are designated (Decision 562). If a result of the decision 562 is YES, one destination to which no transmission has been made yet is selected out of the one or more destinations (Process 563). The network control unit 12 sets up a call to the destination (Process 564), and determines various communication functions by performing a pre-transmission procedure of a predetermined group 3 facsimile communication procedure (Process 565).

Whether a notice that the destination can receive color image information is given is checked (Decision 567). If a result of the decision 567 is YES, whether color image information of CIELAB image data is stored in the image storage device 10 is further checked (Decision 568).

If a result of the decision 568 is YES, the color image information of the CIELAB image data stored in the image storage device 10 is transmitted following a predetermined color image data transmission procedure (a group 3 facsimile communication procedure) (Process 569). If the result of the decision 568 is NO, or the result of decision 567 is NO, monochrome image information stored in the image storage device 10 is transmitted following a predetermined monochrome image data transmission procedure (a group 3 facsimile communication procedure) (Process 570).

After transmitting image information, a predetermined post-transmission procedure of the group 3 facsimile communication procedure is performed (Process 571). The channel is released (Process 572). Whether image information has been transmitted to all destinations whose destination classification is the group 3 facsimile device is checked (Decision 573).

If a result of the decision 573 is NO, identical transmission operation starting from the process 563 is performed for the remaining destinations.

If the result of the decision 573 is YES, whether one or more destinations whose destination classification is the group 4 facsimile device are checked (Decision 574). If no destination whose destination classification is the group 3 facsimile device is designated, and the result of the decision 562 is NO, processes 563 through 573 are skipped.

If one or more destinations whose destination classification is the group 4 facsimile device is designated, and if a result of the decision 574 is YES, a destination out of the one or more destinations is selected (Process 575). The D channel transmission control unit 14 begins a call set-up procedure (Process 576), and establishes an information channel to the destination (Process 577). Then, the predetermined pre-transmission procedure of the group 4 facsimile communication procedure is performed using the established information channel, and various communication functions to be used during the transmission are determined (Process 578).

Whether a notice that the destination can receive color image information is given is checked (Decision 579). If a result of the decision 579 is YES, whether color image information is stored in the image storage device 10 is further checked (Decision 580).

If a result of the decision 580 is YES, color image information of the CIELAB image data stored in the image storage device 10 is transmitted following the predetermined image data transmission procedure (group 4 facsimile communication procedure) (Process 581). If the result of the decision 580 is NO, or the result of the decision 579 is NO, the monochrome image information stored in the image storage device is transmitted in accordance with the monochrome image data transmission procedure (group 4 facsimile communication procedure) (Process 582).

After transmitting image information, the established information channel is disconnected (Process 583). The predetermined call disconnection procedure is performed (Process 584). Whether image information has been transmitted to all destinations whose destination classification is the group 4 facsimile device is determined (Decision 585).

If a result of the decision 585 is NO, identical transmission processes starting from the process 575 are repeated for the remaining destinations.

If the result of the decision 585 is YES, whether one or more IP addresses are designated as the destinations is checked (Decision 586). If no destination whose destination classification is the group 4 facsimile device is designated, and if the result of the decision 574 is NO, the processes 575 through 585 are skipped.

If there is one or more destination whose IP address is designated, and a result of the decision 586 is YES, a destination which has not been transmitted yet is selected out of the one or more destinations whose IP address is designated (Process 587). The local area network transmission control unit 18 sets up a call using the predetermined T.38 communication function (Process 588). After establishing a communication path to the destination, the predetermined pre-transmission procedure of the T.38 communication is performed, and various communication functions to be used during the transmission is determined (Process 589).

It is checked whether a notice that the destination can receive color image information is received (Decision 590). If a result of the decision 590 is YES, whether color image information of CIELAB image data is stored in the image storage device 10 is further checked (Decision 591).

If a result of the decision 591 is YES, the color image information of the CIELAB image data stored in the image storage device 10 is transmitted by performing the predetermined color image data transmission procedure (T.38 communication procedure) (Process 592). If a result of the decision 591 is NO, or the result of the decision 590 is NO, monochrome image information stored in the image storage device 10 is transmitted by following the predetermined monochrome image data transmission procedure (T.38 communication procedure) (Process 593).

After the transmission of the image information, the predetermined ending procedure of the T.38 communication procedure is performed (Process 594). It is checked whether the image information has been transmitted to all destinations whose IP address is designated (Decision 595). If a result of the decision 595 is NO, an identical transmission operation starting from the process 587 is repeated.

If a result of the decision 595 is YES, the image information of the CIELAB image data stored in the image storage device 10 is deleted (Process 596). Processes 587 through 595 are skipped if there is no destination whose IP address is designated, and the result of the decision 586 is NO.

At the next step, it is checked whether the YCbCr color space is assigned to any of the destinations (Decision 597). If a result of the decision 597 is YES, whether documents are set on the color scanner 5 is further checked (Decision 598). If a result of the decision 598 is NO, until the user sets the documents, the operation display unit 7 displays a guidance message requesting the user to set documents. The operation stops until the user sets the documents (NO loop of Decision 598, Process 599).

If the documents are set on the color scanner 5, and the result of the decision 598 turns to YES, the color scanner 5 is requested to perform the color scanning operation. Color image data of the RGB format (RGB data) is stored in the image storage device 10 (Process 600).

The RGB data stored in the image storage device 10 is converted into YCbCr image data represented in the YCbCr color space by the color space conversion unit 8 (Process 601). The YCbCr image data is encoded into JPEG format by the encode-decode unit 9, and resulting JPEG data is stored in the image storage device 10 (Process 602). The RGB data stored in the image storage device 10 is deleted (Process 603).

As described above, e-mail header information of the multi-part MIME format containing all designated e-mail addresses as destinations is generated (Process 604). Text part data for notifying the destinations of the title and contents of the image information is further generated (Process 605).

At the next step, the color image information of YCbCr image data stored in the image storage device 10 is converted into binary-part data of MIME format (Process 606). The text-part data generated in the process 605 and the binary-part data generated in the process 606 are combined as body information (Process 607). An e-mail including the header information generated in the process 604 and the body information generated in the process 607 is transmitted to the mail server device SM (Process 608). The color image information of YCbCr image data stored in the image storage device 10 is deleted (Process 609). This is the end of the operation.

If the result of the decision 597 is NO, this transmission operation ends then.

If the monochrome scan mode is designated as document scan mode, and the result of the decision 504 is NO, the color scanner 5 is requested to scan the documents in the color scan mode. Color image data of the RGB format (RGB data) resulting from the color scan is stored in the image storage device 10 (Process 610).

The RGB data stored in the image storage device 10 is converted into monochrome binary image data (Process 611). Monochrome image information is stored in the image storage device 10 after being encoded by the encode-decode unit 9 using a coding method for data compression (Process 612). The RGB data stored in the image storage device 10 is deleted (Process 613).

It is checked whether one or more destinations whose destination classification is the group 3 facsimile devices are designated (Decision 614). If a result of the decision 614 is YES, one destination to which no transmission has been made yet is selected out of the one or more destinations (Process 615). The network control unit 12 sets up a call to the destination (Process 616), and determines various communication functions by performing a pre-transmission procedure of a predetermined group 3 facsimile communication procedure (Process 617).

At the next step, monochrome image information stored in the image storage device 10 is transmitted by following the predetermined monochrome image data transmission procedure (group 3 facsimile communication procedure) (Process 618).

After transmitting image information, the predetermined post-transmission procedure of the group 3 facsimile communication procedure is performed (Process 619). The channel is released (Process 620). Whether image information has been transmitted to all destinations whose destination classification is the group 3 facsimile device is checked (Decision 621).

If a result of the decision 621 is NO, the identical transmission operation starting from the process 615 is performed for the remaining destinations.

If the result of the decision 621 is YES, it is checked whether one or more destinations whose destination classification is the group 4 facsimile devices are designated (Decision 622). If no destination whose destination classification is the group 3 facsimile device is designated, and if the result of the decision 614 is NO, processes 615 through 621 are skipped.

If one or more destinations whose destination classification is the group 4 facsimile device is designated, and consequently a result of the decision 622 is YES, a destination out of the one or more destinations is selected (Process 623). The D channel transmission control unit 14 is requested to begin a call set-up procedure (Process 624), and establishes an information channel to the destination (Process 625). Then, the predetermined pre-transmission procedure of the group 4 facsimile communication procedure is performed using the established information channel, and various communication functions to be used during the transmission are determined (Process 626).

The monochrome image information stored in the image storage device 10 is transmitted by following the predetermined monochrome image data transmission procedure (group 4 facsimile communication procedure) (Process 627).

After transmitting image information, the established information channel is disconnected (Process 628). The predetermined call disconnection procedure is performed (Process 629). Whether image information has been transmitted to all destinations whose destination classification is the group 4 facsimile device is determined (Decision 630).

If a result of the decision 630 is NO, identical transmission processes starting from the process 623 are repeated for the remaining destinations.

If the result of the decision 630 is YES, whether one or more IP addresses are designated as the destinations is checked (Decision 631). If no destination whose destination classification is the group 4 facsimile device is designated, and if the result of the decision 622 is NO, the processes 623 through 630 are skipped.

If there is one or more destination whose IP address is designated, and a result of the decision 631 is YES, a destination which has not been transmitted yet is selected out of the one or more destinations whose IP address is designated (Process 632). The local area network transmission control unit 18 is requested to set up a call using the predetermined T.38 communication function (Process 633). After establishing a communication path to the destination, the predetermined pre-transmission procedure of the T.38 communication is performed, and various communication functions to be used during the transmission is determined (Process 634).

The monochrome image information stored in the image storage device 10 is transmitted by following the predetermined monochrome image data transmission procedure (T.38 communication procedure) (Process 635).

After the transmission of the image information, the predetermined ending procedure of the T.38 communication procedure is performed (Process 636). It is checked whether the image information has been transmitted to all destinations whose IP address is designated (Decision 637). If a result of the decision 637 is NO, an identical transmission operation starting from the process 632 is repeated.

If a result of the decision 637 is YES, it is checked whether there is one or more destination whose e-mail address is designated (Decision 638). Processes 632 through 636 are skipped if there is no destination whose IP address is designated, and the result of the decision 631 is NO.

If one or more destination whose e-mail address is designated, and a result of the decision 638 is YES, e-mail header information of the multi-part MIME format containing all designated e-mail addresses as destinations is generated (Process 639). Text part data for notifying the destinations of the title and contents of the image information is further generated (Process 640).

The monochrome image information stored in the image storage device 10 is converted into binary-part data of the MIME format (Process 641). The text-part data generated in the process 640 and the binary-part data generated in the process 641 are combined as body information (Process 642). An e-mail including the header information generated in the process 639 and the body information generated in the process 642 is transmitted to the mail server device SM (Process 643). The monochrome image information stored in the image storage device 10 is deleted (Process 644). This is the end of the operation.

If the result of the decision 638 is NO, the monochrome image information is immediately deleted (Process 644). This transmission operation ends.

As described above, after color image information represented by a color space is stored in the image storage device, it is checked whether the image storage device still has a remaining memory capacity enough to store color image information represented by another color space. The color image information represented by another color space is produced, if the image storage device has enough memory capacity to store the color image information represented by another color space. Otherwise, the color image information represented by another color space is produced when it is necessary for immediate transmission. Even image storage device with small memory capacity can be used for this embodiment.

Figure 10:
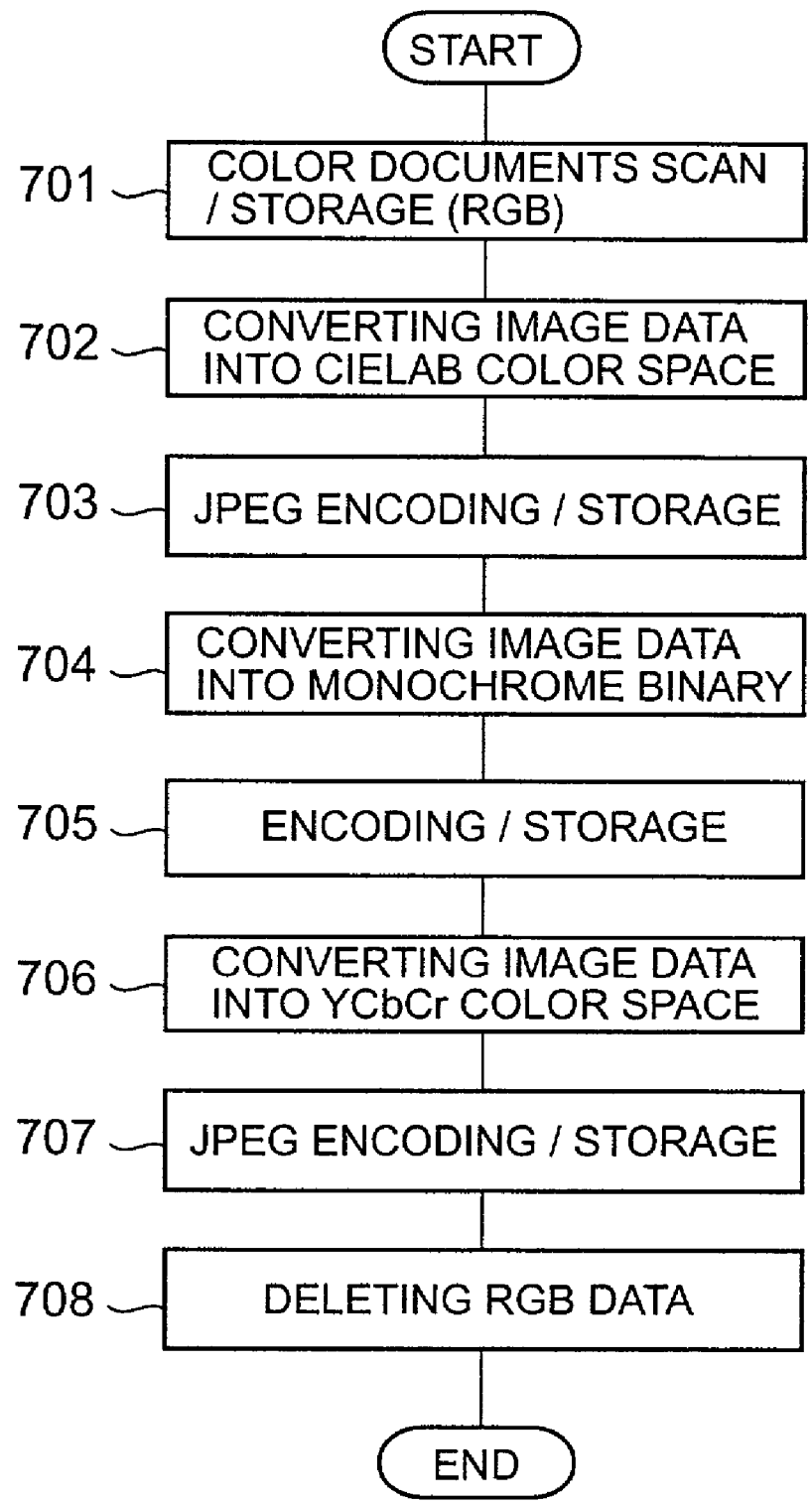
FIG. 10 illustrates a flowchart of a storage process of image information waiting for polling transmission, for example.

FIG. 10 is a flowchart of an image information storage transaction waiting for a polling transmission, for example.

Color image data of the RGB format (RGB data) is obtained by the color scanner 5, and stored in the image storage device 10 (Process 701).

The RGB data stored in the image storage device 10 is converted by the color space conversion unit 8 into CIELAB image data represented in the CIELAB color space (Process 702). The CIELAB image data is encoded into the JPEG format by the encode-decode unit 9, and resulting JPEG data is stored in the image storage device 10 (Process 703).

The RGB data stored in the image storage device 10 is converted into monochrome binary data (Process 704), and stored in the image storage device 10 after being encoded by the encode-decode unit 9 using a coding method for data compression (Process 705).

The RGB data stored in the image storage device 10 is converted by the color space conversion unit 8 into YCbCr image data of the YCbCr color space (Process 706). The YCbCr image data is encoded into the JPEG data by the encode-decode unit 9, and the JPEG data is stored in the image storage device 10 as color image information (Process 707).

Finally, the RGB data stored in the image storage device 10 is deleted (Process 708). The transmission operation ends.

The process for converting the RGB data into the monochrome binary image data can be performed using any adequate and well-known method.

The preferred embodiments of the present invention are described above. The present invention is not limited to these embodiments, but various variations and modifications may be made without departing from the scope of the present invention.

This patent application is based on Japanese priority patent application No. 2000-381495 filed on Dec. 15, 2000, the entire contents of which are hereby incorporated by reference.

What is claimed is:

1. A color facsimile device which, by scanning documents, generates first color image information represented in a first color space and transmits, to a destination designated by a user, second color image information through a plurality of communication methods, comprising a color space conversion unit which converts, said first color image information represented in said first color space into said second color image information by changing color representation from said first color space to a second color space in which said second color image information is necessary to be represented so that said destination can reproduce said documents in a right color and tone, wherein the first color image information is deleted after being converted into and stored as monochrome image information, wherein said second color image information transmitted to a classification of destinations is deleted before color image information to be transmitted next is stored.

2. The color facsimile device as claimed in claim 1, further comprising an input unit through which said user inputs said second color space corresponding to said destination.

3. The color facsimile device as claimed in claim 1, further comprising a memory device storing a color table indicating a relationship between a classification of said destination and a corresponding second color space.

4. The color facsimile device as claimed in claim 3, further comprising an image storage device which stores said second color image information, wherein a plurality of destinations can be designated; and said destinations are classified into a plurality classifications each requiring a different communication method.

5. The color facsimile device as claimed in claim 4, wherein said second color image information which is classified to a same classification is transmitted successively to said destinations.

6. The color facsimile device as claimed in claim 5, wherein said second color image information which is classified in said same classification is deleted after transmitted to said destinations.

7. The color facsimile device as claimed in claim 1, wherein said color conversion unit converts said first color image information into monochrome image information if said destination does not accept color image information.

8. A color facsimile device which, by scanning documents, generates first color image information represented in a first color space and transmits second color image information to one or more destinations through a plurality of communication methods, said color facsimile device comprising a color space conversion unit which converts said first color image information represented in said first color space into said second color image information by changing color representation from said first color space to a second color space in which said second color image information is to be represented so that said documents can be reproduced in a correct color and tone by said one or more destinations, wherein the first color image information is deleted after being converted into and stored as monochrome image information, wherein said second color image information transmitted to a classification of destinations is deleted before color image information to be transmitted next is stored.

9. The color facsimile device as claimed in claim 1, wherein the converted monochrome image information is compressed, and the compressed monochrome image information is stored.

10. The color facsimile device as claimed in claim 1, wherein the first color image information is convened into the monochrome image information, the monochrome image information is compressed, the compressed monochrome image information is stored, and the first color image information is deleted after the first color image information is converted into the monochrome image information.

* * * * *